United States Patent
Arthurs et al.

(10) Patent No.: US 11,883,358 B2
(45) Date of Patent: *Jan. 30, 2024

(54) PNEUMATIC MASSAGE SYSTEM

(71) Applicant: Leggett & Platt Canada Co., Halifax (CA)

(72) Inventors: Katherine Arthurs, Windsor (CA); John Knelsen, Leamington (CA); Robert J. McMillen, Tecumseh (CA); Renato Colja, Windsor (CA); Milosz Niec, Tecumseh (CA); Wade O'Moore, Belle River (CA); Horia Blendea, LaSalle (CA)

(73) Assignee: Leggett & Platt Canada Co., Halifax (CA)

(*) Notice: Subject to any disclaimer, the term of this patent is extended or adjusted under 35 U.S.C. 154(b) by 714 days.

This patent is subject to a terminal disclaimer.

(21) Appl. No.: 17/009,018

(22) Filed: Sep. 1, 2020

(65) Prior Publication Data

US 2020/0390641 A1    Dec. 17, 2020

Related U.S. Application Data

(63) Continuation of application No. PCT/CA2019/000030, filed on Mar. 5, 2019, and a
(Continued)

(51) Int. Cl.
*A61H 9/00* (2006.01)
*B60N 2/90* (2018.01)

(52) U.S. Cl.
CPC ........... *A61H 9/0078* (2013.01); *B60N 2/914* (2018.02); *B60N 2/976* (2018.02);
(Continued)

(58) Field of Classification Search
CPC ...... A61H 23/04; A61H 9/005; A61H 23/006; A61H 9/00; A61H 2201/0107;
(Continued)

(56) References Cited

U.S. PATENT DOCUMENTS 3,232,305 A    2/1966    Groeber
3,306,538 A    2/1967    McCracken, Jr.
(Continued)

FOREIGN PATENT DOCUMENTS

CA    2336053 A1 *    12/2000
CN    1629504 A       6/2005
(Continued)

OTHER PUBLICATIONS

European Patent Office Extended Search Report for Application No. 19764160.8 dated Oct. 28, 2021 (9 pages).
(Continued)

*Primary Examiner* — Tu A Vo
(74) *Attorney, Agent, or Firm* — Michael Best & Friedrich LLP

(57) ABSTRACT

A pneumatic massage system includes a source of pressurized air, a fluidic switching module in communication with the source of pressurized air, a first bladder in communication with the fluidic switching module, a second bladder in communication with the fluidic switching module, and a third bladder in communication with the fluidic switching module. The fluidic switching module is configured to direct air from the source of pressurized air to each of the first bladder, the second bladder, and the third bladder in a predefined sequence. The predefined sequence includes inflating the first bladder, inflating the second bladder while deflating the first bladder, and inflating the third bladder while deflating the second bladder.

20 Claims, 36 Drawing Sheets

Related U.S. Application Data continuation-in-part of application No. 16/116,433, filed on Aug. 29, 2018, now Pat. No. 11,432,995, said application No. PCT/CA2019/000030 is a continuation-in-part of application No. 16/116,433, filed on Aug. 29, 2018, now Pat. No. 11,432,995.

(60) Provisional application No. 62/747,470, filed on Oct. 18, 2018, provisional application No. 62/638,828, filed on Mar. 5, 2018.

(52) U.S. Cl.
CPC ............... *A61H 2201/0149* (2013.01); *A61H 2201/1238* (2013.01); *A61H 2201/1409* (2013.01); *A61H 2201/1642* (2013.01); *A61H 2201/5002* (2013.01); *A61H 2201/5056* (2013.01); *A61H 2205/062* (2013.01); *A61H 2205/081* (2013.01)

(58) Field of Classification Search
CPC ............ A61H 2201/1409; A61H 23/00; A61H 9/0007; A61H 9/0021; A61H 9/0028; A61H 2009/0035; B60N 2/914; F15C 1/00; F15C 1/14; F15C 1/12; F15C 1/22; Y10S 128/10; Y10T 137/2076
See application file for complete search history.

(56) References Cited

U.S. PATENT DOCUMENTS

| | | | |
|---|---|---|---|
| 3,339,668 A | 9/1967 | Trainor | |
| 3,390,674 A | 7/1968 | Jones | |
| 3,444,897 A | 5/1969 | McCleod, Jr. | |
| 3,536,084 A | 10/1970 | Dorsey et al. | |
| 3,566,862 A | 3/1971 | Schuh et al. | |
| 3,587,568 A | 6/1971 | Thomas | |
| 3,680,574 A | 8/1972 | Price | |
| 3,720,218 A | 3/1973 | Drzewiecki | |
| 3,734,116 A | 5/1973 | Trask, II | |
| 3,958,602 A | 5/1976 | Manion et al. | |
| 4,225,989 A | 10/1980 | Corbett et al. | |
| 4,258,753 A | 3/1981 | Limpaecher | |
| 4,373,553 A | 2/1983 | Drzewiecki | |
| 4,538,701 A | 9/1985 | Lowery et al. | |
| 4,549,574 A | 10/1985 | Taylor | |
| 4,565,259 A | 1/1986 | Stoll | |
| 4,572,327 A | 2/1986 | Dean | |
| 4,747,467 A | 5/1988 | Lyon et al. | |
| 4,756,230 A | 7/1988 | Shew | |
| 4,840,425 A | 6/1989 | Noble | |
| 5,266,754 A | 11/1993 | Swift | |
| 5,273,406 A | 12/1993 | Feygin | |
| 5,659,158 A | 8/1997 | Browning et al. | |
| 5,677,518 A | 10/1997 | Fischer et al. | |
| 5,996,731 A | 12/1999 | Czabala et al. | |
| 6,131,696 A | 10/2000 | Esslinger | |
| 6,572,570 B1* | 6/2003 | Burns ............... | A61H 33/6089 601/148 |
| 6,722,467 B1 | 4/2004 | Kusche et al. | |
| 6,767,331 B2 | 7/2004 | Stouffer et al. | |
| 6,860,157 B1 | 3/2005 | Yang et al. | |
| 6,916,300 B2 | 7/2005 | Hester et al. | |
| 6,976,507 B1 | 12/2005 | Webb et al. | |
| 7,037,280 B1* | 5/2006 | Burns ............... | A61H 33/02 601/149 |
| 7,096,888 B1 | 8/2006 | Thurston et al. | |
| 7,128,082 B1 | 10/2006 | Cerretelli et al. | |
| 7,445,083 B2 | 11/2008 | Wu | |
| 8,043,238 B1 | 10/2011 | Tamura et al. | |
| 8,430,202 B1 | 4/2013 | Mason et al. | |
| 8,550,208 B1 | 10/2013 | Potokar | |
| 8,770,229 B2 | 7/2014 | Gopalan et al. | |
| 9,119,705 B2* | 9/2015 | Parish ............... | A61H 1/008 |
| 9,573,679 B2 | 2/2017 | Golling et al. | |
| 9,618,150 B2 | 4/2017 | Bauer et al. | |
| 9,989,159 B2 | 6/2018 | Winkler et al. | |
| 10,724,549 B2 | 7/2020 | Le et al. | |
| 2003/0070870 A1 | 4/2003 | Reynolds | |
| 2004/0097854 A1* | 5/2004 | Hester ............... | A61H 23/04 601/149 |
| 2005/0067218 A1 | 3/2005 | Bristow et al. | |
| 2006/0144638 A1 | 7/2006 | Radatus et al. | |
| 2008/0121295 A1 | 5/2008 | Tippetts | |
| 2009/0294211 A1 | 12/2009 | Roberts | |
| 2011/0108358 A1 | 5/2011 | Edgington et al. | |
| 2011/0297479 A1 | 12/2011 | Butler | |
| 2012/0055560 A1 | 3/2012 | Gopalan et al. | |
| 2012/0143108 A1 | 6/2012 | Boscanyi et al. | |
| 2013/0035619 A1 | 2/2013 | Freund | |
| 2013/0053102 A1 | 2/2013 | Inagaki | |
| 2014/0088468 A1 | 3/2014 | Murison | |
| 2014/0299130 A1 | 10/2014 | Librett et al. | |
| 2016/0106620 A1* | 4/2016 | Uno ............... | A61H 9/0078 601/149 |
| 2016/0213553 A1 | 7/2016 | Oberg et al. | |
| 2016/0229320 A1* | 8/2016 | Lem ............... | B60N 2/976 |
| 2018/0148187 A1 | 5/2018 | Valleroy et al. | |
| 2018/0156629 A1 | 6/2018 | Lem et al. | |
| 2018/0178694 A1 | 6/2018 | McMillen et al. | |
| 2018/0272902 A1* | 9/2018 | Lem ............... | B60N 2/976 |
| 2019/0075932 A1 | 3/2019 | Yu et al. | |

FOREIGN PATENT DOCUMENTS

| | | |
|---|---|---|
| CN | 201071958 Y | 6/2008 |
| CN | 101467931 A | 7/2009 |
| CN | 101563531 A | 10/2009 |
| CN | 103655147 A | 3/2014 |
| CN | 106942931 A | 7/2017 |
| DE | 2536901 A1 | 1/1977 |
| DE | 3240710 A1 | 10/1984 |
| DE | 19509489 A1 | 9/1996 |
| DE | 102015100141 A1 | 7/2016 |
| EP | 1096913 A1 | 5/2001 |
| EP | 1326569 A1 | 7/2003 |
| EP | 1687543 A | 8/2006 |
| EP | 1722356 A1 | 11/2006 |
| EP | 1851447 A1 | 11/2007 |
| EP | 1760262 B1 | 4/2008 |
| EP | 2012022 A2 | 1/2009 |
| EP | 2682612 A2 | 1/2014 |
| EP | 2627914 B1 | 9/2018 |
| EP | 3597477 A1 | 1/2020 |
| JP | H0623306 A | 2/1994 |
| KR | 20130002774 U | 5/2013 |
| TW | M283636 U | 12/2005 |
| WO | 199709527 A1 | 3/1997 |
| WO | 00/67691 A1 | 11/2000 |
| WO | 02/34195 A1 | 5/2002 |
| WO | 2005/080800 A1 | 9/2005 |
| WO | 2006/090130 A1 | 8/2006 |
| WO | 2010/108254 A1 | 9/2010 |
| WO | 2012/048853 A1 | 4/2012 |
| WO | 2014039661 A1 | 3/2014 |
| WO | 2015/039701 A1 | 3/2015 |

OTHER PUBLICATIONS

Japanese Patent Office Action for Application No. 2020-546336 dated Oct. 26, 2021 (6 pages including English translation).
Goenechea, E. et al. Geräuschminderung in der Hydraulik. O&P—Oelhydraulik und Pneumatik: Zeitschrift Fuer Fluidtechnik, Aktorik, Steuerelektronik und Sensorik, Vereinigte Fachverlage GmbH, DE, vol. JAHR, No. 4/05, Jan. 1, 2004, with English translation of abstract, 8 pages.
European Patent Office. Office Action for Application No. 19764160.8 dated Feb. 1, 2023 (5 pages).
International Search Report and Written Opinion for Application No. PCT/CA2019/000030 dated Apr. 17, 2019 (17 bages).

(56) References Cited

OTHER PUBLICATIONS

International Search Report and Written Opinion for Application No. PCT/CA2020/000027 dated May 27, 2020 (12 pages).
International Search Report and Written Opinion for Application No. PCT/CA2018/000183 dated May 1, 2019 (11 pages).
United States Patent Office Action for U.S. Appl. No. 16/359,709 dated Oct. 29, 2020 (13 pages).
Chinese Patent Office Action for Application No. 201980017369.4 dated Jan. 28, 2022 (15 pages, including English translation).

* cited by examiner

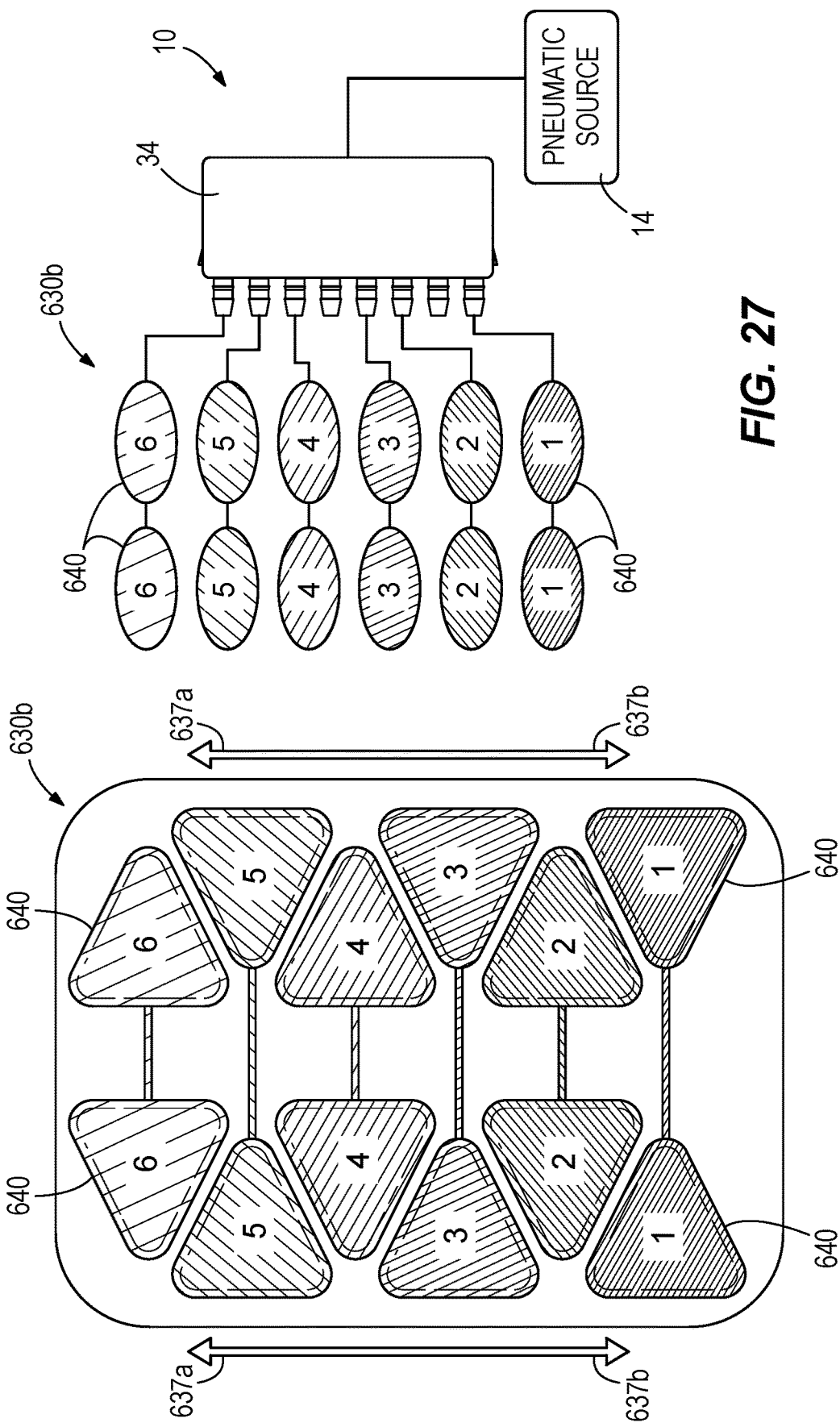

PNEUMATIC MASSAGE SYSTEM

CROSS-REFERENCE TO RELATED APPLICATIONS

This application is a continuation of co-pending International Application No. PCT/CA2019/000030, filed Mar. 5, 2019, and a continuation-in-part of co-pending U.S. patent application Ser. No. 16/116,433, filed Aug. 29, 2018. International Application No. PCT/CA2019/000030 is a continuation-in-part of U.S. patent application Ser. No. 16/116,433, filed Aug. 29, 2018, and also claims priority to U.S. Provisional Patent Application No. 62/638,828, filed on Mar. 5, 2018, and to U.S. Provisional Patent Application No. 62/747,470, filed on Oct. 18, 2018. The entire content of each of the above-mentioned patent applications is incorporated herein by reference.

FIELD OF THE DISCLOSURE

The present disclosure relates to a pneumatic massage system for commercial and residential use, for example, office and home furniture, and more specifically for use within vehicular seating systems (aircraft, automobiles, etc.).

BACKGROUND OF THE DISCLOSURE

Conventional massage systems in automotive seats utilize mechanical systems to perform a massage function in the form of pressure patterns for interfacing with a seat occupant. Such systems typically use mechanical actuators to generate certain massage modes at various levels of pressure intensity and predefined massage patterns. The modes may include some form of rolling, compressing, stretching, kneading, poking, and/or vibrating a seat occupant to provide an enjoyable experience while relaxing muscles.

Different massage modes, however, require a separate mechanical actuator positioned within the automotive seat. Moreover, due to system complexity (motors, actuators, tracks, etc.) and the necessary electronics for proper mechanical control, mechanical or electro-mechanical actuator costs are relatively high, as are the component volumes and weight associated therewith. Consequently, in seating applications in which low cost, space savings, and weight reduction are valued, conventional massage systems can be limiting.

Although existing automotive seating systems use air bladders to provide user support in certain areas of the seat and thereby lower component weight in certain applications, these bladders are in a fixed position and not able to provide motion across a portion of a seat surface in response to applied air pressure. In other words, a bladder is only able to inflate and deflate to increase or decrease a level of pressure intensity at one spot in a particular seat.

SUMMARY OF THE DISCLOSURE

The present disclosure provides, in one aspect, a pneumatic massage system including a source of pressurized air, a fluidic switching module in communication with the source of pressurized air, a first bladder in communication with the fluidic switching module, a second bladder in communication with the fluidic switching module, and a third bladder in communication with the fluidic switching module. The fluidic switching module is configured to direct air from the source of pressurized air to each of the first bladder, the second bladder, and the third bladder in a predefined sequence. The predefined sequence includes inflating the first bladder, inflating the second bladder while deflating the first bladder, and inflating the third bladder while deflating the second bladder.

In some embodiments, the first bladder, the second bladder, and the third bladder are arranged in a circular pattern.

In some embodiments, the first bladder, the second bladder, and the third bladder are integrally formed as a single body.

In some embodiments, the pneumatic massage system further includes a support backing with a planar surface abutting each of the first bladder, the second bladder, and the third bladder.

In some embodiments, the pneumatic massage system further includes a pressure transfer member positioned opposite the support backing, and the pressure transfer member at least partially overlies each of the first bladder, the second bladder, and the third bladder.

In some embodiments, the second bladder is positioned adjacent the first bladder, and the third bladder is positioned adjacent the second bladder.

In some embodiments, the fluidic switching module includes no moving parts.

The present disclosure provides, in another aspect, a pneumatic massage system including a source of pressurized air, a fluidic switching module in communication with the source of pressurized air, and a bladder assembly in communication with the fluidic switching module. The bladder assembly includes a plurality of chambers. The fluidic switching module is configured to inflate each of the chambers in a predefined sequence.

In some embodiments, the plurality of chambers is arranged in a circular pattern, and the fluidic switching module is configured to sequentially inflate and deflate adjacent chambers of the plurality of chambers to produce a rotary massage effect.

In some embodiments, the plurality chambers is arranged in a generally linear pattern, and the fluidic switching module is configured to sequentially inflate and deflate adjacent chambers of the plurality of chambers to produce a translating massage effect.

In some embodiments, the bladder assembly includes a body defining each of the plurality of chambers, and adjacent chambers of the plurality of chambers are separated by a weld.

In some embodiments, the bladder assembly includes a plurality of passages integral with the body, and each of the plurality of passages is in communication with a respective chamber of the multi-chamber air bladder. Also, each of the plurality of passages is in communication with the fluidic switching module.

In some embodiments, the bladder assembly includes a support backing positioned adjacent the body, and the support backing includes a planar surface in abutting contact with each chamber of the plurality of chambers.

In some embodiments, the bladder assembly includes a pressure transfer member positioned adjacent the body opposite the support backing, and the pressure transfer member at least partially overlies each of the chambers.

In some embodiments, each chamber of the plurality of chambers partially overlaps an adjacent one of the plurality of chambers.

In some embodiments, the predefined sequence includes sequential inflation of adjacent chambers of the plurality of chambers.

In some embodiments, the predefined sequence includes sequential deflation of adjacent chambers of the plurality of chambers.

In some embodiments, the fluidic switching module is configured to inflate each chamber of the plurality of chambers in the predefined sequence without moving any portion of the fluidic switching module.

The present disclosure provides, in another aspect, a massaging seat assembly including a support surface positioned to support a portion of a seat occupant, a first fluidic switching module in communication with a source of pressurized air, and a first bladder assembly including a first plurality of chambers in communication with the first fluidic switching module. The first fluidic switching module is configured to inflate each chamber of the first plurality of chambers in a first predefined sequence to impart a translational or rotational massage to the seat occupant through the support surface.

In some embodiments, the massaging seat assembly includes a second fluidic switching module in communication with the source of pressurized air, and a second bladder assembly including a second plurality chambers in communication with the second fluidic switching module. The second fluidic switching module is configured to inflate each chamber of the second plurality of chambers in a second predefined sequence to impart a translational or rotational massage to the seat occupant through the support surface.

In some embodiments, the massaging seat assembly also includes an adjustment device positioned fluidly between the source of pressurized air and the first and second fluidic switching modules. The adjustment device is configured to actuate between a first position in which the adjustment device directs air from the source of pressurized air to the first fluidic switching module, and a second position in which the adjustment device directs air from the source of pressurized air to the second fluidic switching module.

In some embodiments, the adjustment device is configured to actuate from the first position to the second position in response to a pressure signal from the first fluidic switching module.

In some embodiments, the adjustment device is configured to actuate from the second position to the first position in response to a pressure signal from the second fluidic switching module.

In some embodiments, the first fluidic switching module is configured to inflate each chamber of the first plurality of chambers in the predefined sequence without moving any portion of the fluidic switching module.

The present disclosure provides, in another aspect, a massaging seat assembly including a support surface positioned to support a portion of a seat occupant, a first bladder assembly positioned behind the support surface, the first bladder assembly including a plurality of chambers configured to inflate in a predefined sequence to impart a translational or rotational massage to the seat occupant through the support surface, and a second bladder assembly positioned behind the first bladder assembly, the second bladder assembly configured to inflate and deflate to vary an intensity of the translational or rotational massage.

In some embodiments, the massaging seat assembly includes a fluidic switching module in communication with a source of pressurized air, the fluidic switching module configured to direct air from the source of pressurized air to each of the plurality of chambers.

In some embodiments, the second bladder assembly is in communication with the source of pressurized air separately from the fluidic switching module.

In some embodiments, the fluidic switching module is configured to inflate each chamber of the first plurality of chambers in the predefined sequence without moving any portion of the fluidic switching module.

Other features and aspects of the present disclosure will become apparent by consideration of the following detailed description and accompanying drawings.

BRIEF DESCRIPTION OF THE DRAWINGS

FIG. 26 illustrates a set of upper back bladders of the seating system of FIG. 20.

FIG. 27 is a schematic diagram of the set of upper back bladders of FIG. 26.

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. And as used herein and in the appended claims, the terms "upper", "lower", "top", "bottom", "front", "back", and other directional terms are not intended to require any particular orientation, but are instead used for purposes of description only.

DETAILED DESCRIPTION

Figure 1:
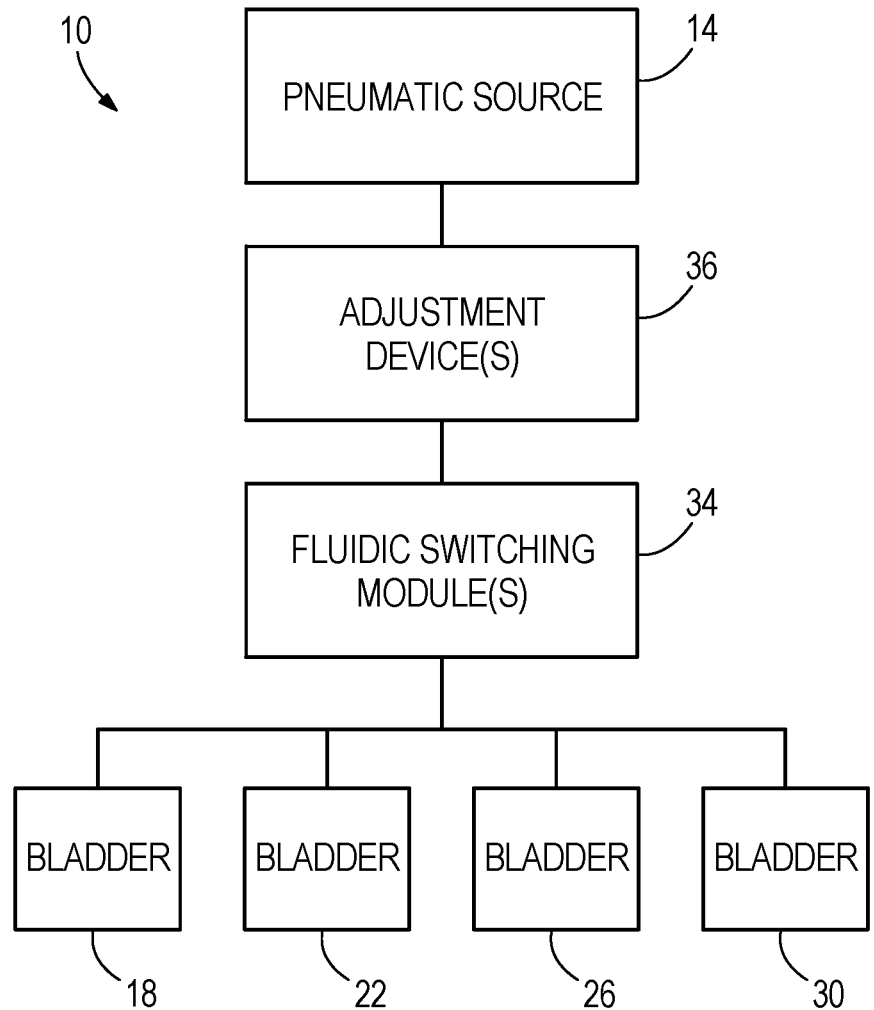
FIG. 1 is a diagram illustrating a pneumatic system according to an embodiment of the present disclosure.

With reference to FIG. 1, a pneumatic system 10 (i.e., a pneumatic massage system, oscillating pneumatic system, rotary pneumatic system, etc.) is illustrated. The pneumatic system 10 includes a pneumatic source 14 (e.g., an air pump, air compressor, etc.), a first bladder 18, a second bladder 22, a third bladder 26, and a fourth bladder 30. The pneumatic system 10 further includes one or more fluidic switching modules 34 fluidly connected to the pneumatic source 14 and to the bladders 18, 22, 26, 30. In some embodiments, the pneumatic source 14 is driven by an electric motor. In other words, pneumatic pressure is generated by a dedicated electric motor. In alternative embodiments, the pneumatic source 14 is any suitable source of compressed air, including a pneumatic module or any pneumatic source within an existing vehicle pneumatic system.

One or more adjustment devices 36 (including, for example, one or more air switches, solenoid valves, or other pneumatic components for selectively directing air along different paths) may optionally be provided in the pneumatic system 10. For example, in some embodiments described herein, an adjustment device 36 is provided between the pneumatic source 14 and a plurality of fluidic switching modules 34 to selectively direct air from the pneumatic source 14 to the fluidic switching modules 34 in a desired sequence.

In some embodiments, the adjustment devices 36 may be associated with each bladder 18, 22, 26, 30 (e.g., in communication with pneumatic tubes) for bladder control. Additional electronic or electrical control is also possible for bladder functioning, to include additional valve or pump control sequences. The adjustment devices 36 can also or alternatively be used on one or more air supply conduits and/or one or more exhaust conduits (depending on the supply and exhaust configuration to the bladders 18, 22, 26, 30.

As explained in greater detail below, the pneumatic system 10 is utilized to create a massage effect by cyclically inflating and deflating the bladders 18, 22, 26, 30. Specifically, the pneumatic source 10 provides a source of pressurized air to the fluidic switching module 34, which controls the flow of air to the bladders 18, 22, 26, 30 in a predefined sequence without moving any portion of the fluidic switching module 34. In particular, the flow of air is controlled by the fluidic switching module 34 such that the bladders 18, 22, 26, 30 repeatedly inflate and deflate in a staggered fashion (i.e., out of unison inflation), thereby creating a massaging effect. Although there are four bladders 18, 22, 26, 30 in the illustrated embodiment, the pneumatic system 10 may include any number of bladders. For example, the system 10 can be configured to provide a three, four, five, six, or more air-chambered pattern or circuit, which in certain applications may be a circular or rotational pattern, although other non-circular shaped patterns are within the present scope, to include other multi-part or multi-sectored or positioned bladder configurations. In some embodiments, the pneumatic system 10 is integrated within a seat, which for the purposes of the following description may be any vehicle seat within a passenger compartment of a vehicle, though the seat is not necessarily limited to vehicular applications.

Figure 2:
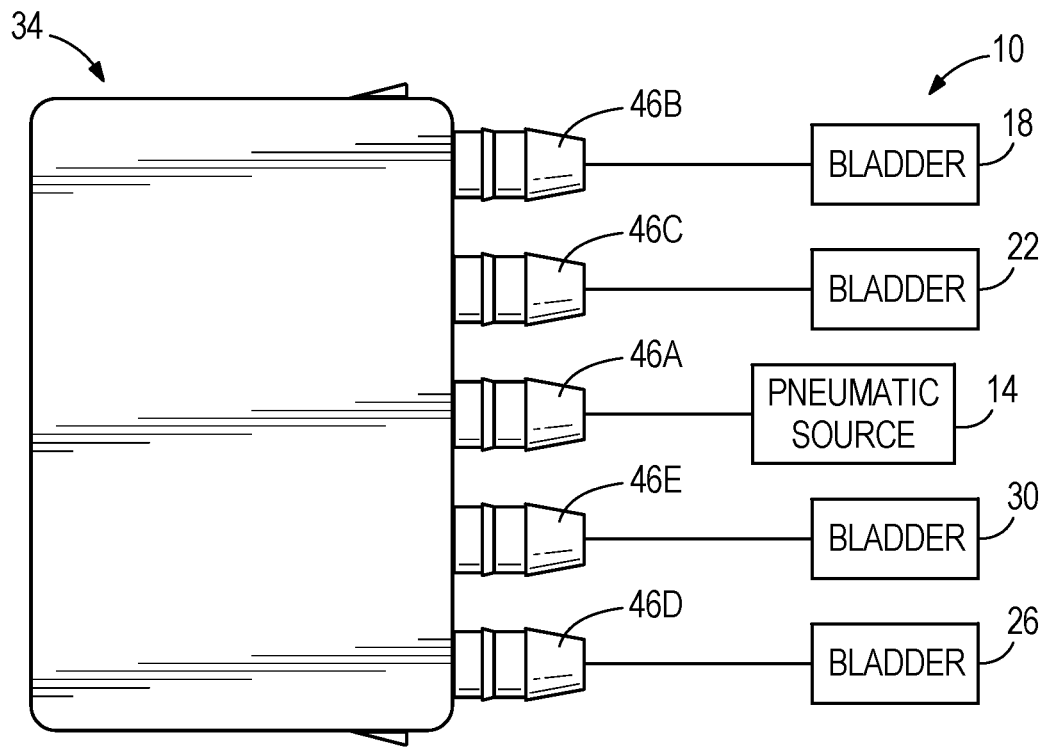
FIG. 2 is a schematic view of a fluidic switching module of the pneumatic system of FIG. 1.
Figure 3:
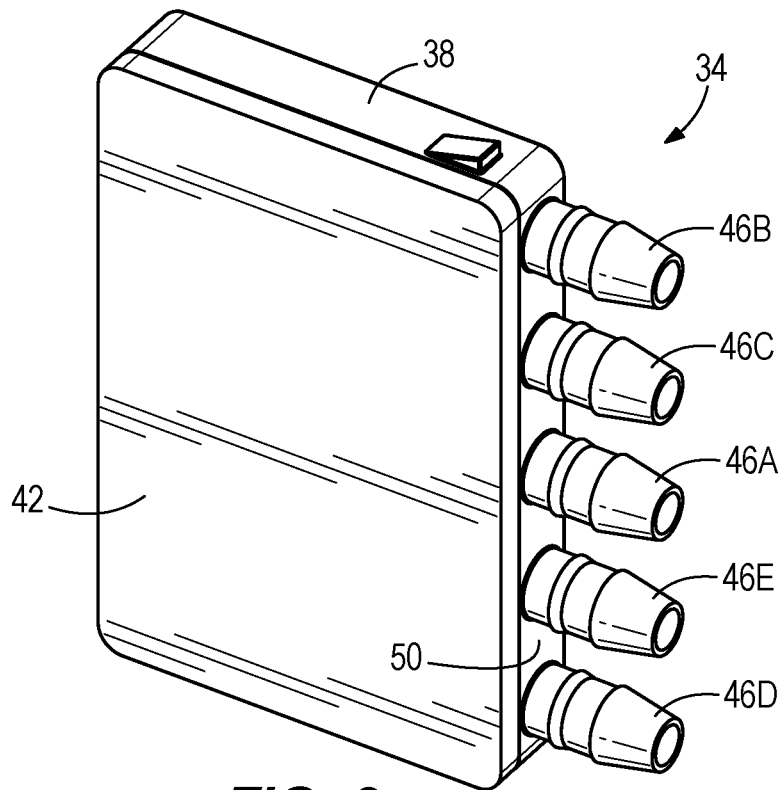
FIG. 3 is a front perspective view of the fluidic switching module of FIG. 2.

With reference to FIGS. 2-3, the fluidic switching module 34 includes a base 38 and a cover 42. The module 34 further includes five air connections 46A-46E formed on one side 50 of the base 38. In particular, the base 38 includes a pneumatic source connector 46A, a first bladder connector 46B, a second bladder connector 46C, a third bladder connector 46D, a fourth bladder connector 46E.

Figure 4:
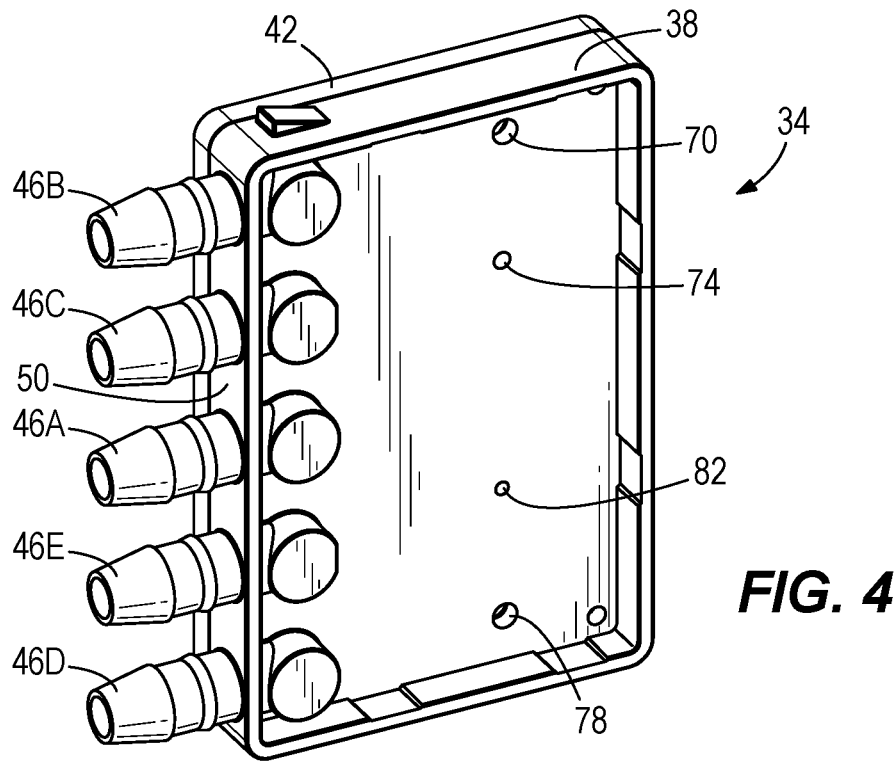
FIG. 4 is a rear perspective view of the fluidic switching module of FIG. 2.
Figure 5:
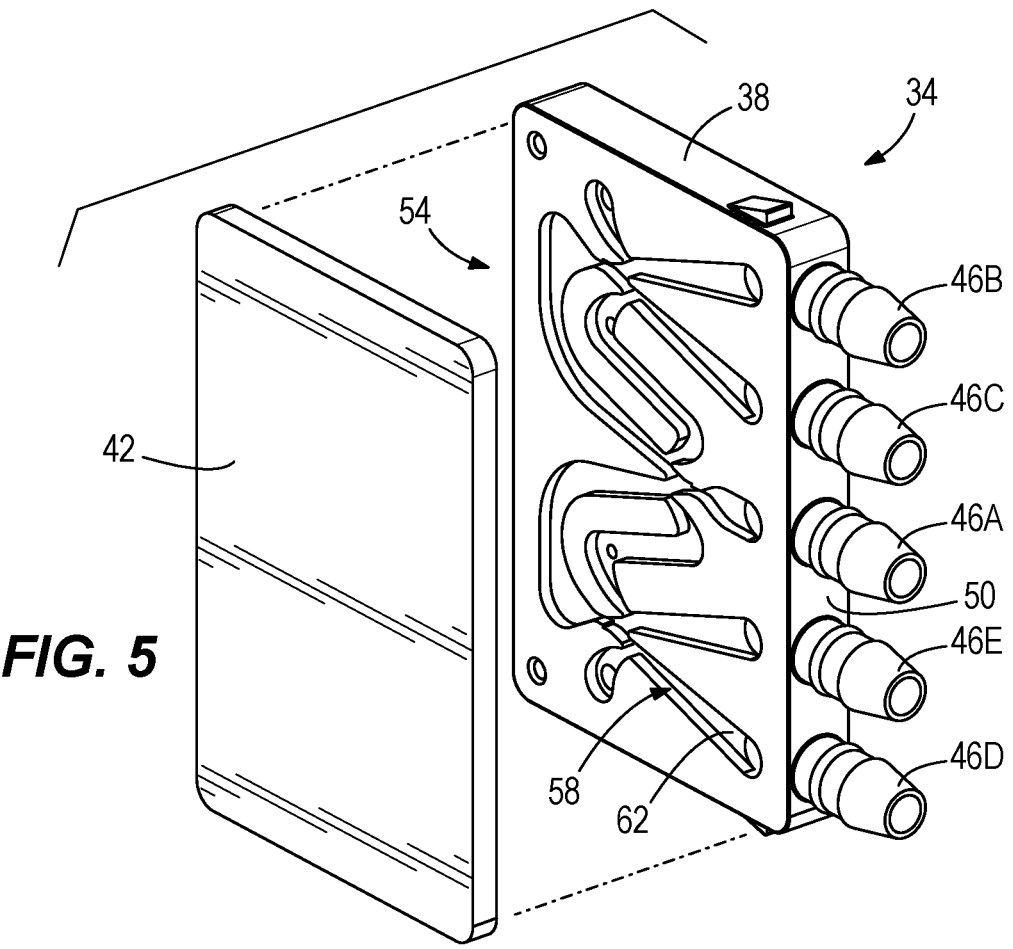
FIG. 5 is an exploded view of the fluidic switching module of FIG. 2.
Figure 6:
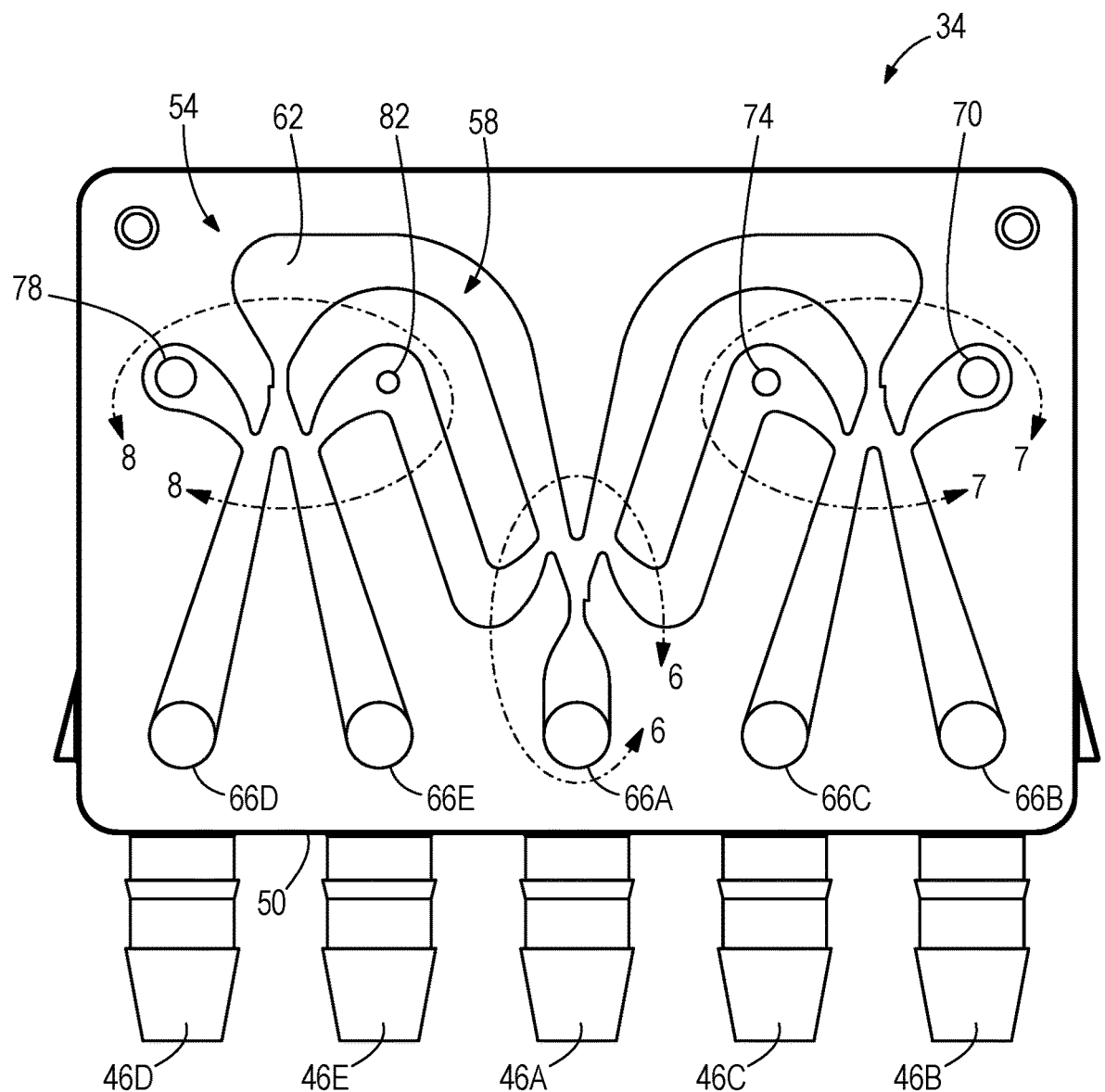
FIG. 6 is a front view of the fluidic switching module of FIG. 2, with a cover removed.

With reference to FIG. 5, an air passage 54 is formed in the base 38. In particular, the air passage 54 is partially defined by a channel 58 with a floor 62 and the cover 42. In other words, the air passage 54 is at least partially defined by the floor 62, the cover 42, and sidewalls extending between the floor 62 and the cover 42. With reference to FIG. 6, the air connections 46A-46E are fluidly connected to the air passage 54 via corresponding bores 66A-66E, which pass through the floor 62. In addition, vents 70, 74, 78, 82 (FIG. 4) to atmosphere are formed in the base 38 (more specifically, in the floor 62) to fluidly communicate the air passage 54 with atmosphere. The operation of the air passage 54 and the vents 70, 74, 78, 82 are described in greater detail below. In general, the air passage 54 and vents 70, 74, 78, 82 passively control (i.e., with no additional mechanical or electrical valves) the flow of air from the pneumatic source 14 to the bladders 18, 22, 26, 30 in a predetermine sequence.

Figure 10:
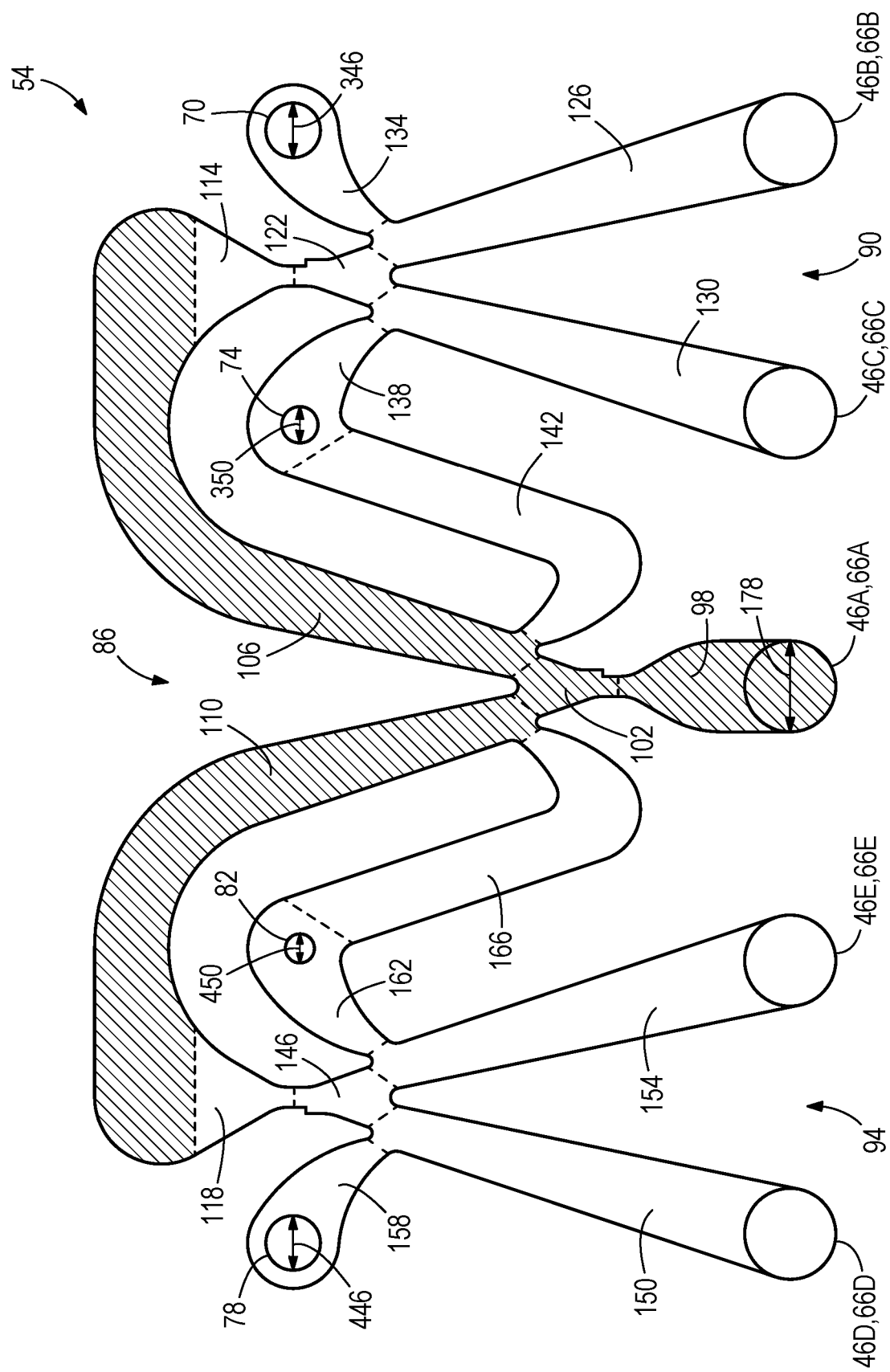
FIG. 10 is a schematic of an air passage of the fluidic switching module of FIG. 6.

With reference to FIG. 10, the air passage 54 defines a plurality of "zones" and "subsystems." In particular, the air passage 54 includes a first subsystem 86 (shaded in FIG. 10), a second subsystem 90 fluidly connected to the first subsystem 86, and a third subsystem 94 fluidly connected to the first subsystem 86. The first subsystem 86 includes an inlet zone 98 at a first upstream position including the air source connection 46A and a first splitter zone 102 positioned downstream from the inlet zone 98. The first subsystem 86 further includes a first transfer zone 106 and a second transfer zone 110. The first splitter zone 102 is fluidly connected to the first transfer zone 106 and the second transfer zone 110. The first transfer zone 106 is in fluid communication with an inlet zone 114 of the second subsystem 90. Likewise, the second transfer zone 110 is in fluid communication with an inlet zone 118 of the third subsystem 94.

With continued reference to FIG. 10, the second subsystem 90 includes the inlet zone 114 at a second upstream position and a second air splitter zone 122 fluidly connected to the inlet zone 114. The second subsystem 90 further includes a first bladder zone 126 and a second bladder zone 130 fluidly connected to the second splitter zone 122. The first bladder connection 46B is positioned within the first bladder zone 126 and the second bladder connection 46C is positioned within the second bladder zone 130. In addition, the second subsystem 90 includes a first vent zone 134 fluidly connected to the first bladder zone 126 and a second vent zone 138 fluidly connected to the second bladder zone 130. The first vent 70 is positioned within the first vent zone 134 and the second vent 74 is positioned within the second vent zone 138. Also, the second subsystem 90 includes a feedback zone 142 fluidly connected to the second vent zone 138 and the first transfer zone 106 of the first subsystem 86.

With continued reference to FIG. 10, the third subsystem 94 is similar to the second subsystem 90. The third subsystem 94 includes the inlet zone 114 at a third upstream position and a third air splitter zone 146 fluidly connected to the inlet zone 114. The third subsystem 94 further includes a third bladder zone 150 and a fourth bladder zone 154 fluidly connected to the third splitter zone 146. The third bladder connection 46D is positioned within the third bladder zone 150 and the fourth bladder connection 46E is positioned within the fourth bladder zone 154. In addition, the third subsystem 94 includes a third vent zone 158 fluidly connected to the third bladder zone 150 and a fourth vent zone 162 fluidly connected to the fourth bladder zone 154. The third vent 78 is positioned within the third vent zone 158 and the fourth vent 82 is positioned within the fourth vent zone 162. Also, the third subsystem 94 includes a feedback zone 166 fluidly connected to the fourth vent zone 162 and the second transfer zone 110 of the first subsystem 86.

Figure 7:
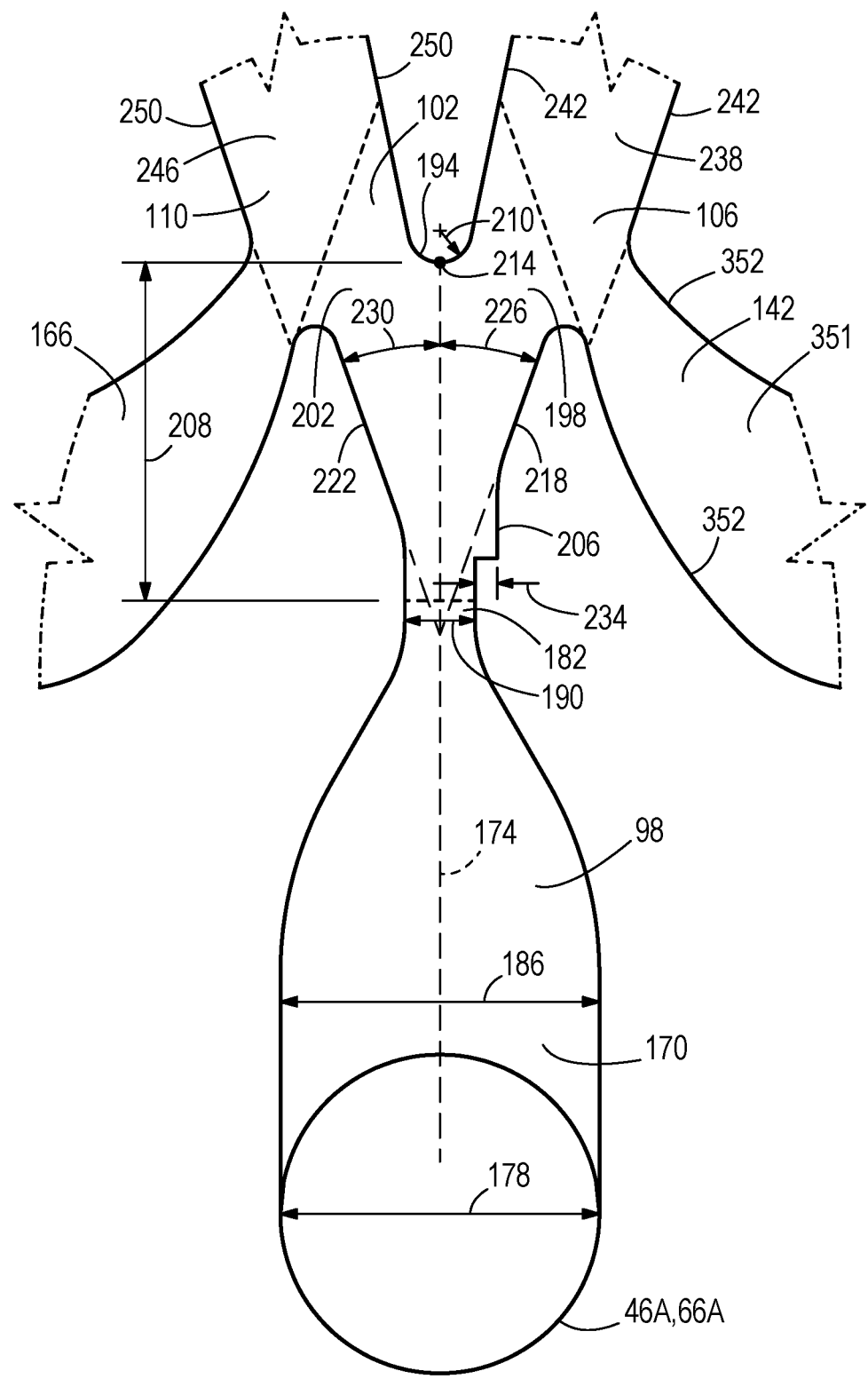
FIG. 7 is an enlarged view of a portion the fluidic switching module of FIG. 6, identified by lines 6-6.

With reference to FIGS. 6-9, the air passage 54 further defines a plurality of "passages," "walls," "dimensions," etc. The first inlet zone 98 includes an inlet passage 170 in fluid communication with the air source connector 46A and defines an inlet air stream axis 174 (FIG. 7). The bore 66A of the air source connector 46A defines a diameter 178 within a range of approximately 1.0 mm to approximately 3.0 mm. The inlet passage 170 narrows downstream to a nozzle 182. In particular, the inlet passage 170 includes an inlet width dimension 186 and the nozzle 182 defines a nozzle width dimension 190 smaller than the inlet width dimension 186. In the illustrated embodiment, the inlet width dimension 186 is equal to the diameter 178. The inlet width dimension 186 is larger than the nozzle width dimension 190 by a factor within a range of approximately 1.25 to approximately 5.5.

With reference to FIG. 7, downstream of the nozzle 182 is the first splitter zone 102. The first splitter zone 102 includes an air splitter 194, a first outlet passage 198, a second outlet passage 202, and a notch 206 (i.e., an airflow biasing feature). The air splitter 194 is positioned from the nozzle 182 a distance 208 of approximately 2.0 mm to approximately 3.0 mm. In some embodiments, the distance 208 is equal to approximately four times the nozzle width 190. The air splitter 194 is curved and defines at least one radius 210. In alternative embodiments, the air splitter is cusped. In other words, the air splitter 194 may be either concave or convex. Specifically, the air splitter 194 includes a center point 214 aligned with the inlet air stream axis 174. The first outlet passage 198 includes a first wall 218 and the second outlet passage 202 includes a second wall 222 positioned opposite the first wall 218. The first wall 218 is oriented with respect to the inlet air stream axis 174 to define a first angle 226. Likewise, the second wall 222 is oriented with respect to the inlet air stream axis 174 to define a second angle 230. Both the first angle 226 and the second angle 230 are within a range of approximately 15 degrees to approximately 25 degrees. In some embodiments, the first angle 226 is equal to the second angle 230.

The notch 206 is positioned upstream of the first outlet passage 198 and downstream of the nozzle 182. More specifically, the notch 206 is positioned between the nozzle 182 and the first wall 218. In other words, the notch 206 replaces a portion of the first wall 218. As explained in further detail below, the notch 206 biases the airflow from the nozzle 182 to initially flow through the first outlet passage 198 before flowing through the second outlet passage 202. The notch 206 defines a dimension 234 that is within a range of approximately 0.025 mm to approximately 0.50 mm. The greater the notch size the greater the biasing effect toward the corresponding output channel 198. However, a notch size too great can create airflow instability. In alternative embodiments, the notch 206 may be a groove, slot, or other suitable geometric feature in the wall 218 to generate an area of low pressure.

With continued reference to FIG. 7, downstream of the first splitter zone 102 are both the first and second transfer zones 106, 110. In particular, the first outlet passage 198 is in fluid communication with the first transfer zone 106. Likewise, the second outlet passage 202 is in fluid communication with the second transfer zone 110. The first transfer zone 106 includes a transfer passage 238 with two curved walls 242 and the second transfer zone 110 similarly includes a transfer passage 246 with two curved walls 250.

Figure 8:
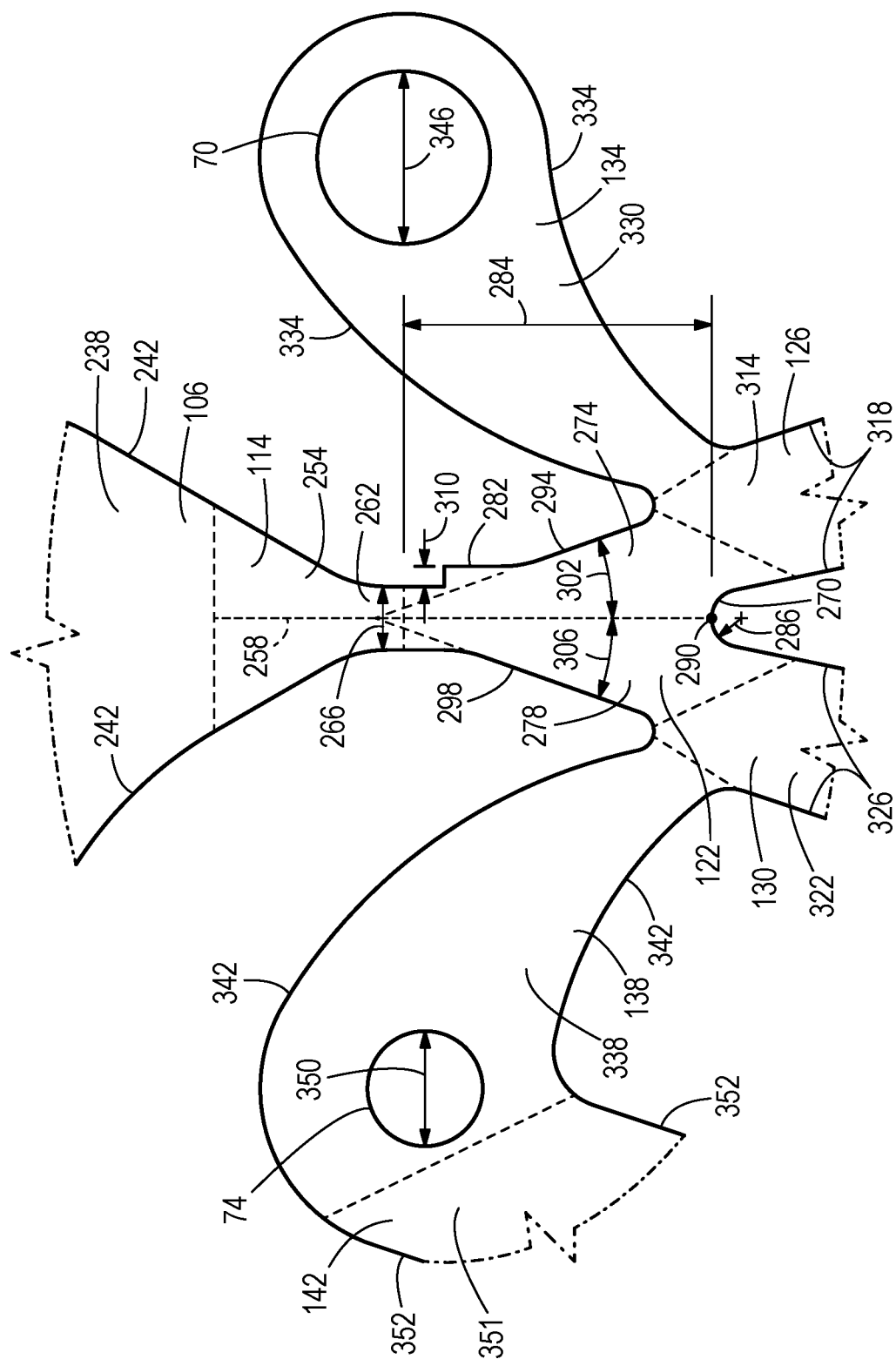
FIG. 8 is an enlarged view of a portion the fluidic switching module of FIG. 6, identified by lines 7-7.

Downstream of the first transfer zone 106 is the inlet zone 114 of the second subsystem 90. With reference to FIG. 8, the transfer passage 238 is in fluid communication with an inlet passage 254 that defines an air stream axis 258. The inlet passage 254 narrows to a nozzle 262 that is narrower than the nozzle 182. In particular, the nozzle 262 defines a nozzle width dimension 266 smaller than the nozzle width 190. The nozzle width dimension 266 is equivalent to or smaller than the nozzle width 190 by a factor within a range of approximately 100% to approximately 50%.

Downstream of the nozzle 262 is the second splitter zone 122. The second splitter zone 122 includes an air splitter 270, a first outlet passage 274, a second outlet passage 278, and a notch 282. The air splitter 270 is positioned from the nozzle 262 a distance 284 of approximately 2.0 mm to approximately 3.0 mm. In some embodiments, the distance 284 is equal to approximately four times the nozzle width 266. The air splitter 270 is curved and defines at least one radius 286. Like the air splitter 194, the air splitter 270 may be either concave or convex. Specifically, the air splitter 270 includes a center point 290 aligned with the inlet air stream axis 258. The first outlet passage 274 includes a first wall 294 and the second outlet passage 278 includes a second wall 298 positioned opposite the first wall 294. The first wall 294 is oriented with respect to the inlet air stream axis 258 to define a first angle 302. Likewise, the second wall 298 is oriented with respect to the inlet air stream axis 258 to define a second angle 306. Both the first angle 302 and the second angle 306 are within a range of approximately 15 degrees to approximately 25 degrees. In some embodiments, the first angle 302 is equal to the second angle 306.

The notch 282 is positioned upstream of the first outlet passage 274. More specifically, the notch 282 is positioned between the nozzle 262 and the first wall 294. In other words, the notch 282 replaces a portion of the first wall 294. The notch 282 defines a dimension 310 that is within a range of approximately 0.025 mm to approximately 0.5 mm. As explained in further detail below, the notch 282 biases the airflow from the nozzle 262 to initially flow through the first outlet passage 274 before flowing through the second outlet passage 278.

Downstream of the second splitter zone 122 are the first bladder zone 126, the second bladder zone 130, the first vent zone 134 and the second vent zone 138. In particular, the first outlet passage 274 is in fluid communication with the first bladder zone 126 and the first vent zone 134. Likewise, the second outlet passage 278 is in fluid communication with the second bladder zone 130 and the second vent zone 138. The first bladder zone 126 includes a passage 314 with two opposing walls 318 and the first bladder connector 46B. Similarly, the second bladder zone 130 includes a passage 322 with two opposing walls 326 and the second bladder connector 46C. The first vent zone 134 includes a passage 330 with two curved walls 334 and the first vent 70. Similarly, the second vent zone 138 includes a passage 338 with two curved walls 342 and the second vent 74. The first vent 70 defines a first vent diameter 346 and the second vent 74 defines a second vent diameter 350.

With reference to FIGS. 7, 8, and 10, the feedback zone 142 includes a feedback passage 351 including two curved walls 352. The feedback passage 254 is in fluid communication with the passage 338 of the second vent zone 138, and is in fluid communication with the transfer passage 238 of the first transfer zone 106. As explained in greater detail below, the feedback zone 142 provides a passive way to switch airflow from the second subsystem 90 to the third subsystem 94.

Figure 9:
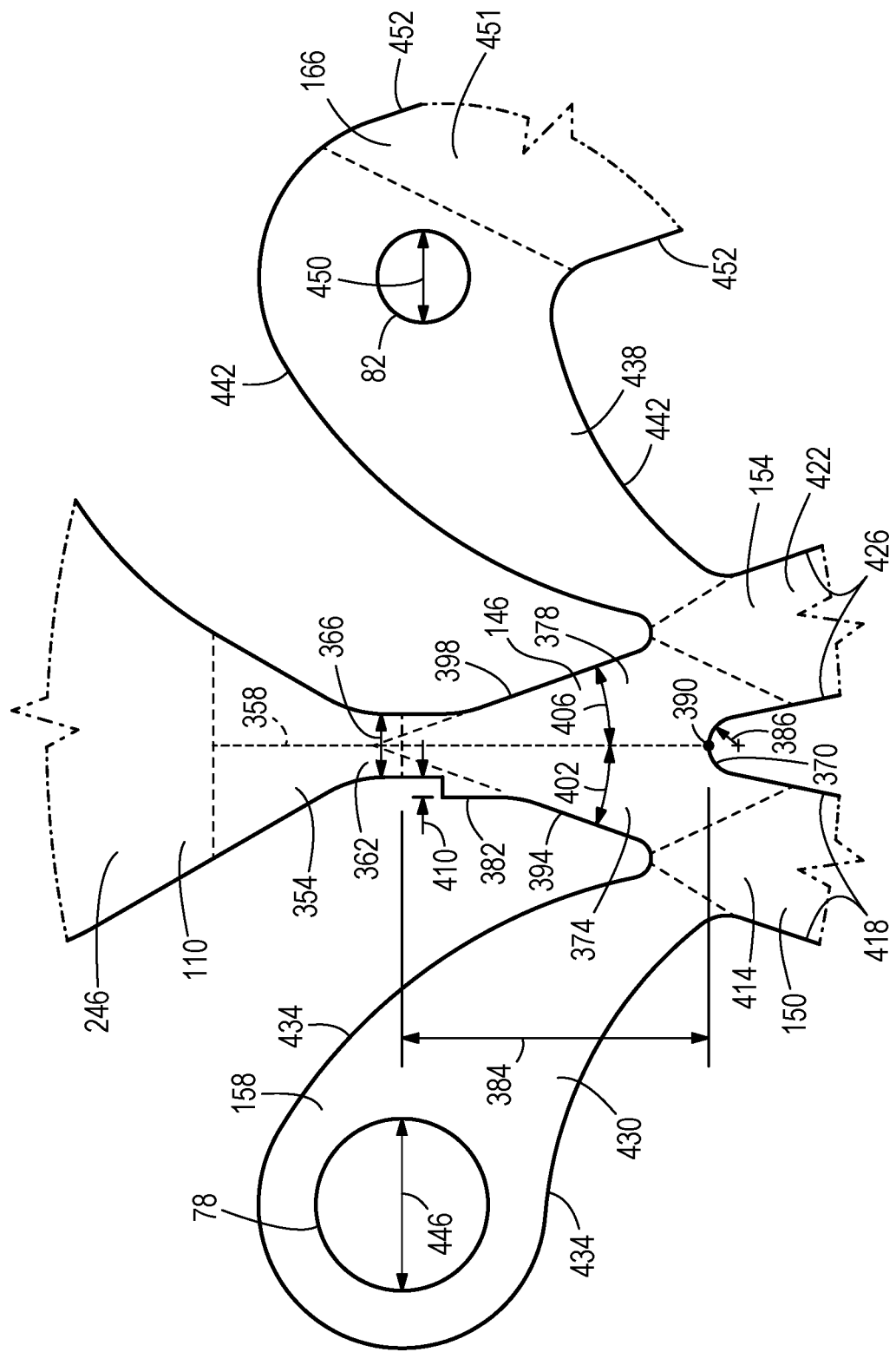
FIG. 9 is an enlarged view of a portion of the fluidic switching module of FIG. 6, identified by lines 8-8.

The third subsystem 94 is similar to the second subsystem 90. In some embodiments, the third subsystem 94 is the same as (i.e., identical to) the second subsystem 90. Downstream of the second transfer zone 110 is the inlet zone 118 of the third subsystem 94. With reference to FIG. 9, the transfer passage 246 is in fluid communication with an inlet passage 354 that defines an air stream axis 358. The inlet passage 354 narrows to a nozzle 362 that is narrower than the nozzle 182. In particular, the nozzle 362 defines a nozzle width dimension 366 smaller than the nozzle width 190. The nozzle width dimension 366 is equivalent to or smaller than the nozzle width 190 by a factor within a range of approximately 100% to approximately 50%.

Downstream of the nozzle 362 is the third splitter zone 146. The third splitter zone 146 includes an air splitter 370, a first outlet passage 374, a second outlet passage 378, and a notch 382. The air splitter 370 is positioned from the nozzle 362 a distance 384 of approximately 2.0 mm to approximately 3.0 mm. In some embodiments, the distance 384 is equal to approximately four times the nozzle width 366. The air splitter 370 is curved and defines at least one radius 386. Like the air splitter 270, the air splitter 370 may be either concave or convex. Specifically, the air splitter 370 includes a center point 390 aligned with the inlet air stream axis 358. The first outlet passage 374 includes a first wall 394 and the second outlet passage 378 includes a second wall 398 positioned opposite the first wall 394. The first wall 394 is oriented with respect to the inlet air stream axis 358 to define a first angle 402. Likewise, the second wall 398 is oriented with respect to the inlet air stream axis 358 to define a second angle 406. Both the first angle 402 and the second angle 406 are within a range of approximately 15 degrees to approximately 25 degrees. In some embodiments, the first angle 402 is equal to the second angle 406.

The notch 382 is positioned upstream of the first outlet passage 374. More specifically, the notch 382 is positioned between the nozzle 362 and the first wall 394. In other words, the notch 382 replaces a portion of the first wall 394. The notch 382 defines a dimension 410 that is within a range of approximately 0.025 mm to approximately 0.5 mm. As explained in further detail below, the notch 382 biases the airflow from the nozzle 362 to initially flow through the first outlet passage 374 before flowing through the second outlet passage 378.

Downstream of the third splitter zone 146 are the third bladder zone 150, the fourth bladder zone 154, the third vent zone 158 and the fourth vent zone 162. In particular, the first outlet passage 374 is in fluid communication with the third bladder zone 150 and the third vent zone 158. Likewise, the second outlet passage 378 is in fluid communication with the fourth bladder zone 154 and the fourth vent zone 162. The third bladder zone 150 includes a passage 414 with two opposing walls 418 and the third bladder connector 46D. Similarly, the fourth bladder zone 154 includes a passage 422 with two opposing walls 426 and the fourth bladder connector 46E. The third vent zone 158 includes a passage 430 with two curved walls 434 and the third vent 78. Similarly, the fourth vent zone 162 includes a passage 438 with two curved walls 442 and the fourth vent 82. The third vent 78 defines a third vent diameter 446 and the fourth vent 82 defines a fourth vent diameter 450.

The feedback zone 166 includes a feedback passage 451 including two curved walls 452. The feedback passage 451 is in fluid communication with the passage 438 of the fourth vent zone 162, and is in fluid communication with the transfer passage 246 of the second transfer zone 110. As explained in greater detail below, the feedback zone 166 provides a passive way to switch airflow from the third subsystem 94 to the second subsystem 90.

In operation, the pump 14 provides a source of pressurized air at the air connector 46A. The air passage 54 passively controls the source of pressurized air to cyclically and sequentially inflate and deflate the bladders 18, 22, 26, 30. In other words, the air passage 54 inflates and deflates each of the bladders 18, 22, 26, 30 in a predetermined sequence with no additional electrical or mechanical valves, switches, or other external controls. In the illustrated embodiment, the predetermined sequence includes out of unison inflation of each of the bladders 18, 22, 26, 30 (i.e., inflating the first bladder first, and then inflating the second bladder, and then inflating the third bladder, etc.).

Figure 11A:
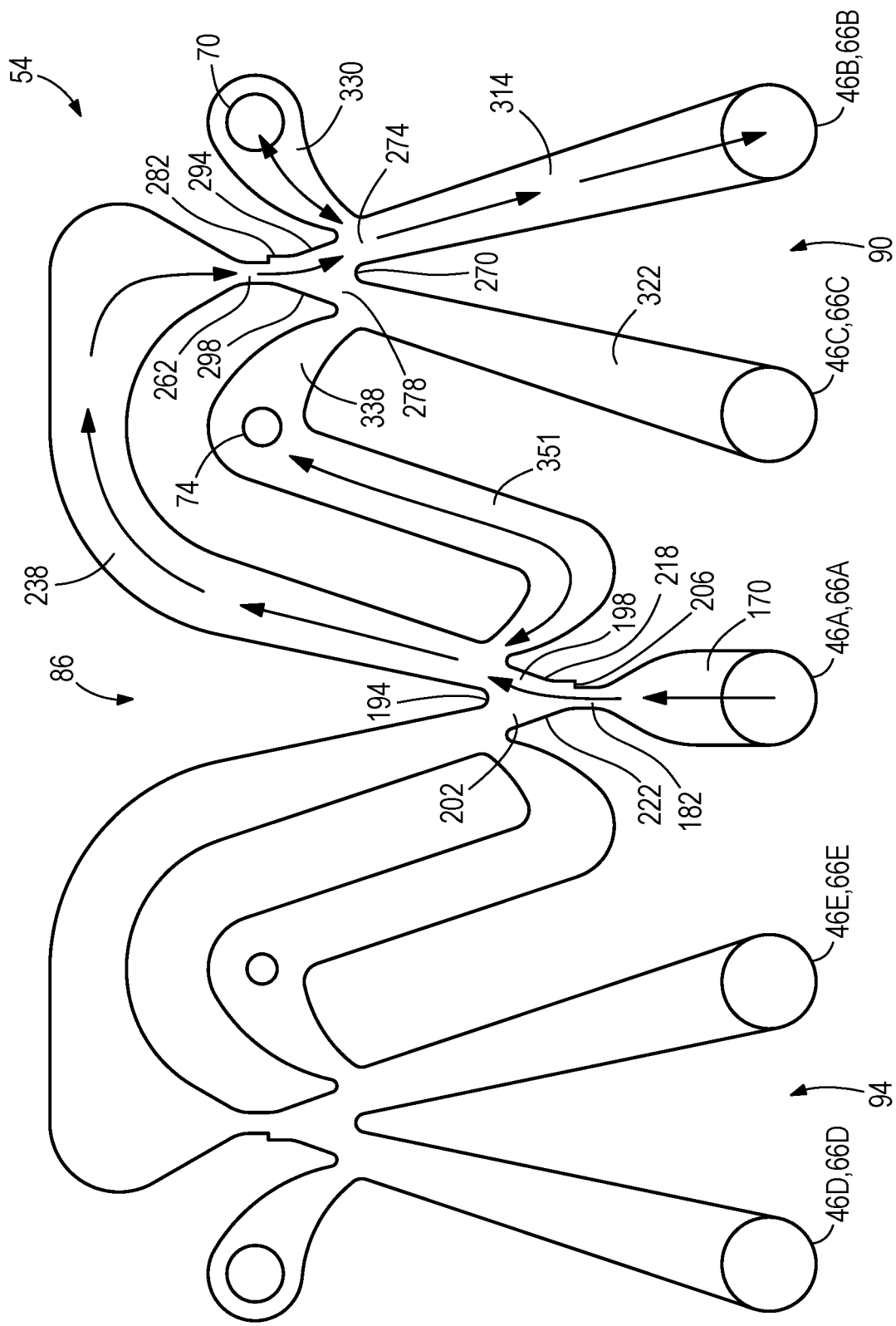
FIGS. 11A-11E are schematic representations of airflow operation through the fluidic switching module of FIG. 6.

With reference to FIG. 11A, pressurized air from the pump 14 is received by the fluidic switching module 34 and enters the inlet passage 170 of the air passage 54. The pressure in the input passage 170 (i.e., the inlet pressure) dictates the maximum output pressure and output flow rate possible to the bladders 18, 22, 26, 30. The airflow accelerates as the inlet passage 170 narrows to form the nozzle 182. An air velocity too fast creates excessive turbulence, which degrades operation and stability of the module 34.

As the pressurized air exits the nozzle 182, the airflow contacts the first air splitter 194. The first splitter 194 divides the airflow between one of the two outlet passages 198, 202. Initially, a low pressure field develops along both of the adjacent angled walls 218, 222 due to entrainment of the surrounding air. However, the low pressure fields developing along both of the adjacent angle walls 218, 222 are different as a result of the notch 206 in the first wall 218. In particular, the low pressure field along the first wall 218 is stronger than the low pressure field along the second wall 222. The difference in low pressure fields deflects the airflow toward the first wall 218 with the biasing notch 206 and the corresponding first outlet passage 198. The physical phenomenon that causes the airflow to attach to one of the walls 218, 222 is known as the Coanda effect. The Coanda effect is the tendency of a jet of fluid emerging from an orifice (e.g., the nozzle 182) to follow an adjacent flat or curved surface (e.g., the wall 218) and to entrain fluid from the surroundings. As such, the airflow initially flows from the first air splitter 194 to the second subsystem 90. The angles 226, 230 of the walls 218, 222 (FIG. 7) with respect to the airflow centerline 174 are designed to control the strength of the low pressure fields and the point at which the airstream attaches to the walls 218, 222 downstream.

With continued reference to FIG. 11A, as the airflow moves through the transfer passage 238, the airflow initially draws in an additional inflow of air through the feedback passage 351 due to the Venturi effect. Specifically, additional airflow is drawn into the transfer passage 238 from the vent 74. However, when the transfer passage 238 reaches approximately 15% to approximately 25% of the input pressure at the nozzle 182, the airflow through the feedback passage 351 reverses to flow towards the vent 74. In other words, airflow through the transfer passage 238 initially creates a Venturi effect, drawing in additional airflow through the feedback passage 351, until the pressure in the transfer passage 238 reaches a threshold (e.g., approximately 28% of the inlet pressure). As such, this variable direction airflow is illustrated in FIG. 11A as a double sided arrow (i.e., initially flowing towards the transfer passage 238 and then flowing towards the second vent passage 338). The transfer passage 238 reaches and temporarily stabilizes at approximately 40% to approximately 60% of the input pressure, and provides a temporarily stable inlet pressure to the second subsystem 90.

With continued reference to FIG. 11A, the second air splitter 270 of the second subsystem 90 operates in much the same way as the first air splitter 194 of the first subsystem 86. In particular, low pressure fields develop along both of the adjacent angled walls 294, 298 due to entrainment of the surrounding air. The differential between the low pressure fields develops because of the biasing notch 282, and the air stream from the nozzle 262 deflects toward the angled wall 294 and the first outlet passage 274. In other words, a stronger low pressure area forms on the wall 294 with the notch 282, biasing the airflow in that direction. As before, wall attachment occurs due to the Coanda effect and the airflow is directed toward the first bladder output passage 314, inflating the first bladder 18.

As the first bladder 18 starts inflating, additional air is drawn into the first bladder passageway 314 from the first vent passage 330 due to the Venturi effect. The additional airflow from the vent 70 due to the Venturi effect increases the airflow in the passage 314 by a factor of approximately 1.0 to approximately 1.1. When the first bladder 18 reaches approximately 50% of the max pressure, the airflow in the first vent passage 330 reverses. As such, the airflow through first vent passage 330 is illustrated in FIG. 11A as a double-sided arrow. The first bladder 18 reaches a maximum pressure at approximately one-third of the input pressure. When the first bladder 18 reaches the maximum pressure, the airflow at the second air splitter 270 is deflected and the airflow switches to the second output passage 278 and the second bladder passage 322, corresponding to the second bladder 22.

Figure 11B:
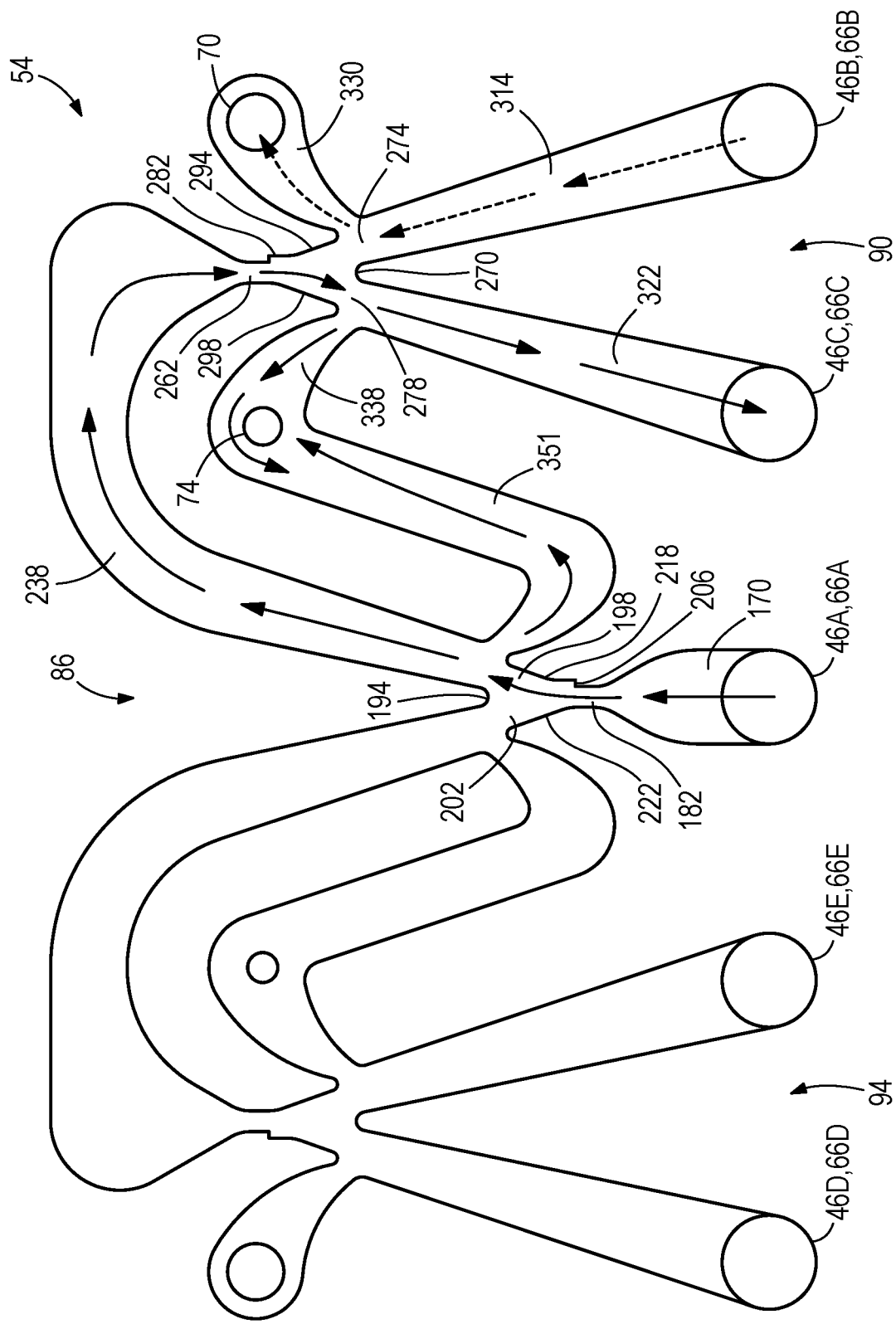

With reference to FIG. 11B, backpressure from the inflated first bladder 18 causes the airflow at the second air splitter 270 to switch and deflect towards the second outlet passage 278. In the state shown in FIG. 11B, the first bladder 18 now begins to deflate through the first vent passage 330 and the first vent 70 and the second bladder 22 begins to inflate. As the second bladder 22 inflates, feedback to the first subsystem 86 occurs through an increase in the pressure in the feedback passage 351, which is connected between the second vent passage 338 and the first transfer passage 238. When the second bladder 22 reaches a pressure of approximately 35% to approximately 50% of the input pressure, the pressure in the feedback passage 351 is high enough to cause the airflow at the first air splitter 194 to switch and deflect towards the second outlet passage 202. In other words, when the pressure in the second bladder 22 reaches a threshold, the pressure feedback through the feedback passage 351 causes the airflow at the first air splitter 194 to defect and switch to the second output passage 202, corresponding to the third subsystem 94.

Figure 11C:
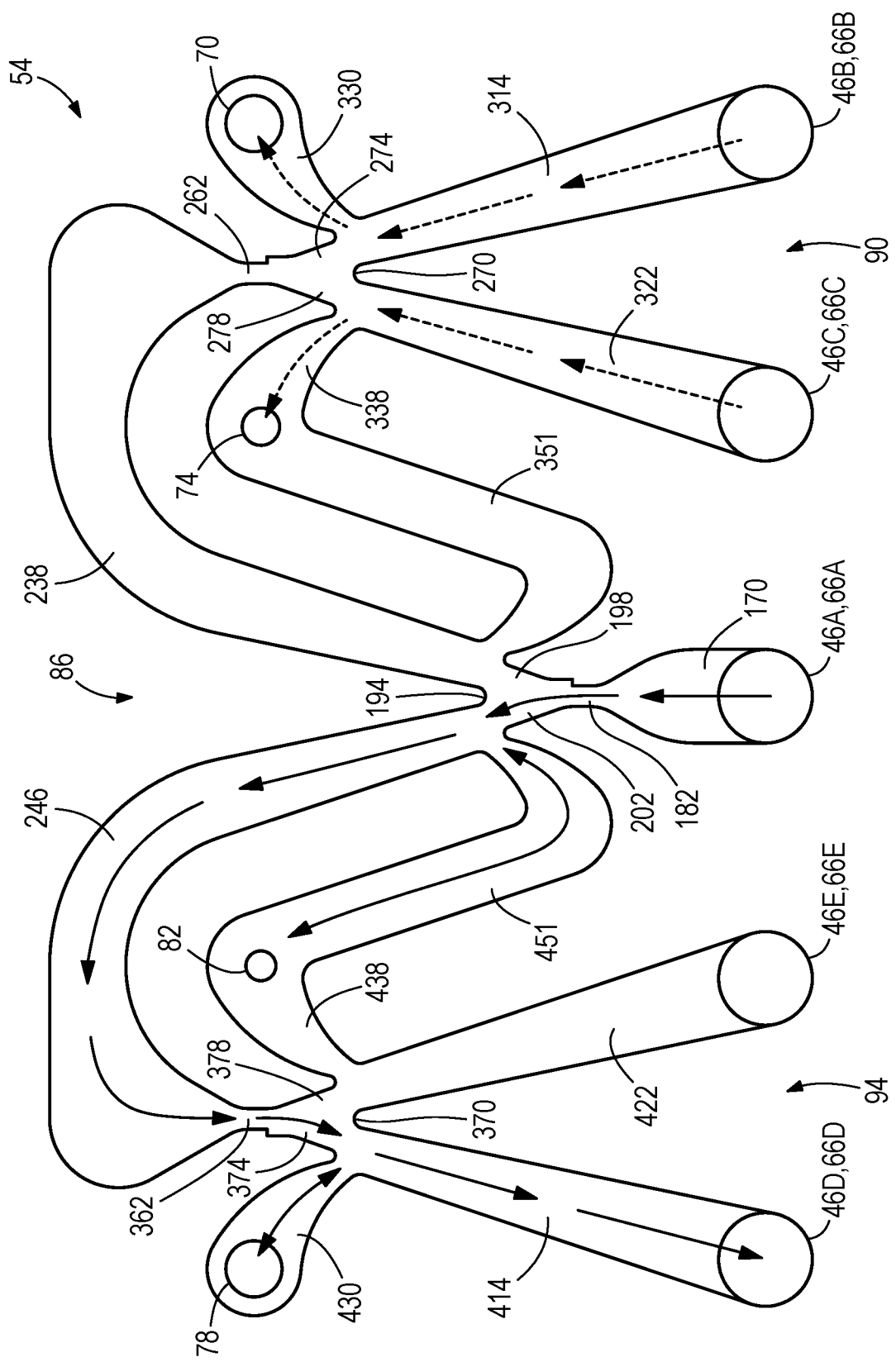

With reference to FIG. 11C, with both the first bladder 18 and the second bladder 22 deflating (illustrated with dashed arrows), the airflow is deflected at the first air splitter 194 to move through the transfer passage 110 toward the third subsystem 94. As air moves through the transfer passage 110, the airflow initially draws in an additional inflow of air through the feedback passage 451 due to the Venturi effect. However, when the transfer passage 246 reaches approximately 15% to approximately 25% of the input pressure, the airflow through the feedback passage 451 reverses to flow towards the vent 82. In other words, airflow through the transfer passage 246 initially creates a Venturi effect, drawing in additional airflow through the feedback passage 451, until the pressure in the transfer passage 246 reaches a threshold. As such, this variable airflow is illustrated in FIG. 11C as a double sided arrow (i.e., initially flowing towards the transfer passage 246 and then flowing towards the fourth vent passage 438). The transfer passage 246 reaches and temporarily stabilizes at approximately 40% to approximately 60% of the input pressure, and provides a temporarily stable inlet pressure to the third subsystem 94.

With continued reference to FIG. 11C, the third air splitter 370 of the third subsystem 94 operates in much the same way as the second air splitter 270 of the second subsystem 90. In particular, low pressure fields develop along both of the adjacent angled walls 394, 398 due to entrainment of the surrounding air. The differential between the low pressure fields develops because of the biasing notch 382, and the air stream from the nozzle 362 deflects toward the angled wall 394 and the first outlet passage 374. In other words, a stronger low pressure area forms on the wall 394 with the notch 382, biasing the airflow in that direction. As before, wall attachment occurs due to the Coanda effect and the airflow is directed toward the third bladder output passage 414, inflating the third bladder 26.

As the third bladder 26 starts inflating, additional air is drawn into the third bladder passageway 414 from the third vent passage 430 due to the Venturi effect. The additional airflow from the third vent 78 due to the Venturi effect increases the airflow in the passage 414 by a factor of approximately 1.0 to approximately 1.1. When the third bladder 26 reaches approximately 50% of the max pressure, the airflow in the third vent passage 430 reverses. As such, the airflow through the third vent passage 430 is illustrated in FIG. 11C as a double-sided arrow. The third bladder 26 reaches a maximum pressure at approximately one-third of the input pressure. When the third bladder 26 reaches the maximum pressure, the airflow at the third air splitter 370 is deflected and the airflow switches to the second output channel 378 and the fourth bladder passage 422, corresponding to the fourth bladder 30.

Figure 11D:
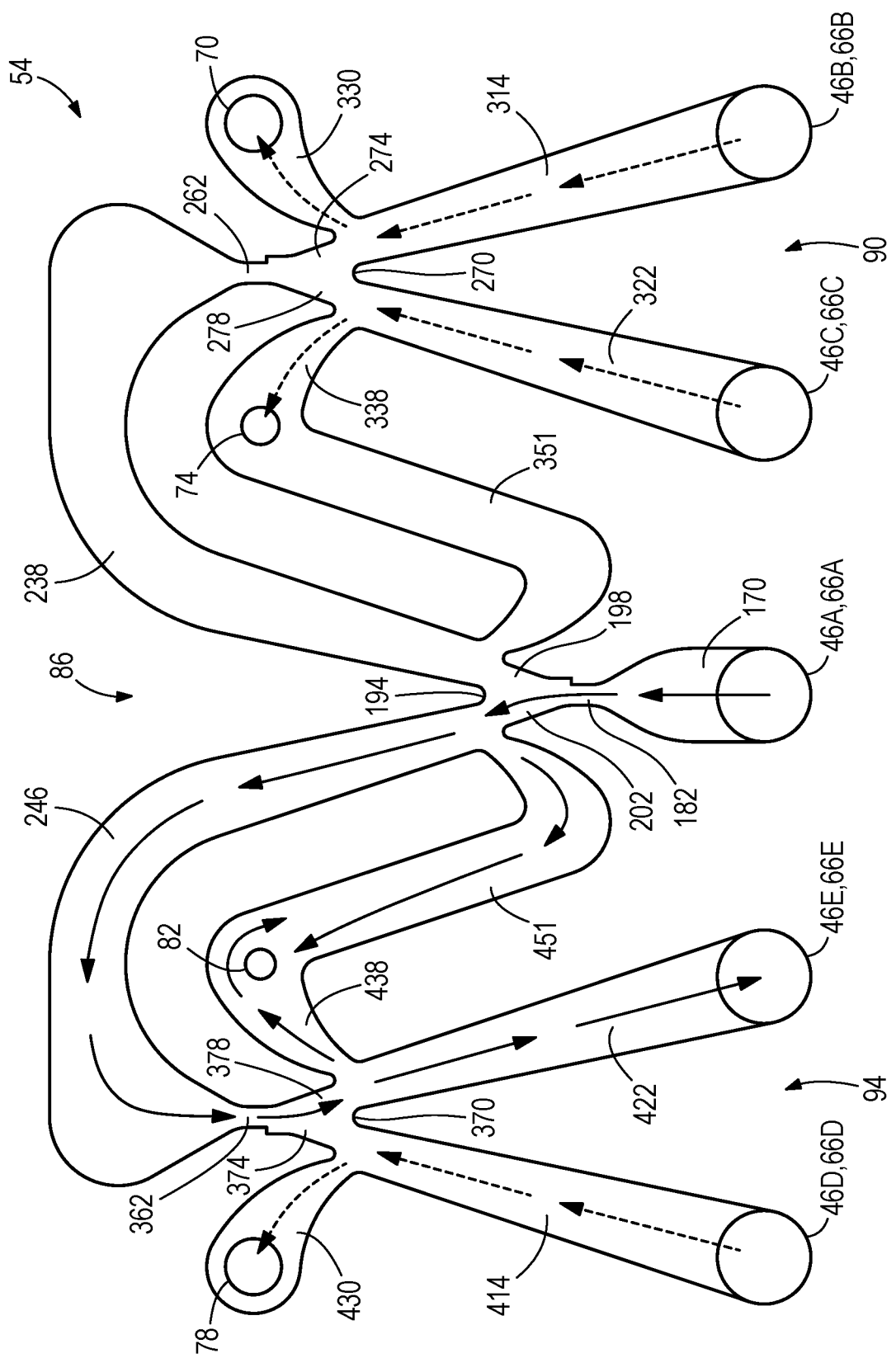

With reference to FIG. 11D, backpressure from the third bladder 26 causes the airflow at the third air splitter 370 to deflect towards the second outlet passage 378. In the state shown in FIG. 11D, the third bladder 26 deflates through the third vent 78 and the fourth bladder 30 is inflating. As the fourth bladder 30 inflates, feedback to the first subsystem 86 occurs through an increase in the pressure in the feedback passage 451, which is connected between the fourth vent passage 438 and the second transfer passage 246. When the fourth bladder 30 reaches a pressure of approximately 35% to approximately 50% of the input pressure, the pressure in the feedback passage 451 is high enough to cause the airflow at the first air splitter 194 to switch back to flowing towards the first outlet passage 198. In other words, when the pressure in the fourth bladder 30 reaches a threshold, the feedback through the feedback passage 451 causes the airflow at the first air splitter 194 to defect and switch to the first output channel 198, corresponding to the second subsystem 90.

Figure 11E:
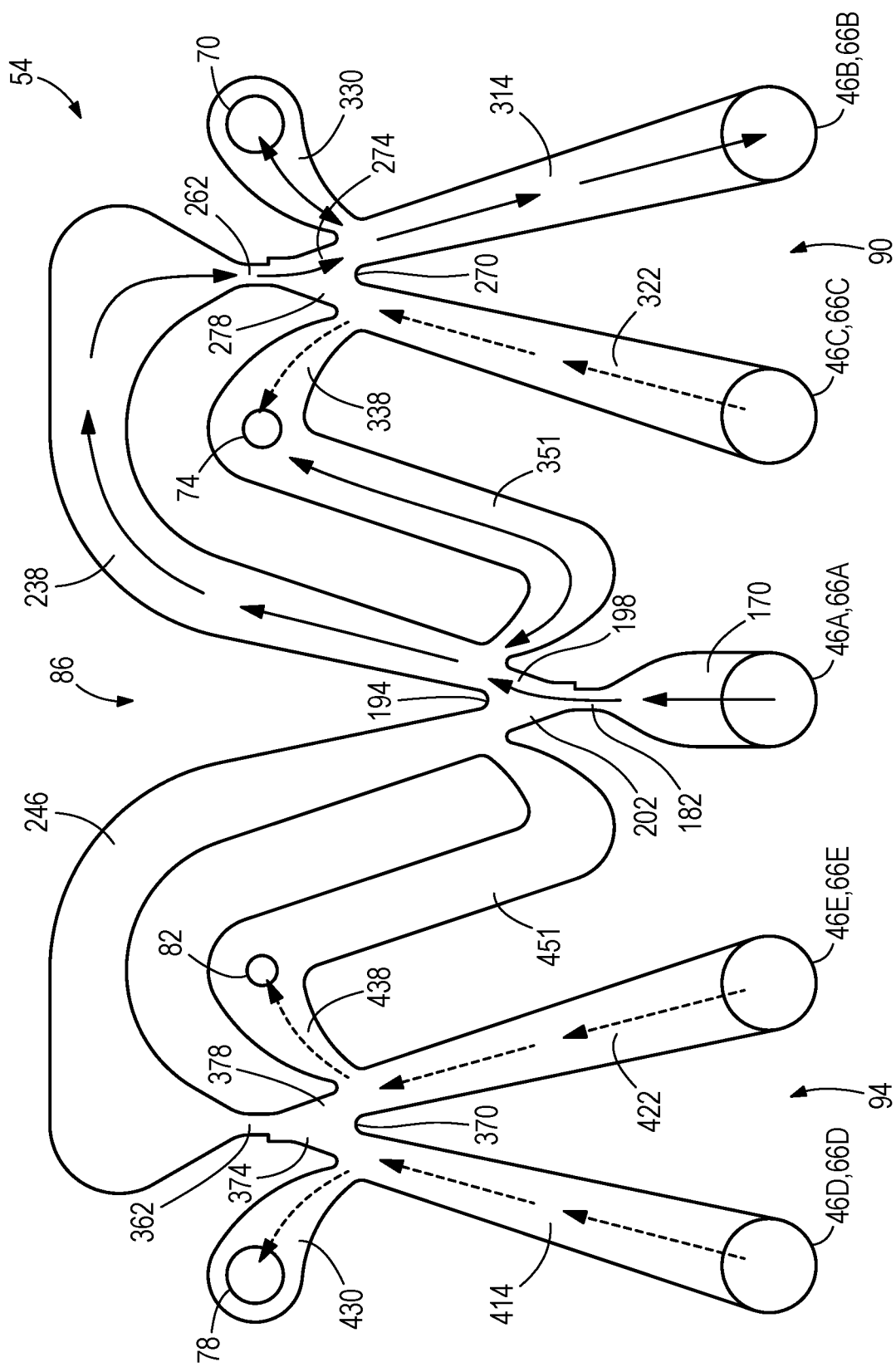

With reference to FIG. 11E, the operation of the fluidic module 34 begins another cycle of inflating and deflating the bladders 18, 22, 26, 30. In particular, the state shown in FIG. 11E is similar to the state shown in FIG. 11A in that airflow is biased to inflate the first bladder 18. However, FIG. 11E differs in that the remaining bladders 22, 26, 30 are deflating while the first bladder 18 is inflating. The inflation and deflation of the bladders 18, 22, 26, 30 continues as long as there is an inlet pressure provided at the air connector 46A. In other words, the cyclical inflation and deflation of the bladders 18, 22, 26, 30 repeats indefinitely in the predefined sequence until the pressurized air source 14 is turned off. As such, the fluidic module 34 provides a defined sequential continuous massage effect via inflation and deflation of bladders 18, 22, 26, 30 when a pressurized air is supplied to the inlet connector 46A.

In contrast, conventional pneumatic massage systems in automobile seats use a pneumatic pump that supplies pressurized air to an electro-mechanical valve module that controls the massage sequence and cycle time according to a predefined massage program. Each independent bladder requires a separate electro-mechanical valve within the module to control the inflation and deflation. Basic massage systems typically have three bladders, while high end massage systems can have up to twenty bladders. Due to the complexity and the electronics required to control them, the cost of an electro-mechanical module is expensive. This makes it difficult, for example, to outfit lower-cost vehicles with massage. In other words, prior art designs include modules that are very complex and need communication with vehicle electronic systems, which increases the development and production costs.

The fluidic module 34 advantageously does not rely on the use of electronics or moving mechanical components for operation or control. This makes the module 34 reliable, repeatable, and cost efficient. A defined massage sequence (i.e., cyclical inflation/deflation of the bladders 18, 22, 26, 30) is achieved through the use of cascading vented fluidic amplifiers (i.e., subsystems 86, 90, 94) that are biased to follow a defined sequence or order. The sequence is further defined by the use of feedback zones 146, 166 that force switching of the airflow at predefined static pressures. The vented fluidic amplifiers were chose to eliminate sensitivity to false switching under load and also provide the additional benefit of providing a passage for automatic deflation when the operation of the pneumatic system 10 has completed.

FIGS. 12A-19 illustrate exemplary bladder subassemblies 500a-500k that may be used with the pneumatic system 10 of FIG. 1 and inflated in a sequence controlled by the adjustment device(s) 36 and fluidic module(s) 34. For example, each of the bladders 18, 22, 26, 30 may be part of a particular bladder subassembly 500a-500k, which in the illustrated embodiments, have a multi-part or multi-sectored bladder configuration. Each bladder subassembly 500a-500k may be described, therefore, as a multi-chambered bladder or as a plurality of bladders.

Figure 12A:
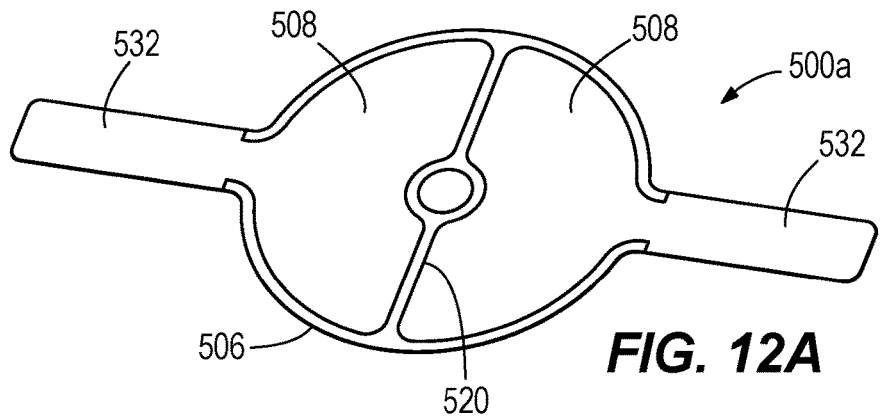
FIG. 12A is a perspective view of a bladder subassembly according to one embodiment that may be used with the pneumatic system of FIG. 1.

FIG. 12A illustrates a bladder subassembly 500a according to one embodiment. The bladder subassembly 500a includes a body 506 with two air chambers 508 separated by a weld 520. The air chambers 508 have generally equal volumes in the illustrated embodiment. Alternatively, the chambers 508 may have different volumes. A passage 532 extends from each chamber 508 and provides a pathway for fluid flow into and out of the respective chambers 508. In the illustrated embodiment, the body 506 is made of a flexible, polymer film. For example, the body 506 may be made from polypropylene, polyethylene, nylon, PVC, EVA, or any other air-tight, flexible, and suitably strong material. The welds 520 may be formed by ultrasonic welding, hot air welding, solvent bonding, or any other process suitable for permanently fusing portions of the body 506 together to form the air-tight chambers 508.

Figure 12B:
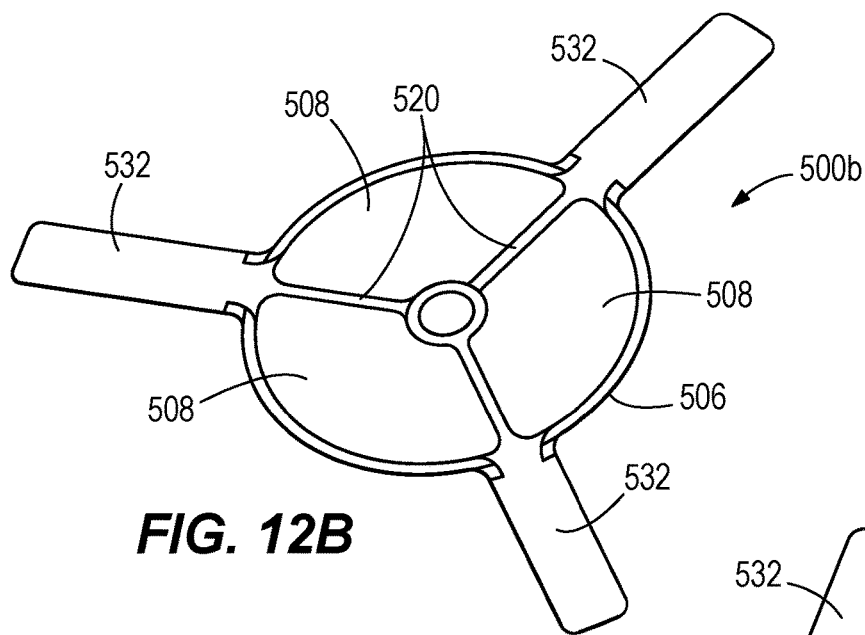
FIG. 12B is a perspective view of a bladder subassembly according to another embodiment that may be used with the pneumatic system of FIG. 1.

FIG. 12B illustrates a bladder subassembly 500b according to another embodiment. The bladder subassembly 500b is similar to the bladder subassembly 500a but includes a body 506 with three air chambers 508, each having generally the same volume. The air chambers 508 are equally spaced in a circumferential direction of the bladder subassembly 500b. Alternatively, the chambers 508 may have different volumes.

Figure 12C:
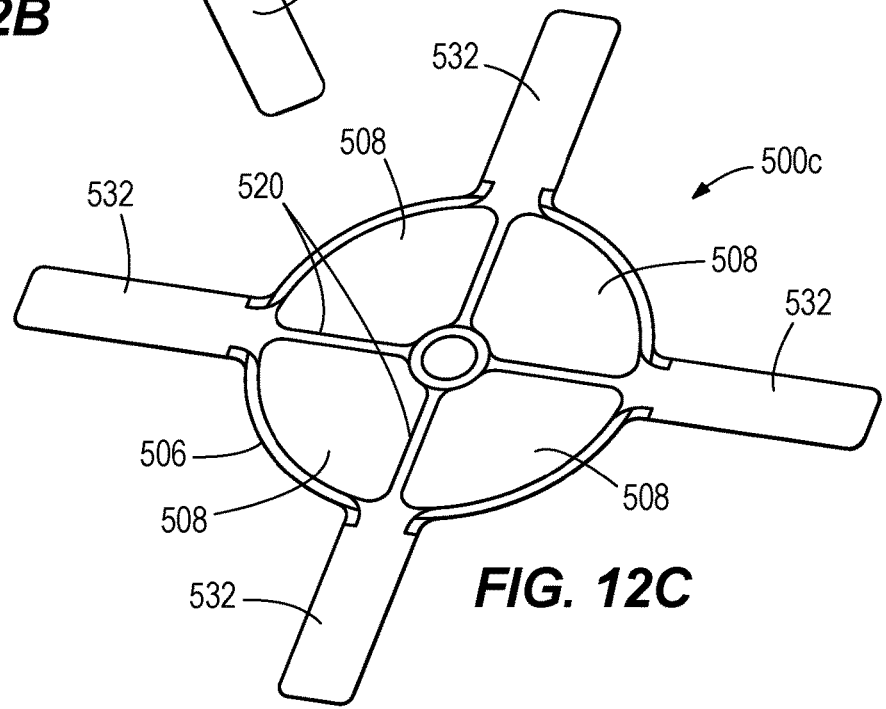
FIG. 12C is a perspective view of a bladder subassembly according to another embodiment that may be used with the pneumatic system of FIG. 1.

FIG. 12C illustrates a bladder subassembly 500c according to another embodiment. The bladder subassembly 500c is similar to the bladder subassemblies 500a, 500b but includes a body 506 with four air chambers 508, each having generally the same volume. The air chambers 508 are equally spaced in a circumferential direction of the bladder subassembly 500c. Alternatively, the chambers 508 may have different volumes.

Figure 13A:
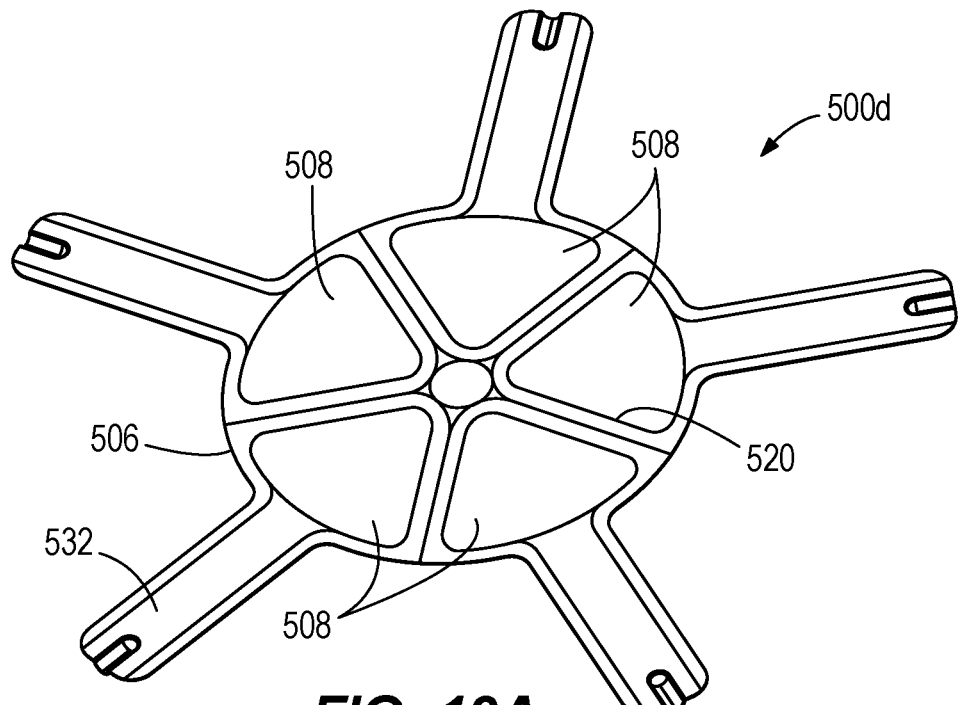
FIG. 13A is a perspective view of a bladder subassembly according to another embodiment that may be used with the pneumatic system of FIG. 1.

FIG. 13A illustrates a bladder subassembly 500d according to another embodiment. The bladder subassembly 500d is similar to the bladder subassemblies 500a, 500b, 500c but includes a body 506 with five air chambers 508, each having generally the same volume. The air chambers 508 are equally spaced in a circumferential direction of the bladder subassembly 500d. Alternatively, the chambers 508 may have different volumes.

Figure 13B:
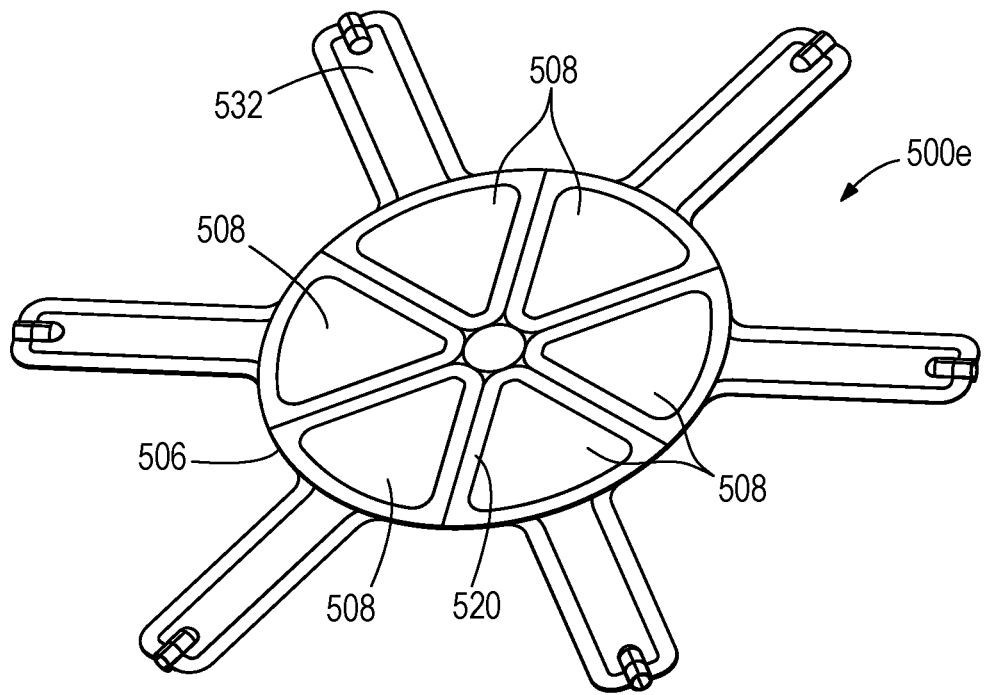
FIG. 13B is a perspective view of a bladder subassembly according to another embodiment that may be used with the pneumatic system of FIG. 1.

FIG. 13B illustrates a bladder subassembly 500e according to another embodiment. The bladder subassembly 500e is similar to the bladder subassemblies 500a, 500b, 500c, 500d but includes a body 506 with six air chambers 508, each having generally the same volume. The air chambers 508 are equally spaced in a circumferential direction of the bladder subassembly 500e. Alternatively, the chambers 508 may have different volumes.

Figure 22:
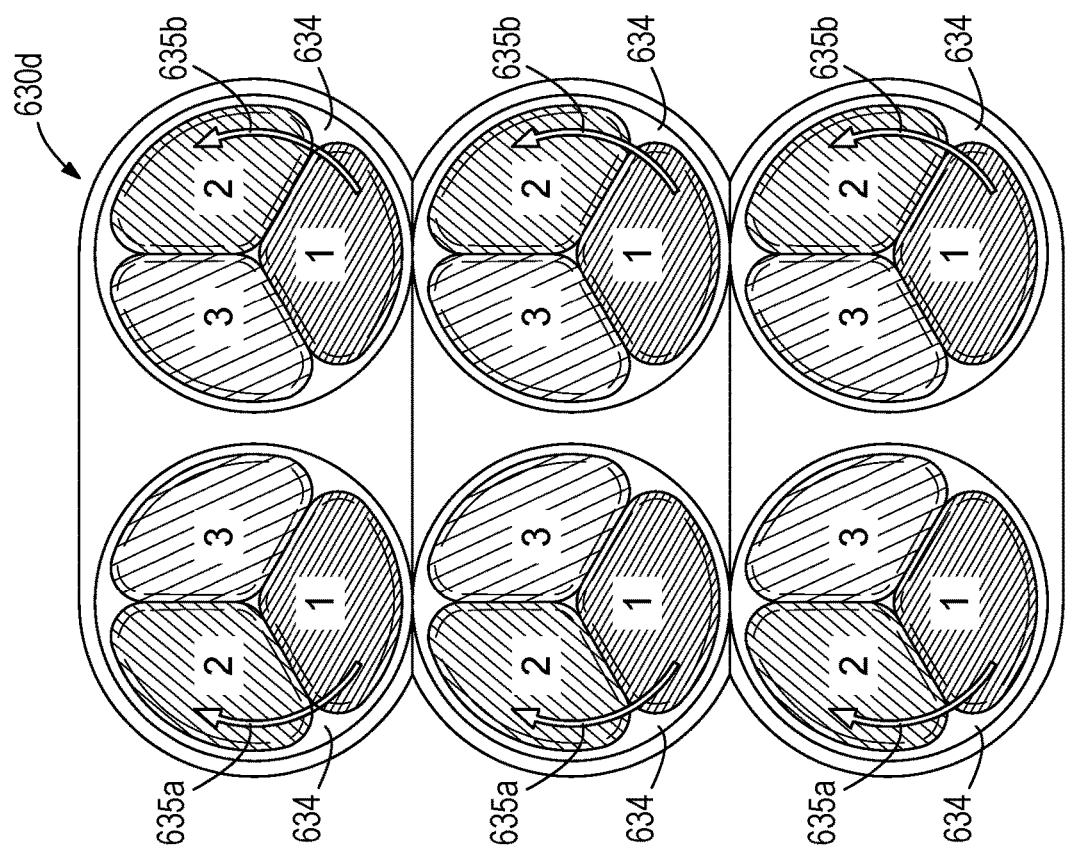
FIG. 22 illustrates a set of lower back bladders of the seating system of FIG. 20.
Figure 24:
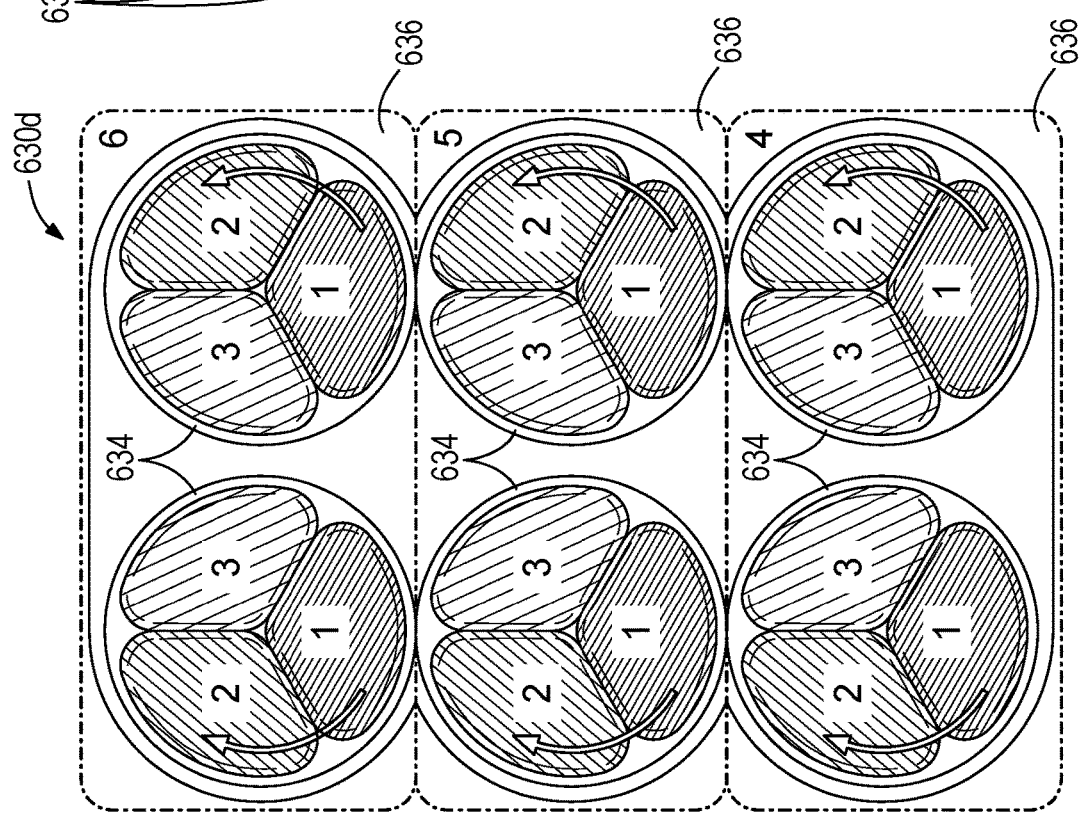
FIG. 24 illustrates a set of lower back bladders of the seating system of FIG. 20, according to another embodiment.

Thus, it is evident that the pneumatic system 10 can be configured to provide a two, three, four, five, six, or more air-chambered pattern or circuit, which in certain applications may be a circular or rotational pattern (e.g., FIG. 22; FIG. 24), although other non-circular shaped patterns are within the present scope, to include other multi-part or multi-sectored or positioned bladder configurations (i.e., the two, three, four, five, or six sector circular designs illustrated in FIGS. 12A-13B are not limiting). In addition, the pneumatic system 10 may also include one or more single-chamber bladders (i.e. bladders that are not partitioned so as to form multiple parts or sectors). Any number and combination of the bladder subassemblies 500a-500e, as well as other bladders or bladder subassemblies, including additional bladder subassemblies described below, may be part of the pneumatic system 10.

Figure 14:
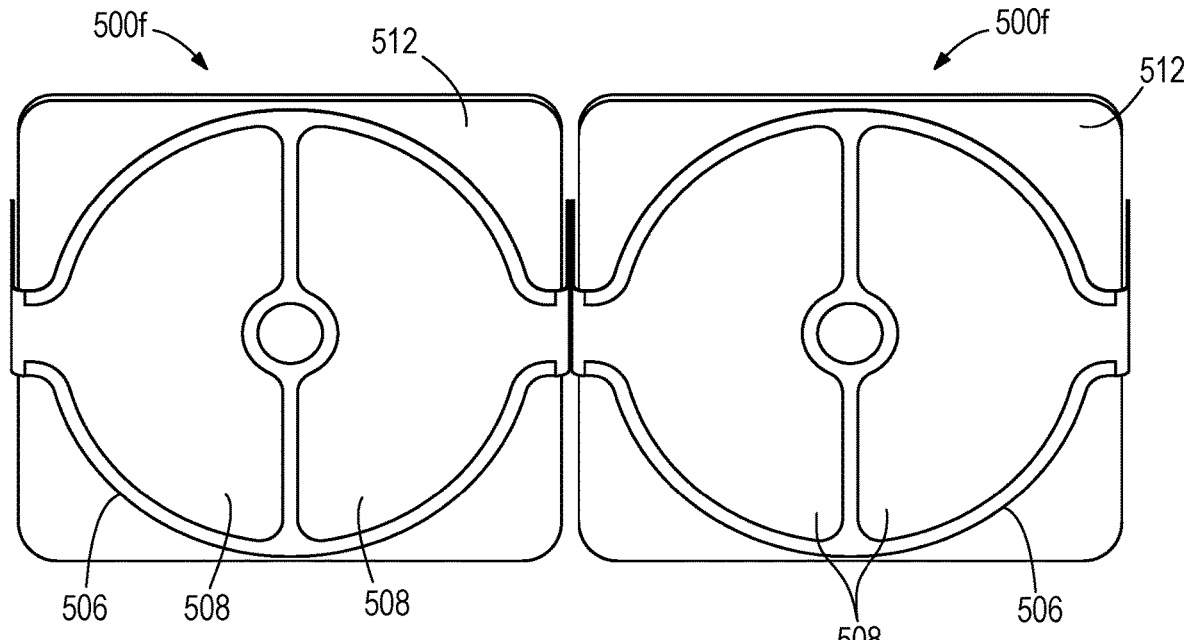
FIG. 14 is a perspective view of a bladder subassembly according to another embodiment that may be used with the pneumatic system of FIG. 1.

FIG. 14 illustrates bladder subassemblies 500f. Each of the bladder subassemblies 500f includes a body 506 with a plurality of air chambers 508 and a bladder support backing 512 abutting the body 506 on one side. The bladder support backing 512 is made of a rigid or semi-rigid material, such as plastic or stiff felt. In the illustrated embodiment, each support backing 512 has a square shape, but the support backing 512 can have a variety of other shapes (e.g., circular, elliptical, rectangular, etc.). The support backing 512 may be affixed to the air chambers 508 in a variety of different ways, including but not limited to adhesives, mechanical fasteners (e.g., staples), and ultra-sonic welding. The bladder support backing 512 has a planar surface in abutting contact with each of the air chambers 508 to distribute pressure generated by inflating the respective air chambers 508 across a larger contact area behind the air chambers 508. This may be particularly advantageous when the bladder subassemblies 500h are positioned on or within a yielding material, such as a foam seat cushion. The bladder support backing 512 inhibits the bladder subassemblies 500f from sinking into the yielding material, which would tend to reduce the strength of the massage effect felt by the user.

Figure 15:
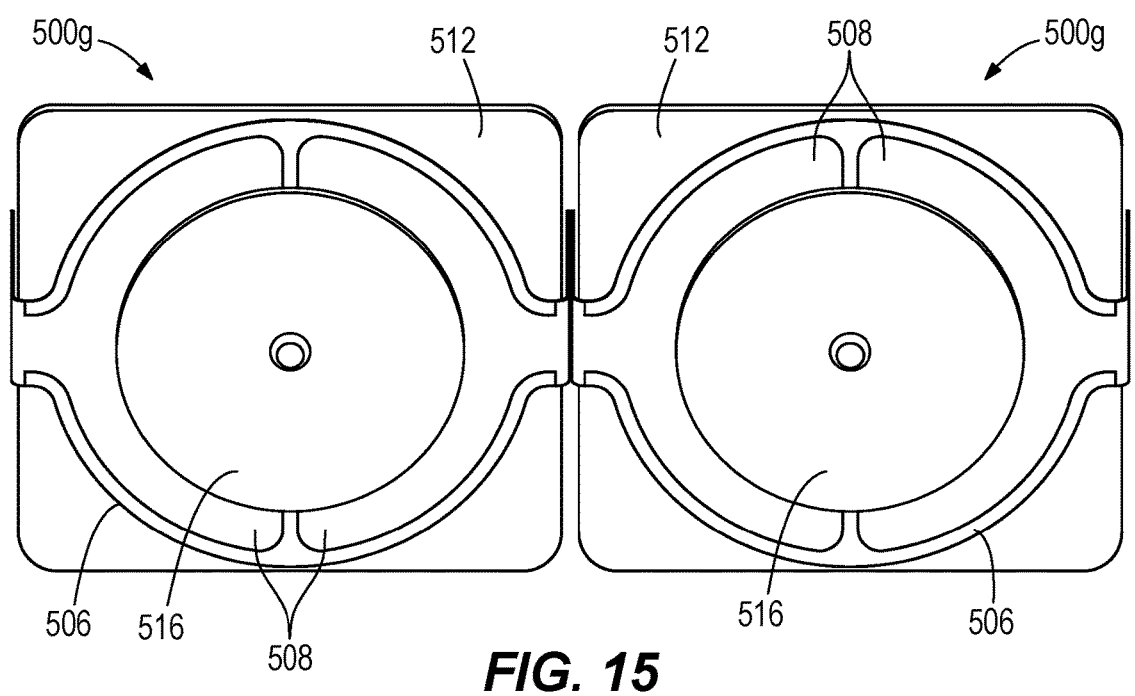
FIG. 15 is a perspective view of a bladder subassembly according to another embodiment that may be used with the pneumatic system of FIG. 1.

FIG. 15 illustrates bladder subassemblies 500g. Each of the bladder subassemblies 500g includes a body 506 with a plurality of air chambers 508 and a pressure transfer member 516 positioned in front of the air chambers 508. By spanning across all of the air chambers 508, the pressure transfer member 516 is configured to smooth application of pressure as the respective air chambers 508 are inflated sequentially (e.g., in an alternating or circular pattern). The pressure transfer member 516 may be made of a rigid material (e.g., plastic) or a semi-rigid material (e.g., stiff felt). In the illustrated embodiment, the pressure transfer member 516 is configured as a flat plate with a circular shape. A maximum dimension (i.e. diameter) of the pressure transfer member 516 is less than a maximum dimension of the air chambers 508 in the illustrated embodiment. In particular, the pressure transfer member 516 extends just beyond an inflated apex of each of the air chambers 508.

The pressure transfer member 516 may be affixed to the air chambers 508 in a variety of different ways, including but not limited to adhesives, mechanical fasteners, and ultra-sonic welding. The shape, material, relative size, and position of the pressure transfer member 516 may be varied to provide a desired feel. In the illustrated embodiment, each of the bladder subassemblies 500g includes both a pressure transfer member 516 and a bladder support backing 512, such that the air chambers 508 are sandwiched between the pressure transfer member 516 and the bladder support backing 512. In other embodiments, the bladder subassemblies 500g may not include the support backing 512.

Figure 16:
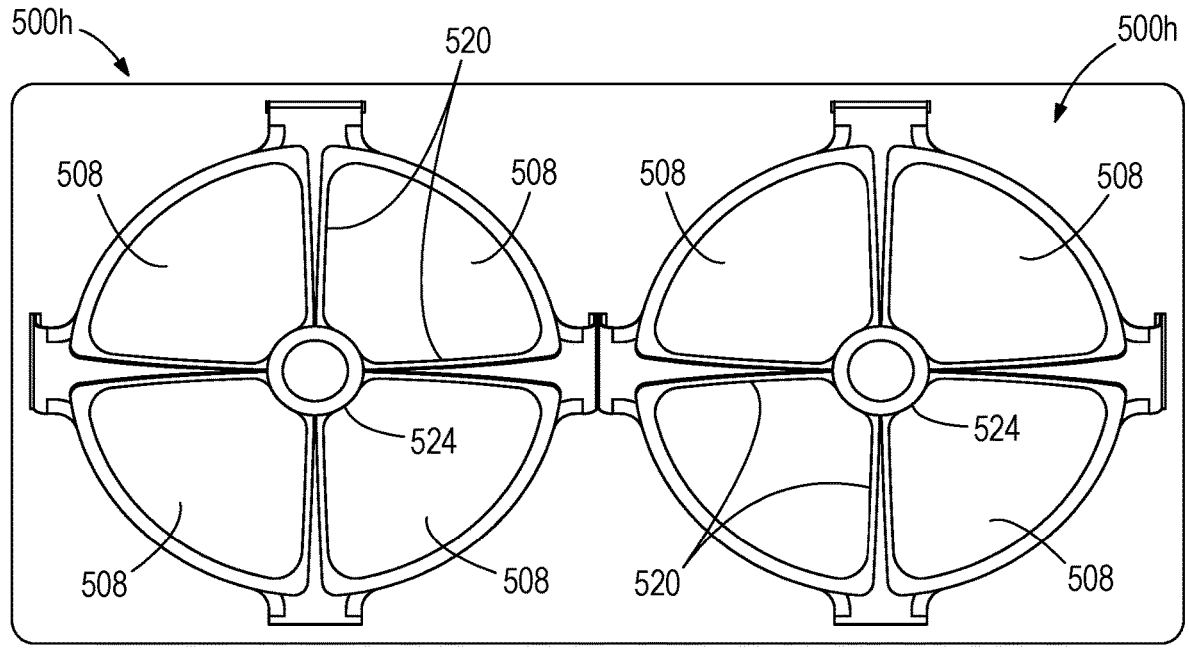
FIG. 16 is a perspective view of a bladder subassembly according to another embodiment that may be used with the pneumatic system of FIG. 1.

FIG. 16 illustrates bladder subassemblies 500h in which the welds 520 between adjacent air chambers 508 are separated. For example, in some embodiments, the welds 520 may be cut along their lengths after the welds 520 are formed. This permits greater flexure and displacement of each of the air chambers 508 relative to one another. The air chambers 508 remain interconnected at a central hub 524.

Figure 17:
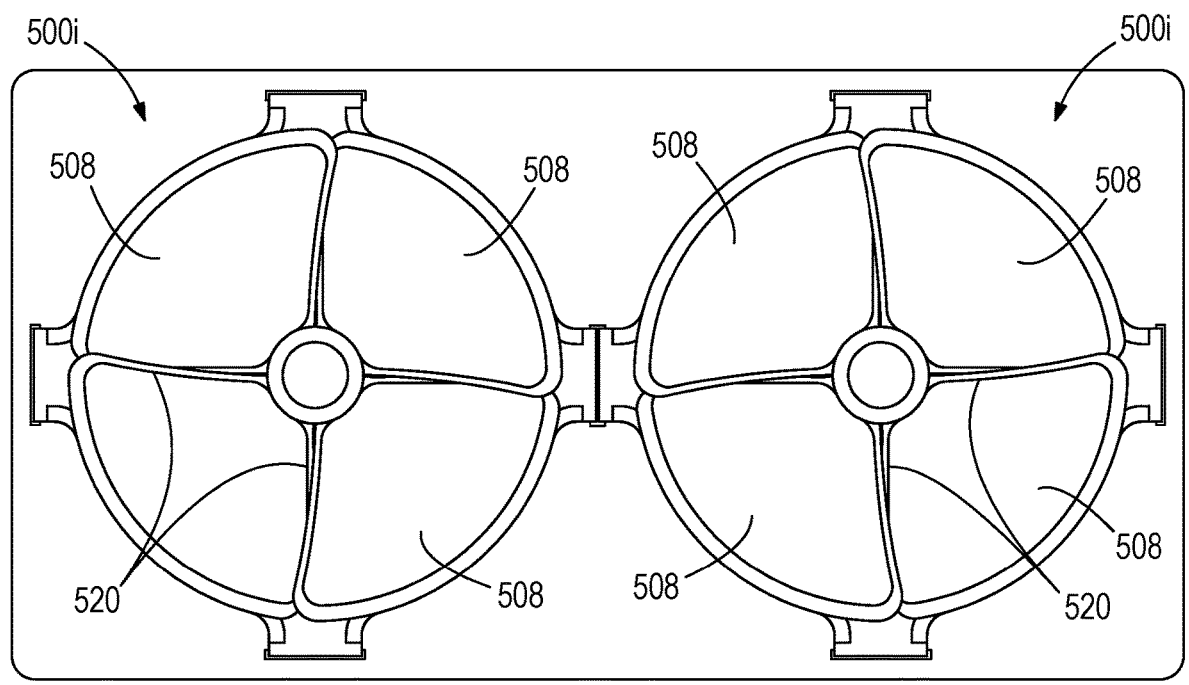
FIG. 17 is a perspective view of a bladder subassembly according to another embodiment that may be used with the pneumatic system of FIG. 1.

FIG. 17 illustrates a bladder subassembly 500i that is similar to the bladder subassembly 500h with separated welds 520. The separated welds 520 permit the air chambers 508 of the bladder subassembly 500i to be positioned to overlap slightly. The overlapping arrangement may provide an improved and more continuous feel when the air chambers 508 of the bladder subassembly 500i are inflated in a circular sequential pattern, for example.

Figure 18:
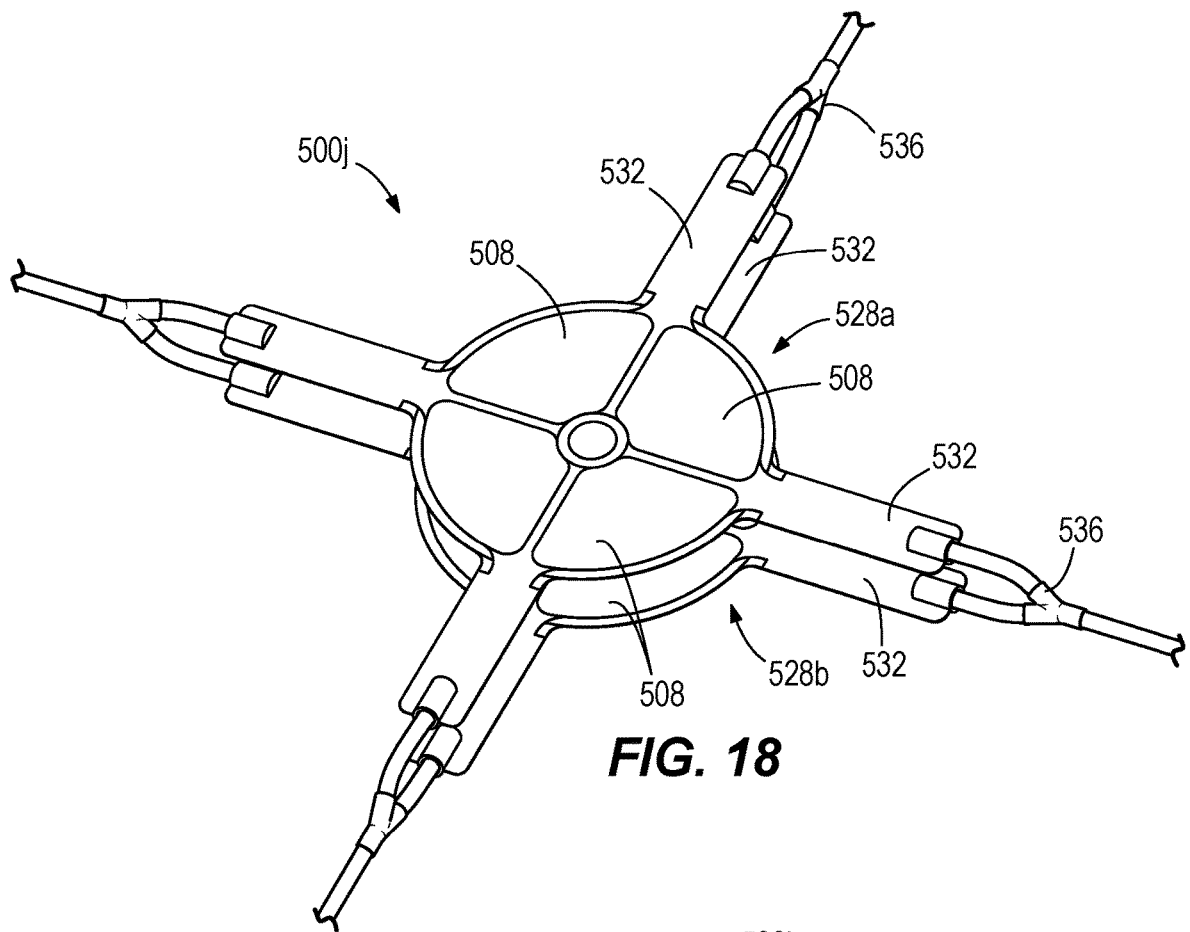
FIG. 18 is a perspective view of a bladder subassembly according to another embodiment that may be used with the pneumatic system of FIG. 1.

FIG. 18 illustrates a bladder subassembly 500j that includes two stacked multi-sector bladder subassemblies 528a, 528b, such as any of the bladder subassemblies 500a-i described above. In the illustrated embodiment, inlets 532 to each air chamber 508 of the respective bladder subassemblies 528a, 528b are grouped in pairs and fluidly coupled together by Y-fittings 536. In other embodiments, the inlets 532 may be coupled together by other fittings or fluid transfer components. As such, each air chamber 508 of the bladder subassembly 528a has a corresponding air chamber 508 on the bladder subassembly 582b that inflates and deflates in unison. The stacked construction of the bladder subassembly 500j may thus provide greater expansion, and therefore, greater massage pressure, against a user's body.

Figure 19:
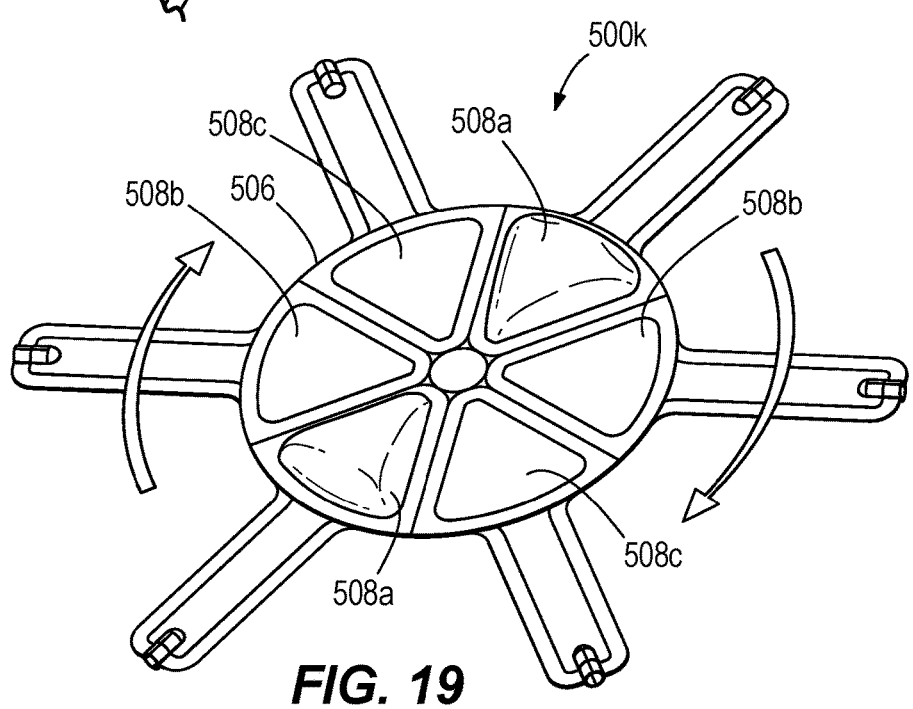
FIG. 19 is a perspective view of a bladder subassembly according to another embodiment that may be used with the pneumatic system of FIG. 1.

FIG. 19 illustrates a bladder subassembly 500k including a body 506 with six air chambers or sectors 508a, 508b, 508c. In some embodiments, each of the air chambers 508a, 508b, 508c may be inflated and deflated individually in sequence to produce a rotary massage effect. In the illustrated embodiment (FIG. 20), opposite air chambers 508a, 508b, 508c may be linked together in pairs (e.g., by Y-fittings or any other suitable fluid transfer arrangement) and inflated (e.g., 508a) and deflated (e.g., 508b, 508c) in sequence to produce a dual pressure point rotary passage effect.

In some embodiments, multiple bladder subassemblies (e.g., 18, 22, 26, 30, 500a-500k) can be positioned in an array or group as part of the pneumatic system 10. As described in greater detail below, the pneumatic system 10 controls the bladders (e.g., 18, 22, 26, 30, 500a-500k) to provide a variety of different massage effects, including translational or undulating (to include circular) pressure patterns.

Figure 20:
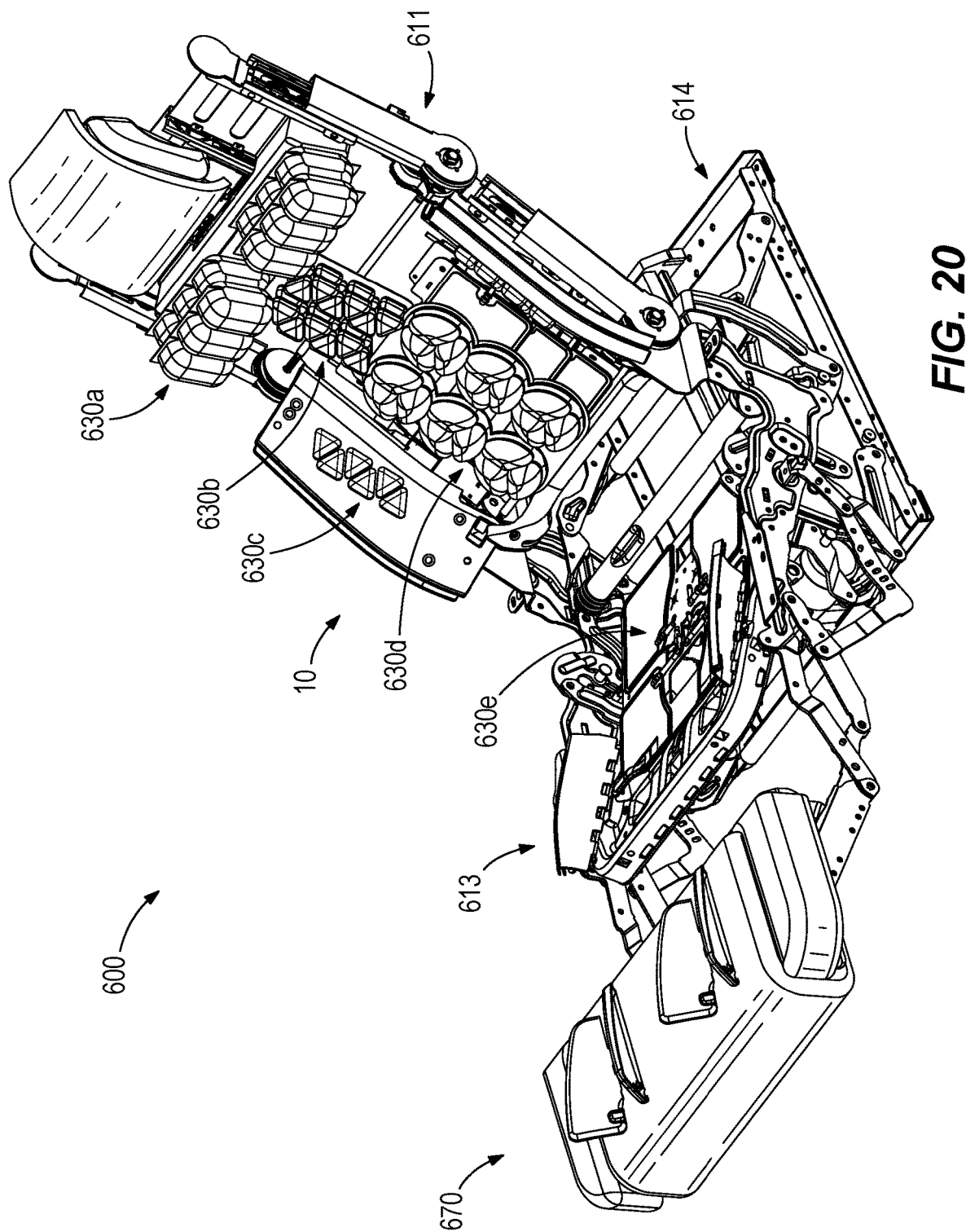
FIG. 20 is a perspective view of a seating system according to one embodiment, incorporating the pneumatic system of FIG. 1.
Figure 21:
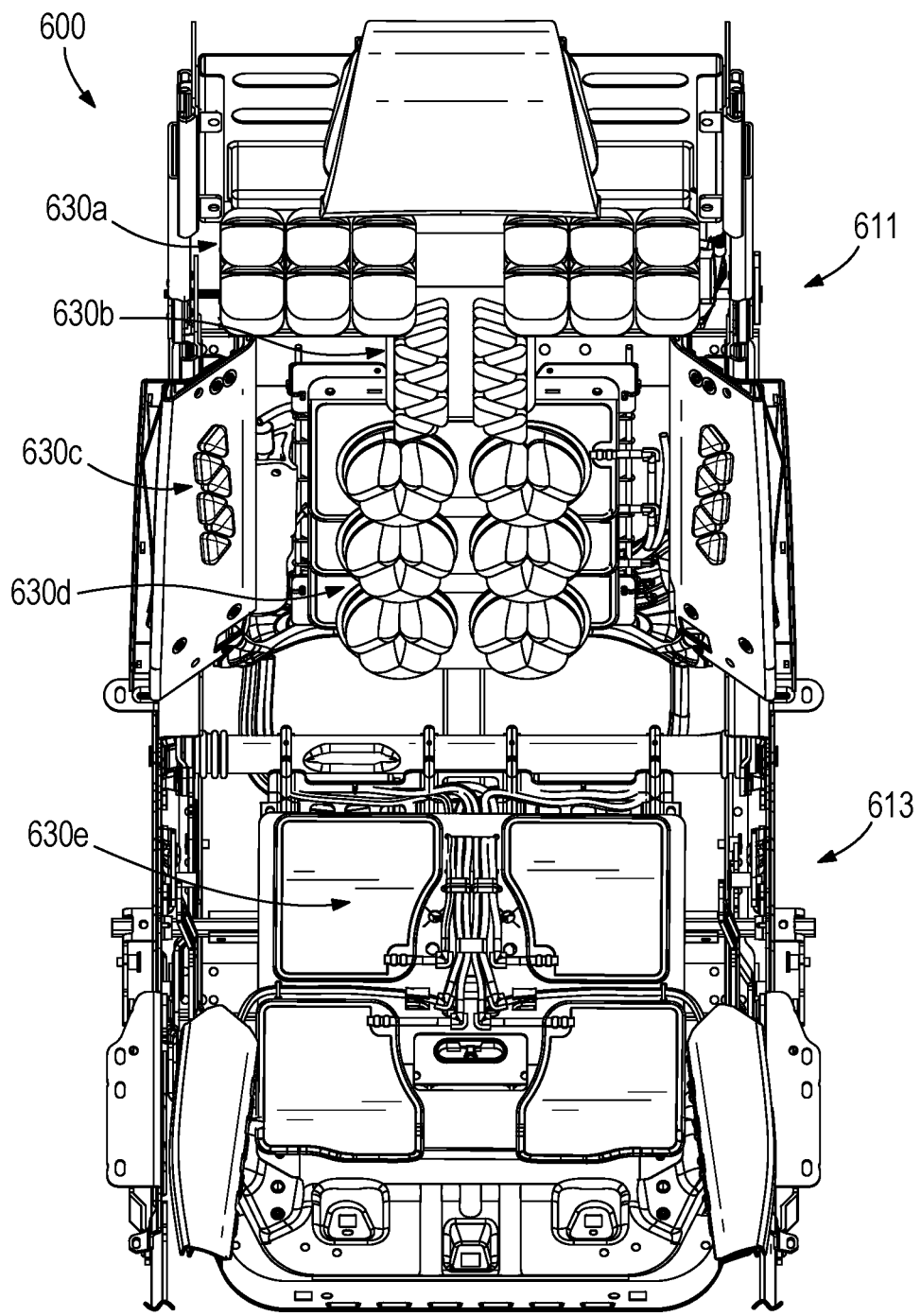
FIG. 21 is top view of the seating system of FIG. 20.

FIGS. 20 and 21 illustrate a seating system 600 according to one embodiment of the present disclosure, which incorporates features and aspects of the pneumatic system 10 described above. The illustrated seating system 600 includes a seat back or upper portion 611, a seat or lower portion 613, and a foot rest 670. In the illustrated embodiment, the pneumatic system 10 is integrated into each of the upper portion 611, the lower portion 613, and the foot rest 670 of the seating system 600. In other embodiments, the pneumatic system 10 may be integrated into only one or two of the upper portion 611, the lower portion 613, and the foot rest 670.

The illustrated seating system 600 is configured as a reclining massage chair. As such, the seating system 600 includes a fixed base 614. The upper portion 611, the lower portion 613 and the foot rest 670 are each movable relative to the base 614 between an upright position (not shown), a reclined position (FIGS. 20-21), and, optionally, a plurality of intermediate positions between the upright position and the reclined position. The relative position(s) of the upper portion 611, the lower portion 613, and the foot rest 670 may be adjusted together (e.g., as part of a predetermined reclining operation) or individually (e.g., in response to user inputs).

It should be understood that the illustrated pneumatic system 10 in the seating system 600 is only one possible application for the disclosed pneumatic system 10. Other applications include any transportation-related seating or resting products for a driver or passenger, to include non-automotive applications not limited to aircraft or locomotive seats, as well as residential and commercial (office) furniture, bedding, and other such products in which a comforting massage effect in any portion thereof is desired.

The illustrated pneumatic system 10 includes four sets of bladders 630a, 630b, 630c, 630d in the upper portion 611 and a set of bladders 630e in the lower portion 613. Referring to FIG. 21, the first set of bladders 630a (i.e. shoulder bladders 630a) is positioned in the shoulder region of the upper portion 611. The second set of bladders 630b (i.e. upper back bladders 630b) is positioned in the upper back region of the seat back 612. The third set of bladders 630c (i.e. bolster bladders 630c) is positioned in the bolster or side regions of the upper portion 611. The fourth set of bladders 630d (i.e. lower back bladders 630d) is positioned in the lower back or pelvic/lumbar region of the upper portion 611. Referring to FIG. 21, the fifth set of bladders 630e (i.e. seat bladders 530e) is positioned in the lower portion 613 of the seating system 600. The bladders 630a-e are positioned behind a support surface (not shown) of the seating system 600 that at least partially supports an occupant. As such, that bladders 630a-e are configured to impart a massage effect to the occupant through the support surface.

It should be understood that the number and arrangement of bladders in the upper and lower portions 611, 613 of the seating system 600 may vary. However, the sets of bladders 630a-e are positioned to anatomically align with features of a user's body, and preferably to align with features of the user's body that experience tension when in the user is in a seated position. Although the following description focuses primarily on the illustrated embodiments of the sets of bladders 630a-e, it should be understood that any features and elements of the bladder subassemblies 500a-k described above could be incorporated into the sets of bladders 630a-e.

Figure 23:
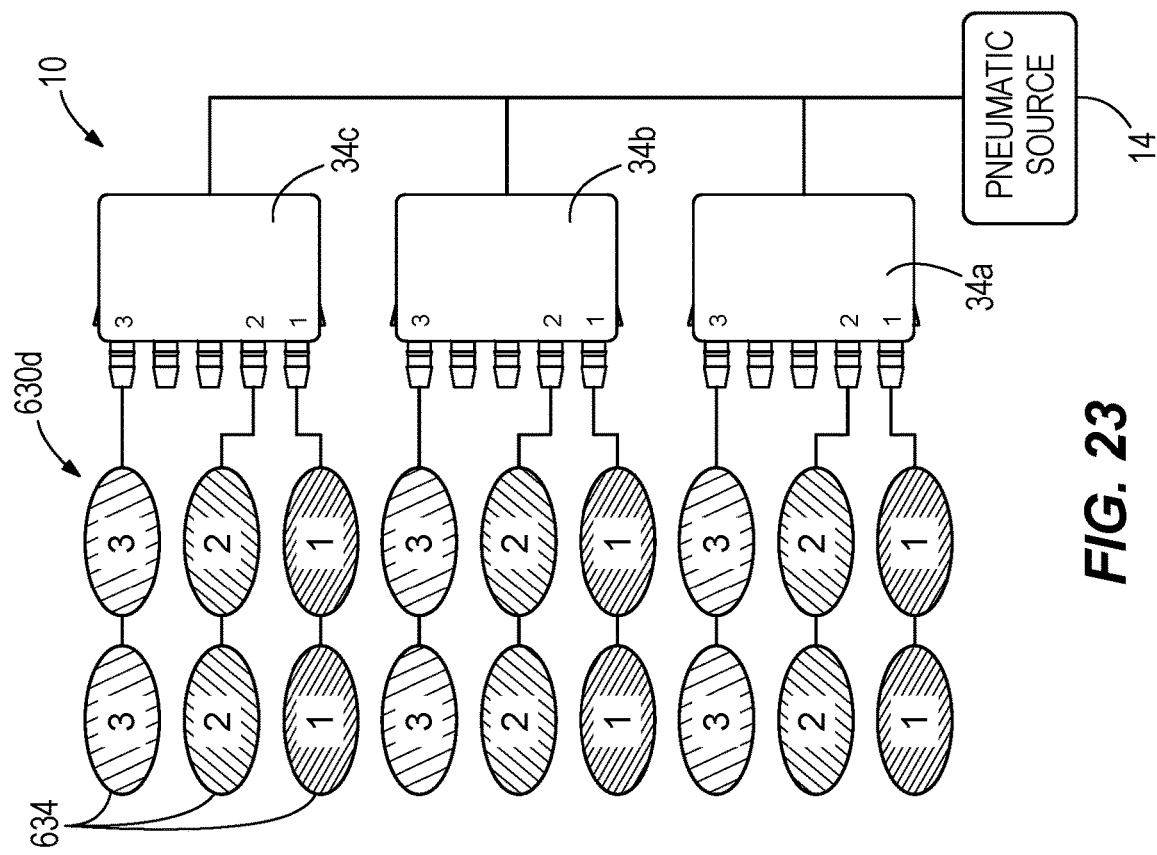
FIG. 23 is a schematic diagram of the set of lower back bladders of FIG. 22.

FIGS. 22 and 23 illustrate the lower back bladders 630d. In particular, the illustrated set of lower back bladders 630d includes an array of six multi-segment user-facing bladders 634, arranged in three rows and two columns. A fluidic switching module 34a, 34b, 34c is associated with each of the rows of lower back bladder 630d. The fluidic switching modules 34a, 34b, 34c direct air from the pneumatic source 14 to provide the user with a circular pressure pattern or massage effect applied to the user's lower back due to the arrangement and timing of the disclosed system 10. (FIG. 22). For example, the fluidic switching modules 34a, 34b, 34c may direct air from the air source 14 to inflate a first bladder 1, then inflate a second bladder 2 while deflating the first bladder 1, then inflate a third bladder 3 while deflating the second bladder 2, then inflate the first bladder 1 while deflating the third bladder 3, and so on. The user-facing bladders 634 in the respective columns can create circular pressure patterns simultaneously in opposite rotational directions 635a, 635b to produce an inward rotating sensation or an outward rotating sensation. (FIG. 22).

Figure 25:
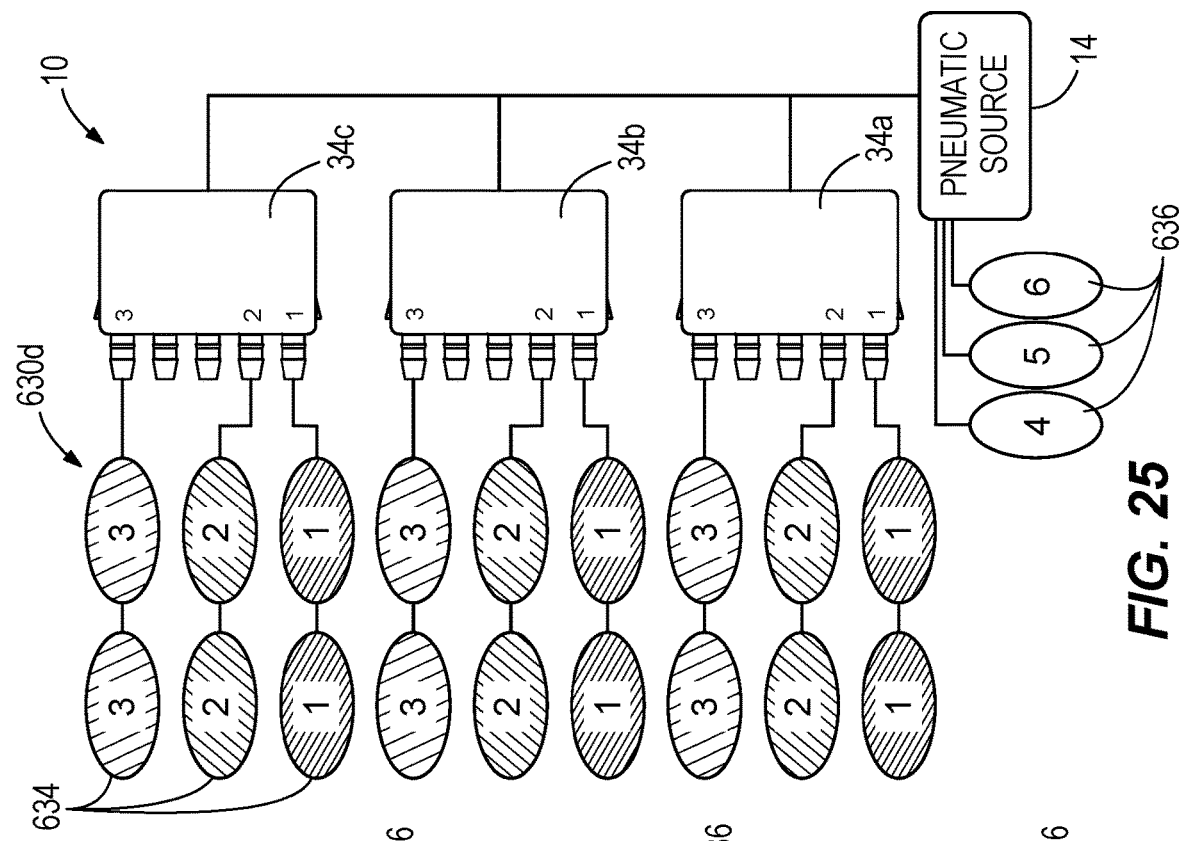
FIG. 25 is a schematic diagram of the set of lower back bladders of FIG. 24.

Referring to FIG. 24, in some embodiments, the set of lower back bladders 630d further includes intensity bladders 636 positioned behind the user-facing bladders 634. In the illustrated embodiment, three intensity bladders 636 are provided (one for each row of lower back bladders 630d). The intensity bladders 636 are coupled to the pneumatic source 14 separately from the fluidic switching modules 34 and therefore may be controlled independently of the user-facing bladders 634 (FIG. 25). The intensity bladders 636 can be inflated to provide additional intensity or pushing force against the user to enhance the feel created by the user-facing bladders 634. In some embodiments, the intensity bladders 636 may be controlled in a sequential pattern to create a translating effect either independently of or in conjunction with the circular pressure patterns of the user-facing bladders 634. In some embodiments, the intensity bladders 636 may be used as a lumbar support mechanism for the seating system 600.

FIGS. 26 and 27 illustrate the upper back bladders 630b. In particular, the illustrated set of upper back bladders 630b includes an array of twelve single-chamber user-facing bladders 640, arranged in six rows and two columns (FIG. 26). In the illustrated embodiment, each row of user-facing bladders 640 is fluidly coupled together so as to inflate and deflate as a pair. Each row of user-facing bladders 640 is in communication with a fluidic switching module 34, which directs air from the pneumatic source 14 to provide the user with a translating pressure pattern applied to the user's upper back due to the arrangement and timing of the disclosed system 10 (FIG. 27). In the illustrated embodiment, a single fluidic switching module 34 with at least six outlet ports is used; however, in other embodiments, multiple fluidic switching modules 34 with fewer outlet ports may be used. In other embodiments, each of the twelve user-facing bladders 640 may be independently controllable.

Referring to FIG. 26, each of the user-facing bladders 640 have a generally triangular shape in the illustrated embodiment. In addition, adjacent user-facing bladders 640 in each column are laterally offset from one another. Accordingly, in addition to a vertically translating pressure sensation in the direction of arrows 637a and 637b, the illustrated arrangement of the user-facing bladders 640 also provides a horizontally translating pressure sensation that alternates back and forth simultaneously with the pressure sensation moving up and down.

Figure 29:
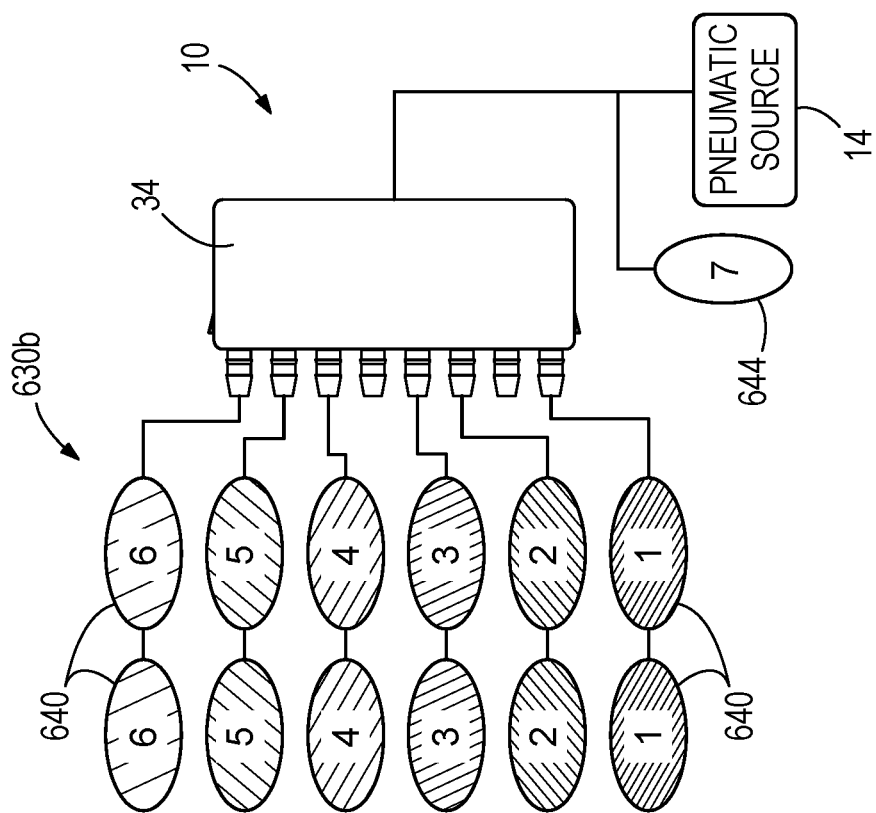
FIG. 29 is a schematic diagram of the set of upper back bladders of FIG. 28.
Figure 28:
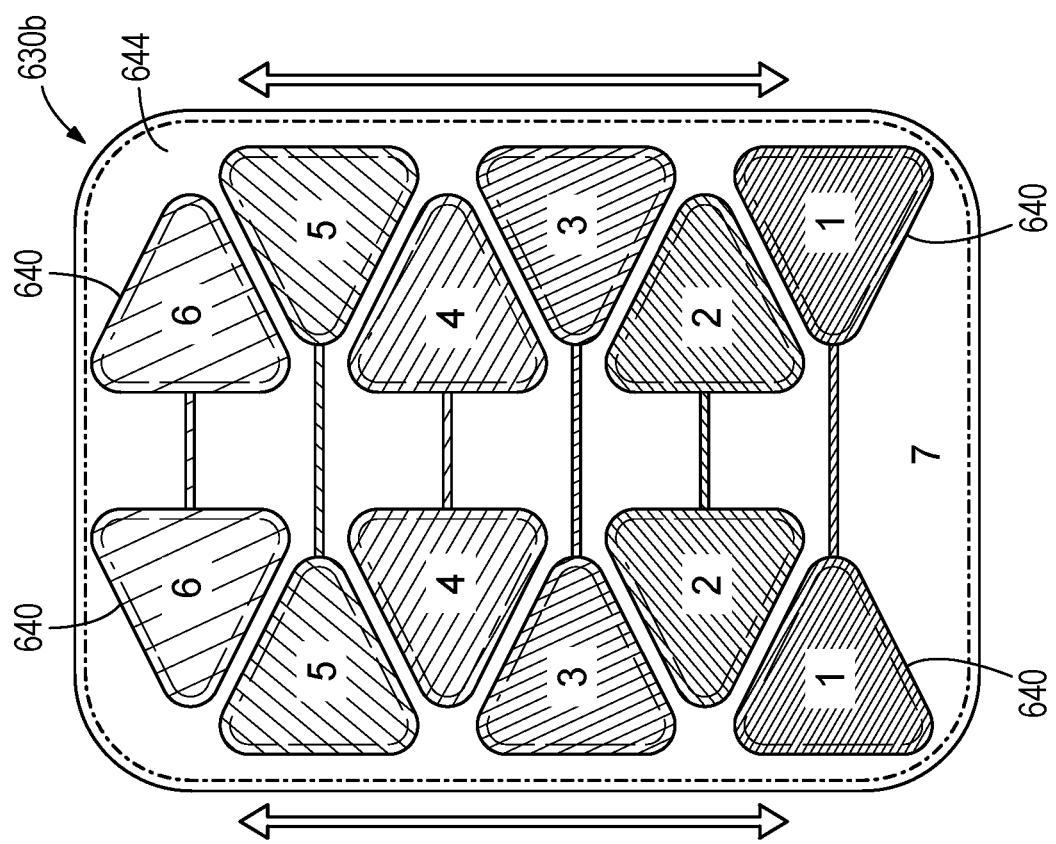
FIG. 28 illustrates a set of upper back bladders of the seating system of FIG. 20, according to another embodiment.

Referring to FIGS. 28-29, in some embodiments, the set of upper back bladders 630b further includes an intensity bladder 644 positioned behind the user-facing bladders 640. In the illustrated embodiment, the intensity bladder 644 is coupled to the pneumatic source 14 separately from the fluidic switching module 34 and therefore may be controlled independently of the user-facing bladders 640 (FIG. 29). The intensity bladder 644 can be inflated to provide additional intensity or pushing force against the user to enhance the feel created by the user-facing bladders 640.

Figure 31:
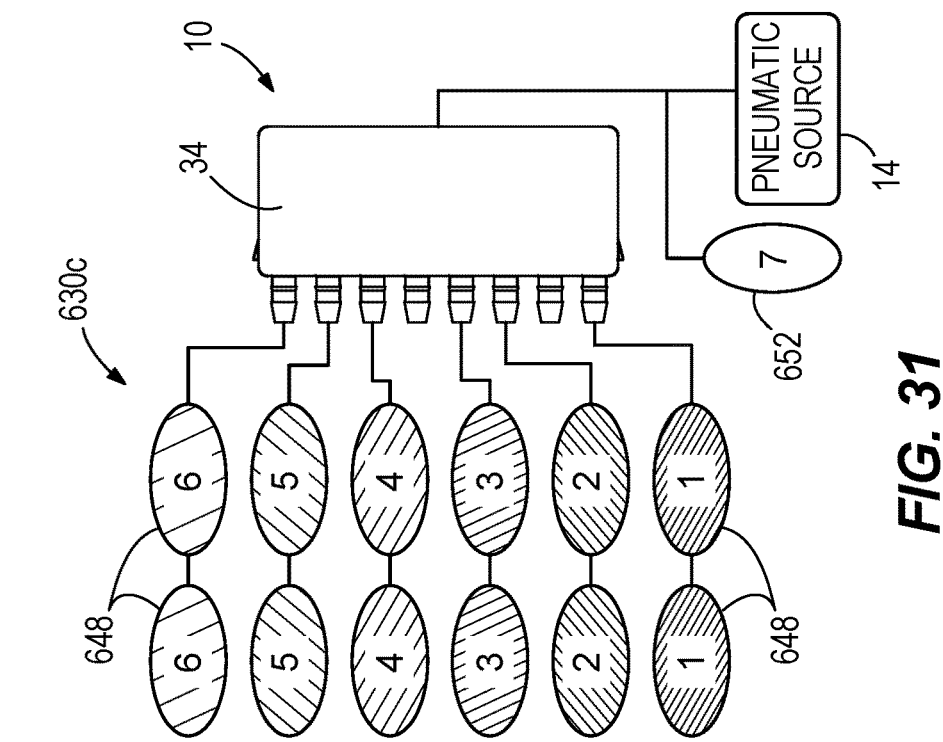
FIG. 31 is a schematic diagram of the set of bolster bladders of FIG. 30.
Figure 30:
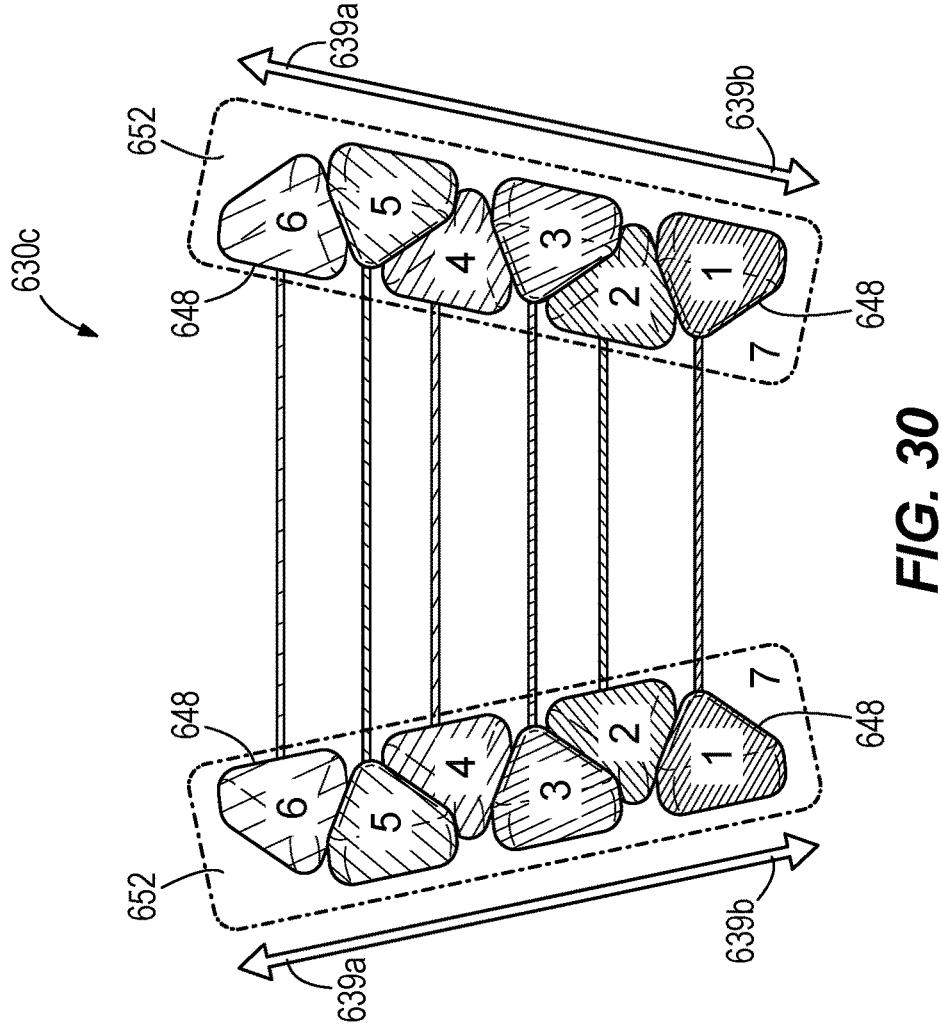
FIG. 30 illustrates a set of bolster bladders of the seating system of FIG. 20.

FIGS. 30-31 illustrate the bolster bladders 630c. In particular, the illustrated set of bolster bladders 630c includes an array of twelve single-chamber user-facing bladders 648, arranged in six rows and two columns (one column associated with each bolster of the seat back 612; FIG. 30). In the illustrated embodiment, each row of user-facing bladders 648 is fluidly coupled together so as to inflate and deflate as a pair. Each row of user-facing bladders 648 is associated with a fluidic switching module 34, which directs air from the pneumatic source 14 to provide the user with a translating pressure pattern applied to the user's lateral back due to the arrangement and timing of the disclosed system 10 (FIG. 31). In the illustrated embodiment, a single fluidic switching module 34 with at least six outlet ports is used; however, in other embodiments, multiple fluidic switching modules 34 with fewer outlet ports may be used. In other embodiments, each of the twelve user-facing bladders 648 may be independently controllable.

The user-facing bladders 648 have a generally triangular shape. In addition, adjacent user-facing bladders 648 in each column are laterally offset from one another. Accordingly, in addition to a vertically translating pressure sensation (i.e. in the directions of arrows 639a and 639b), the illustrated arrangement of the user-facing bladders 648 also provides a horizontally translating pressure sensation that alternates back and forth simultaneously with the pressure sensation moving up and down.

The illustrated set of bolster bladders 630c further includes an intensity bladder 652 positioned behind each column of the user-facing bladders 648. In the illustrated embodiment, the intensity bladder 652 is coupled to the pneumatic source 14 separately from the fluidic switching module 34 and therefore may be controlled independently of the user-facing bladders 648. The intensity bladder 652 can be inflated to provide additional intensity or pushing force against the user to enhance the feel created by the user-facing bladders 648. In other embodiments, the intensity bladder 652 may be omitted.

Figure 33:
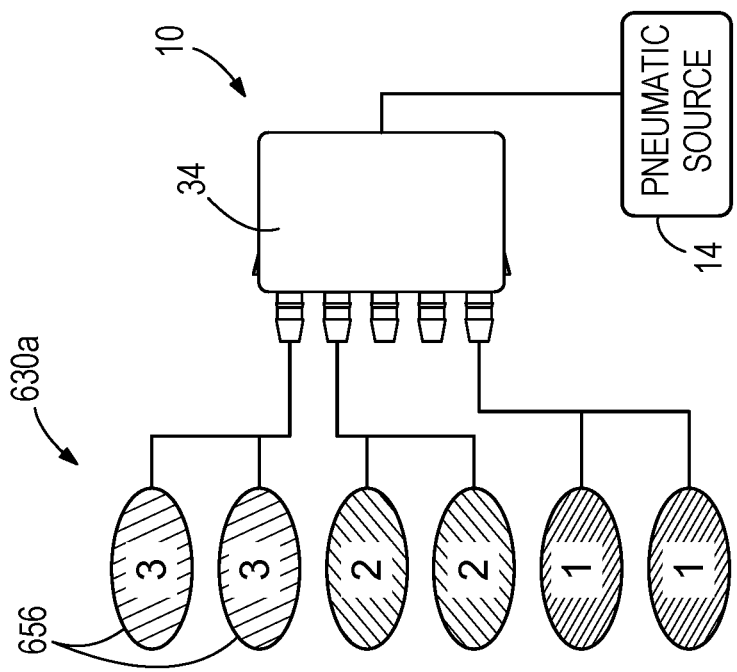
FIG. 33 is a schematic diagram of the set of shoulder bladders of FIG. 32.
Figure 32:
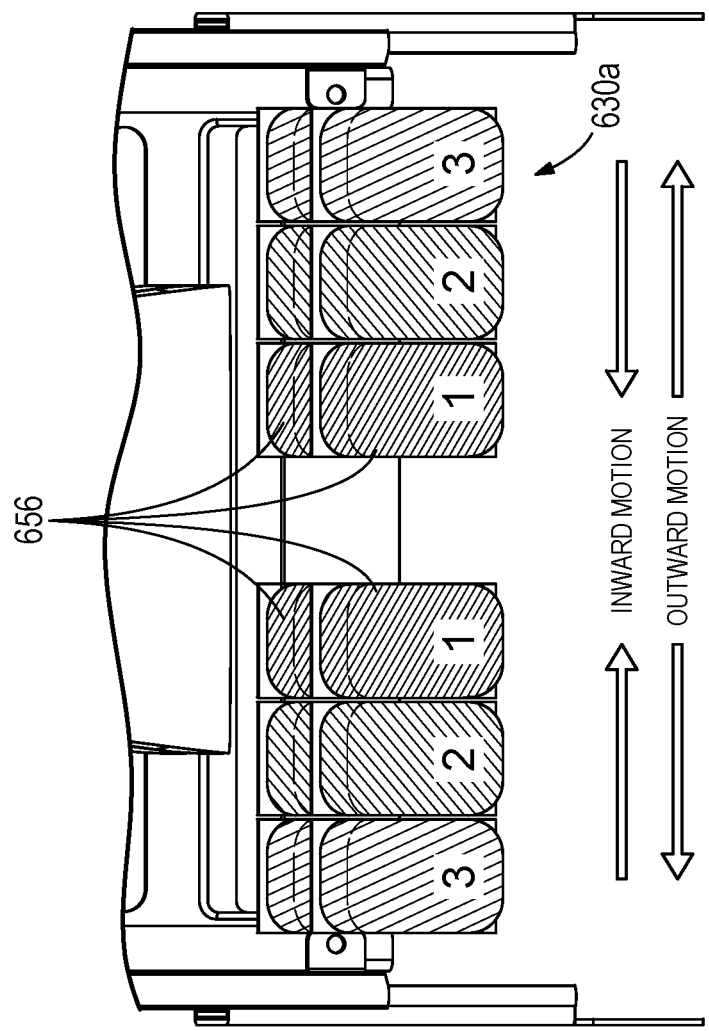
FIG. 32 illustrates a set of shoulder bladders of the vehicular seating system of FIG. 20.

FIGS. 32-33 illustrate the shoulder bladders 630a. In particular, the illustrated set of shoulder bladders 630a includes an array of twelve single-chamber user-facing bladders 656, arranged in two rows and six columns. In the illustrated embodiment, each column of user-facing bladders 656 is fluidly coupled together so as to inflate and deflate as a pair. The rows of user-facing bladders 656 are stacked in a front-rear direction of the seat back 612. The stacked construction may provide greater expansion, and therefore, greater massage pressure, against the user's shoulders. The user-facing bladders 656 have a generally rectangular or elongated shape. In the illustrated embodiment, the columns of user-facing bladders 656 are separated into two lateral groups of three columns, corresponding with the user's left and right shoulders, respectively, with a gap between the two groups for the user's neck.

Each column of user-facing bladders 656 is associated with a fluidic switching module 34, which directs air from the pneumatic source 14 to provide the user with a translating pressure pattern applied to the user's shoulders due to the arrangement and timing of the disclosed system 10. For example, in the illustrated embodiment, the user-facing bladders 656 may be controlled in a cycle including an inward translating sensation against the user's shoulders, followed by an outward translating sensation, or vice versa.

Figure 35:
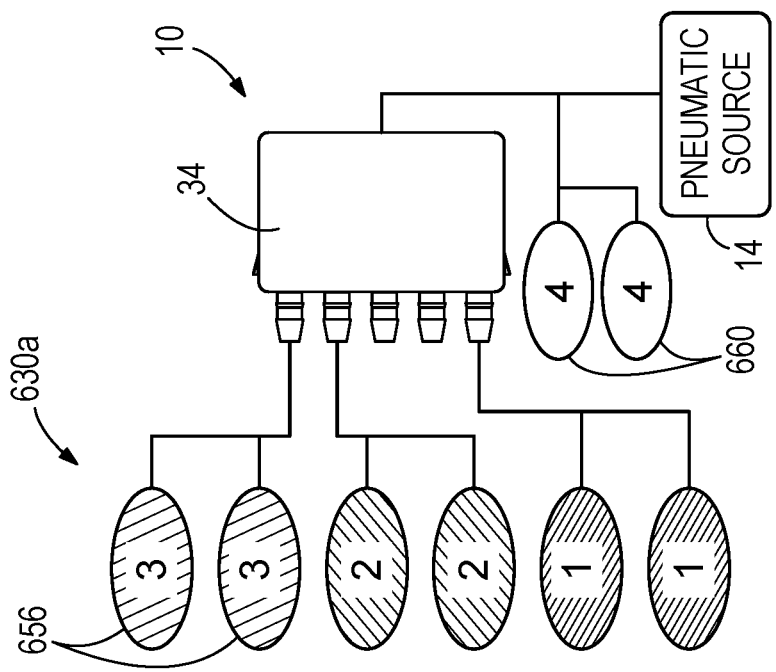
FIG. 35 is a schematic diagram of the set of shoulder bladders of FIG. 34.
Figure 34:
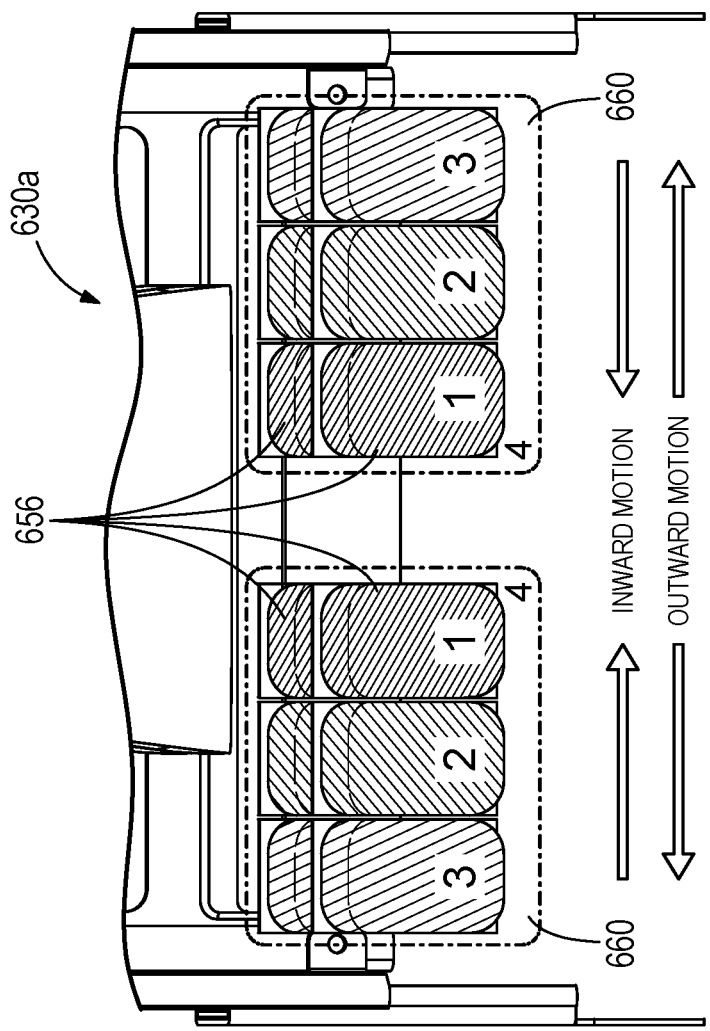
FIG. 34 illustrates a set of shoulder bladders of the vehicular seating system of FIG. 20, according to another embodiment.

Referring to FIGS. 34-35, in some embodiments, the set of shoulder bladders 630a further includes an intensity bladder 660 positioned behind each lateral group of the user-facing bladders 656. In the illustrated embodiment, the intensity bladders 660 are coupled to the pneumatic source 14 separately from the fluidic switching module 34 and therefore may be controlled independently of the user-facing bladders 656. The intensity bladders 660 can be inflated to provide additional intensity or pushing force against the user to enhance the feel created by the user-facing bladders 656.

Referring to FIG. 21, the bladders 630e on the lower portion 613 of the seating system 600 may be similar in arrangement and operation to the bladders 630a-d and/or the intensity bladders 636, 660 described above with reference to FIGS. 22-35.

Figure 36:
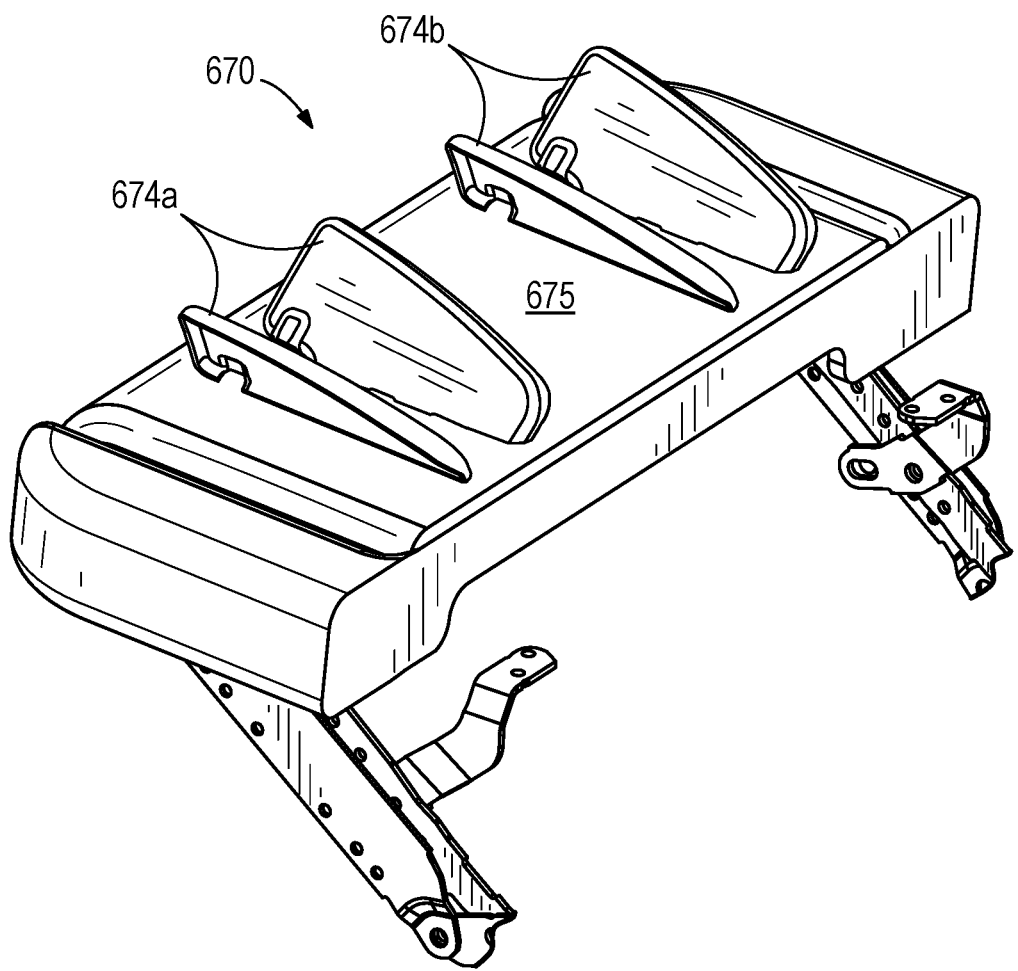
FIG. 36 is a perspective view of a footrest assembly of the seating system of FIG. 20.

FIG. 36 illustrates the footrest assembly 670 of the seating system 600. The footrest assembly 670 includes first and second sets of paddle actuators 674a, 674b. Each of the paddle actuators 674a, 674b includes one or more bladders (not shown), which can be controlled to move the paddle actuators 674a, 674b inward and outward to provide an upward or downward squeezing effect on a user's calves. One or more additional bladders (not shown), which may be similar to the bladders 630a-d or the intensity bladders 636, 660 described above, may be located behind a support surface 675 of the footrest assembly 670 between each of the sets of paddle actuators 674a, 674b. In such embodiments, the additional bladders provide a translating or kneading effect along the user's calves.

Figure 37:
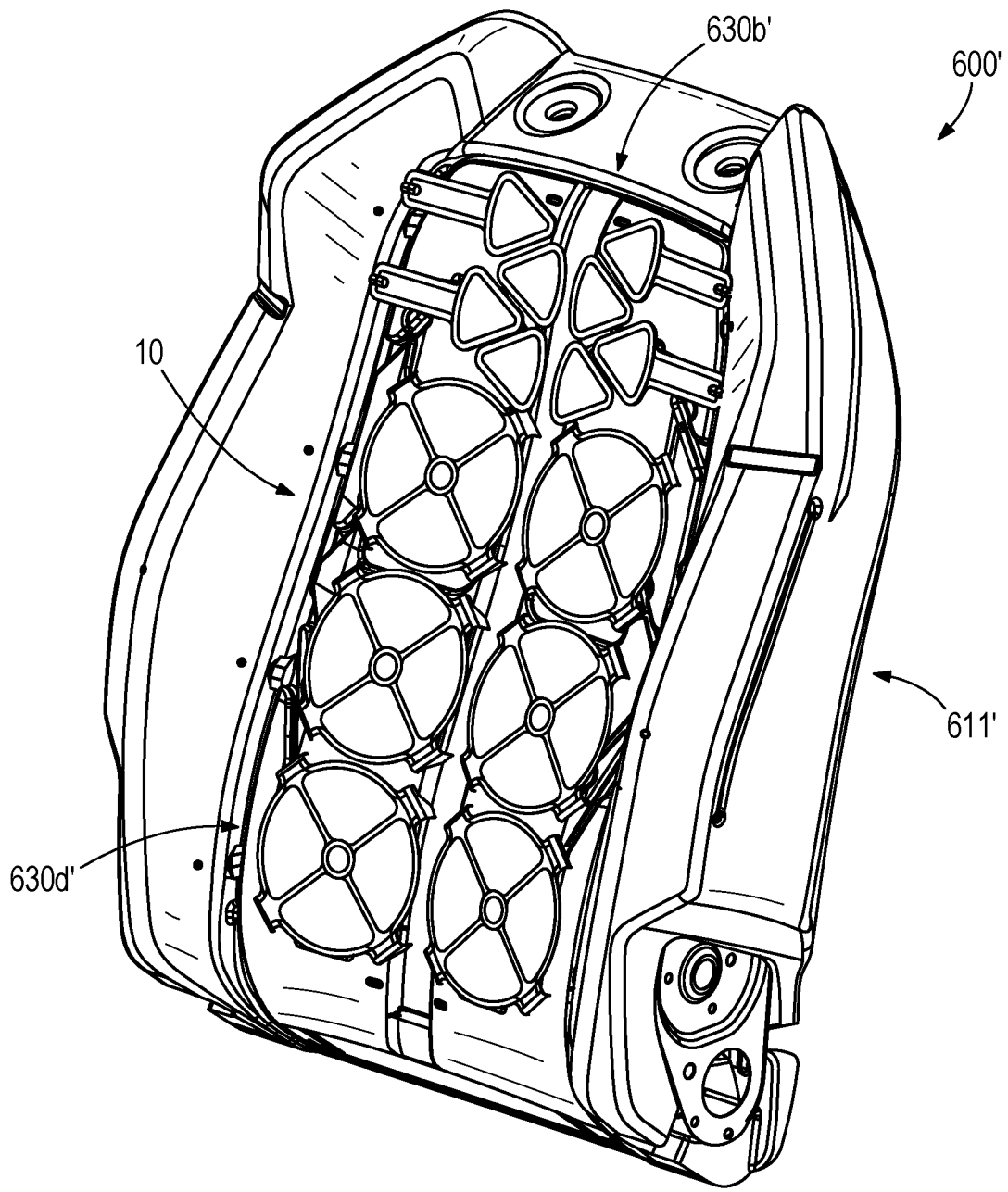
FIG. 37 illustrates an upper portion of a vehicular seating system incorporating the pneumatic system of FIG. 1.
Figure 39:
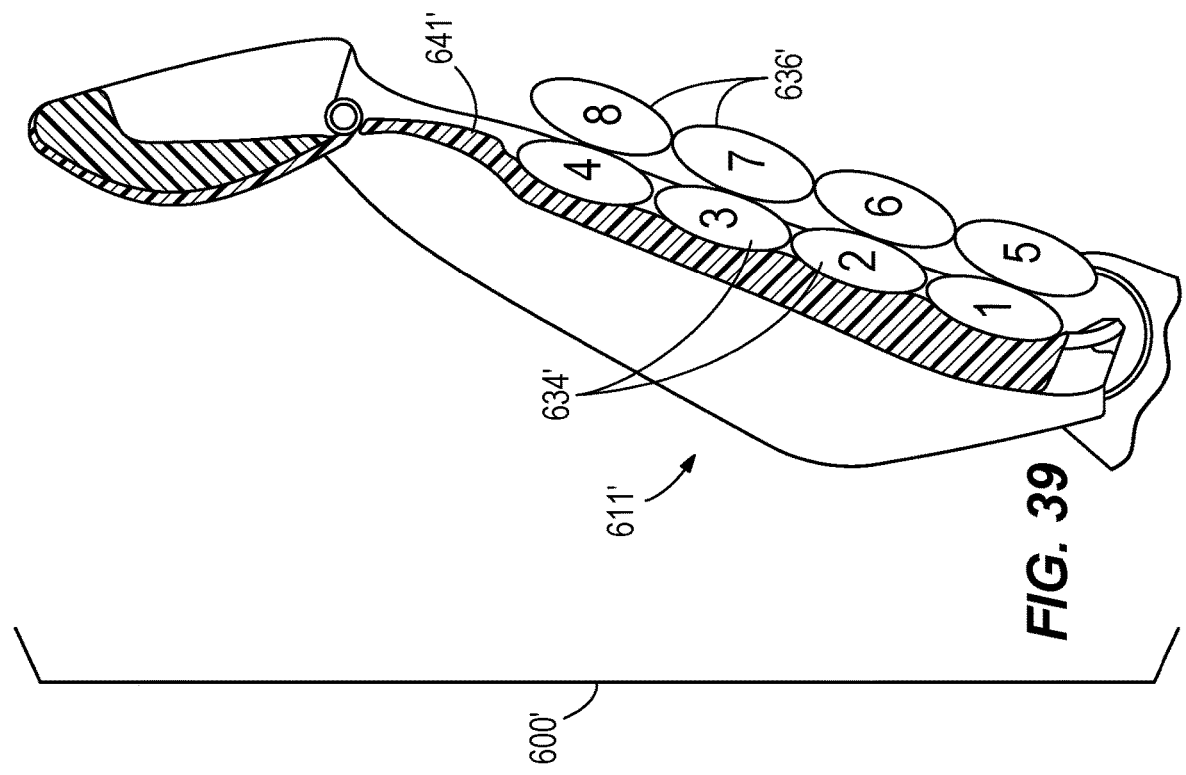
FIG. 39 illustrates a set of lumbar bladders of the vehicular seating system of FIG. 37, according to another embodiment.
Figure 38:
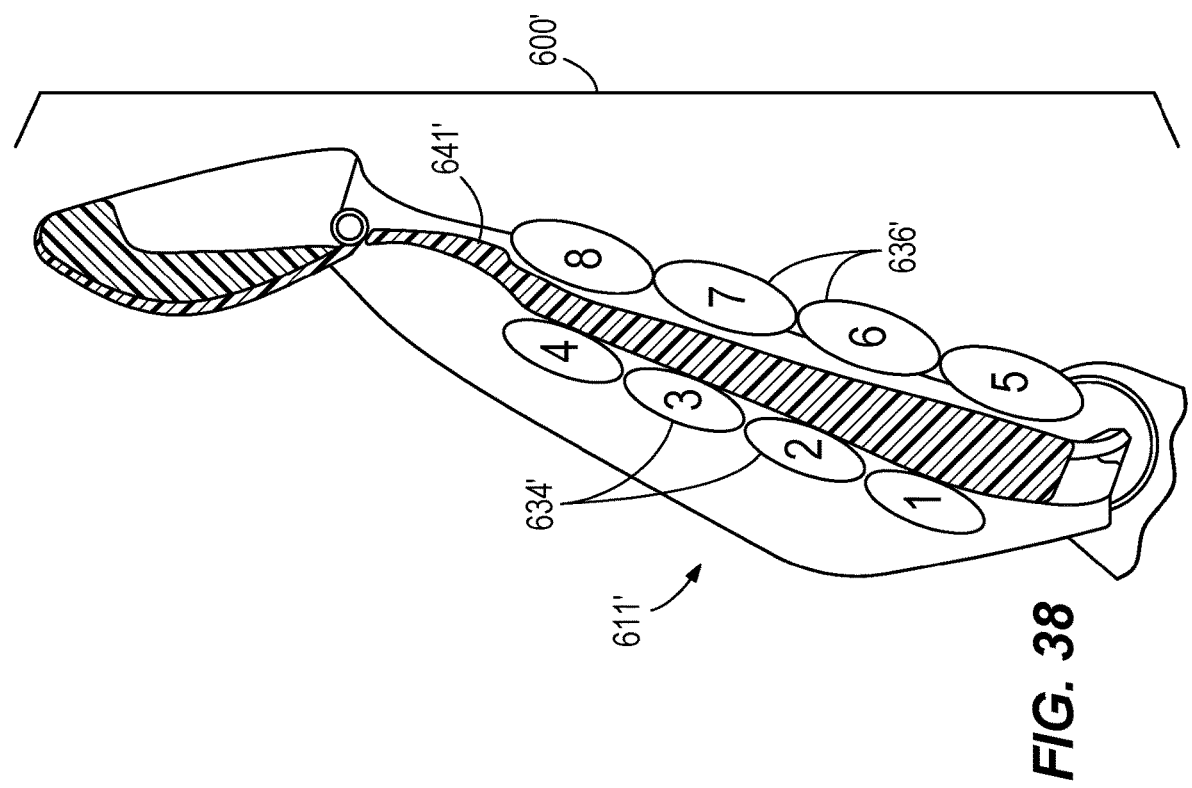
FIG. 38 illustrates a set of lumbar bladders of the vehicular seating system of FIG. 37.

FIG. 37-39 illustrate a seating system 600' according to one embodiment of the present disclosure, which incorporates features and aspects of the pneumatic system 10 described above. The illustrated seating system 600' is a vehicular seating system configured for use as a driver's seat or passenger's seat in an automobile, for example. The seating system 600' is similar to the seating system 600 described above, and features and elements of the seating system 600' corresponding with features and elements of the seating system 600 are given identical reference numbers appended by a prime symbol ('). In addition, the following description focuses primarily on differences between the seating system 600' and the seating system 600.

With reference to FIG. 37, the seating system 600' includes an upper portion or seat back 611'. The pneumatic system 10 is integrated into the upper portion 611'. Although not illustrated in FIG. 37, the seating system 600' also includes a lower portion or seat that may also include components of the pneumatic system 10. The illustrated pneumatic system 10 includes two sets of bladders 630b' (i.e. upper back bladders) and 630d' (i.e. lower back bladders) in the upper portion 611'. The upper back bladders 630b' are positioned in the upper back region of the upper portion 611'. The lower back bladders 630d' are positioned in the lower back or pelvic/lumbar region of the upper portion 611'.

Referring to FIGS. 38-39, the lower back bladders 630d' includes user-facing bladders 634' that may be positioned either in front of (FIG. 38) or behind (FIG. 39) support material 641' in the upper portion 611' of the seating system 600'. The support material 641' may include, for example, foam, a wire grid, a flex mat, or any other support material that may be used in a seating system. In the illustrated embodiment, the set of lower back bladders 630d' further includes intensity bladders 636' positioned behind the user-facing bladders 634'. In the embodiment illustrated in FIG. 38, the intensity bladders 636' and the user-facing bladders 634' are on opposite sides of the support material 641'. In the embodiment illustrated in FIG. 39, the intensity bladders 636' and the user-facing bladders 634' are both positioned behind the support material 641'. The intensity bladders 636' can be inflated to provide additional intensity or pushing force against the user to enhance the feel created by the user-facing bladders 634'.

Figure 40:
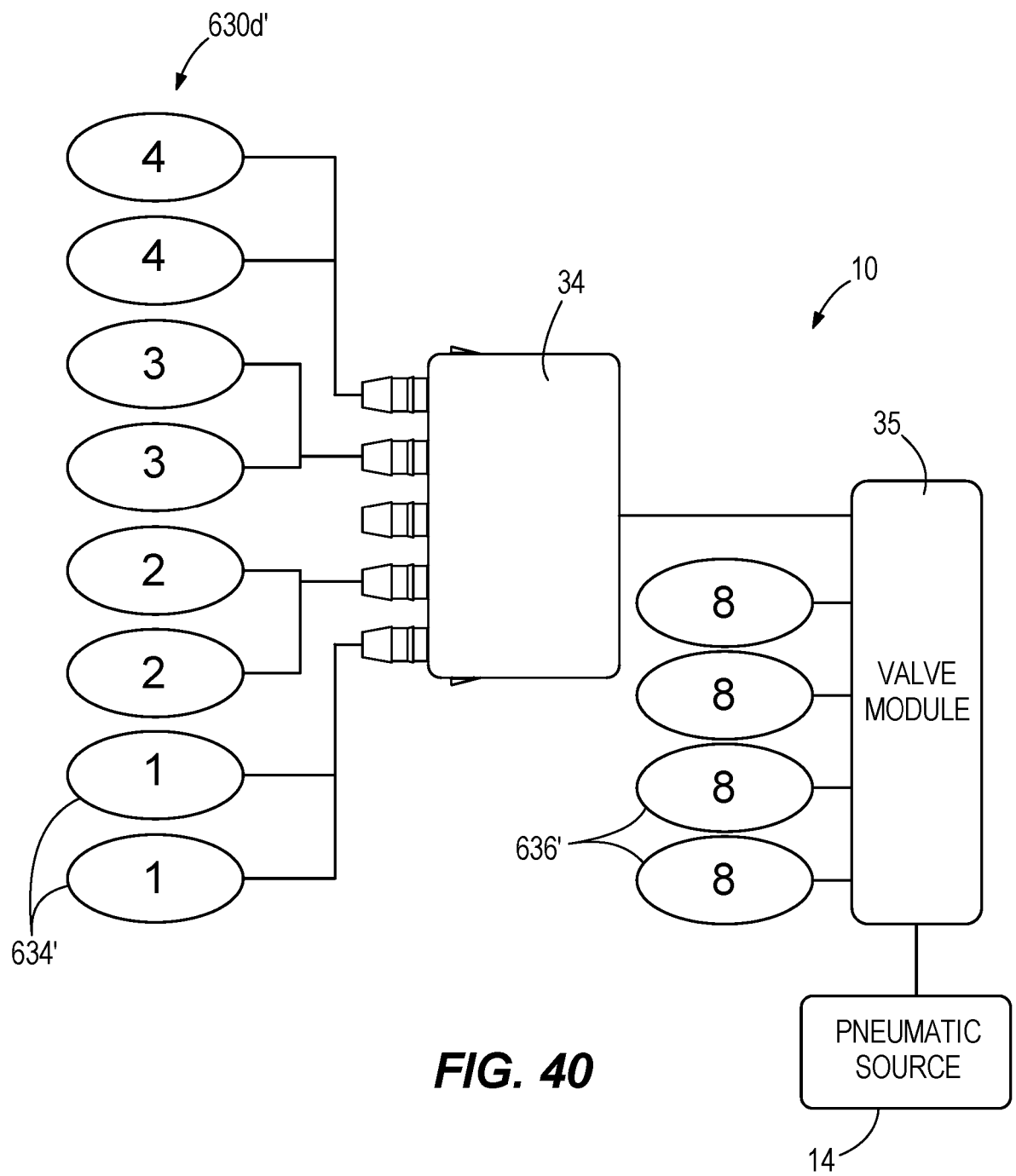
FIG. 40 illustrates a control schematic for the pneumatic system of FIG. 1, according to one embodiment.

With reference to FIG. 40, the pneumatic system 10 for the seating system 600' includes a fluidic switching module 34 coupled to each of the plurality of user-facing bladders 634' for directing air from the pressurized air source 14 to the respective bladders 634'. The intensity bladders 636' are coupled to the pressurized air source 14 separately from the fluidic switching module 34. In the illustrated embodiment, a valve module 35 is provided, which enables individual control of each of the intensity bladders 636'. In some embodiments, the intensity bladders 636' may be controlled in a sequential pattern to create a translating effect either independently of or in conjunction with circular pressure patterns of the user-facing bladders 634'. In some embodiments, the intensity bladders 636' may be used as a lumbar support mechanism for the seating system 600'.

FIGS. 41-46 illustrate exemplary pneumatic control schemes for operating the pneumatic system 10 with multiple fluidic switching modules 34.

Figure 41:
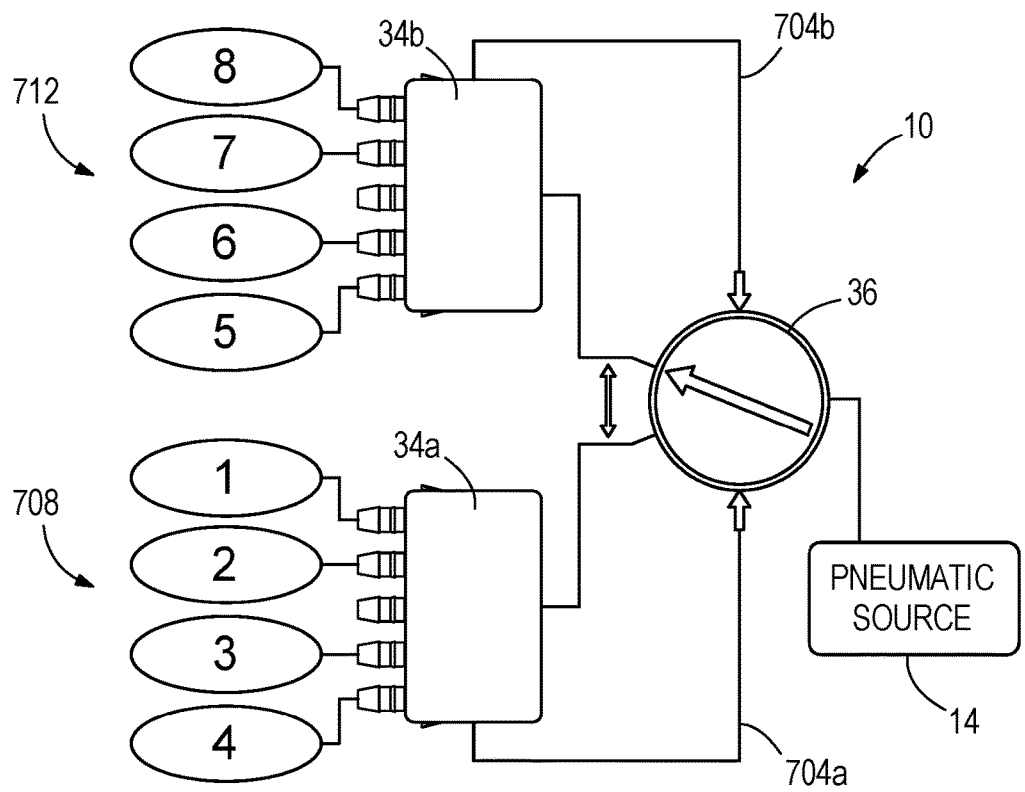
FIG. 41 illustrates a control schematic for the pneumatic system of FIG. 1, according to another embodiment.

With reference to FIG. 41, in a first embodiment, an adjustment device 36 in the form of an air direction valve 36 is disposed between the pneumatic source 14 and two fluidic switching modules 34a, 34b. Air exhaust lines 704a, 704b couple each of the fluidic switching modules 34a, 34b to the air direction valve 36. In operation, pressure from the pneumatic source 14 is directed by the valve 36 to the first fluidic switching module 34a, which provides air to inflate a plurality of bladders 708 (such as any of the bladders described herein) in sequence, as described above with reference to FIGS. 11A-E. After inflating the last of the plurality of bladders 708, the first fluidic switching module 34a exhausts the air through the exhaust line 704a and to the valve 36. This actuates the valve 36 to a second position, which then directs air from the pneumatic source 14 to the second fluidic switching module 34b. The second fluidic switching module 34b provides air to inflate a second plurality of bladders 712 in sequence, and then exhausts the air through the exhaust line 704b and to the valve 36. This actuates the valve 36 back to its starting position, and the process repeats.

In other embodiments, the exhaust lines 704a, 704b are replaced by feedback lines. The feedback lines perform the same function as exhaust lines 704a, 704b but do not move a substantial volume of air out of the associated fluidic switching module 34a, 34b. Instead, the fluidic switching modules 34a, 34b may exhaust air along other flow pathways.

Figure 42:
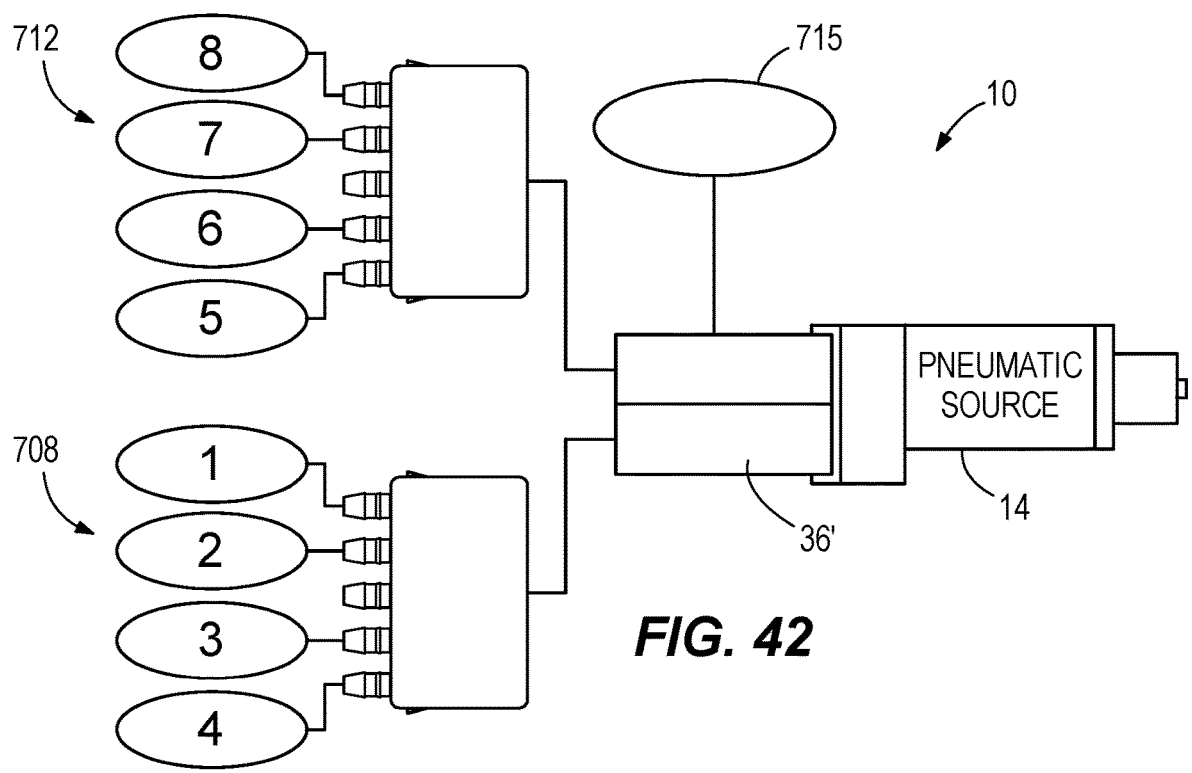
FIG. 42 illustrates a control schematic for the pneumatic system of FIG. 1, according to another embodiment.

FIG. 42 illustrates a pneumatic control scheme according to another embodiment that is similar to the embodiment described above with reference to FIG. 41. However, the air direction valve 36 is replaced by one or more electronically-actuated valves 36'. In the illustrated embodiment, a separate bladder 715 (such as one of the intensity bladders described above) is also in fluid communication with the solenoid-actuated valve.

FIGS. 43-46 illustrate a pneumatic control scheme according to another embodiment that is similar to the embodiments described and illustrated above with reference to FIGS. 41-42. In the illustrated embodiment, however, three fluidic switching modules 34a, 34b, 34c are coupled to the pneumatic source 14 in series, via two adjustment devices 36a, 36b.

In particular, each of the fluidic switching modules 34a, 34b, 34c includes a respective air exhaust line 704a, 704b, 704c. The first air exhaust line 704a and the third air exhaust line 704c are coupled to the first adjustment device 36a, and the second air exhaust line 704b is coupled to the second adjustment device 36a.

Figure 43:
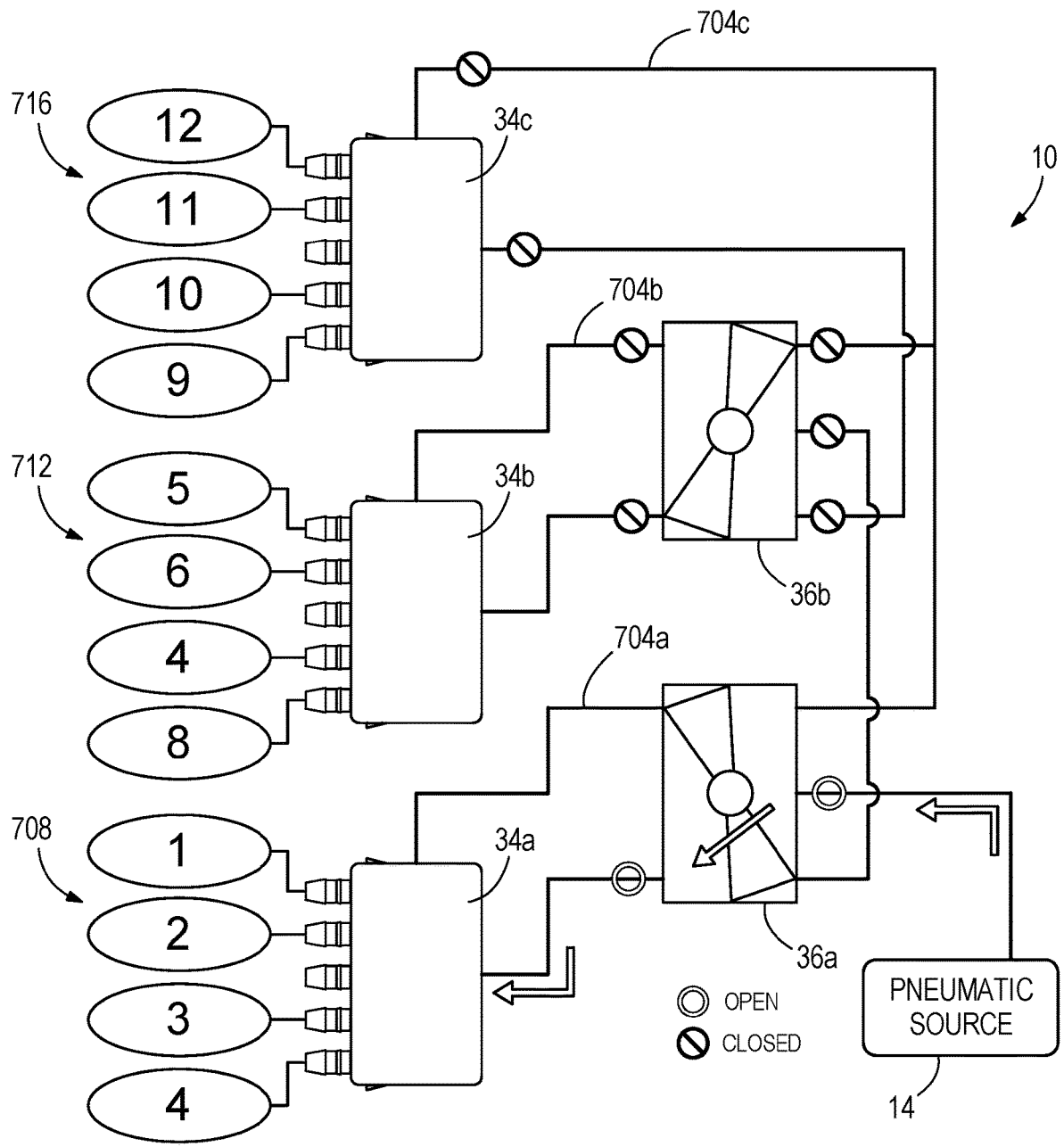
FIGS. 43-46 are control schematics illustrating operation of the pneumatic system of FIG. 1, according to another embodiment.
Figure 44:
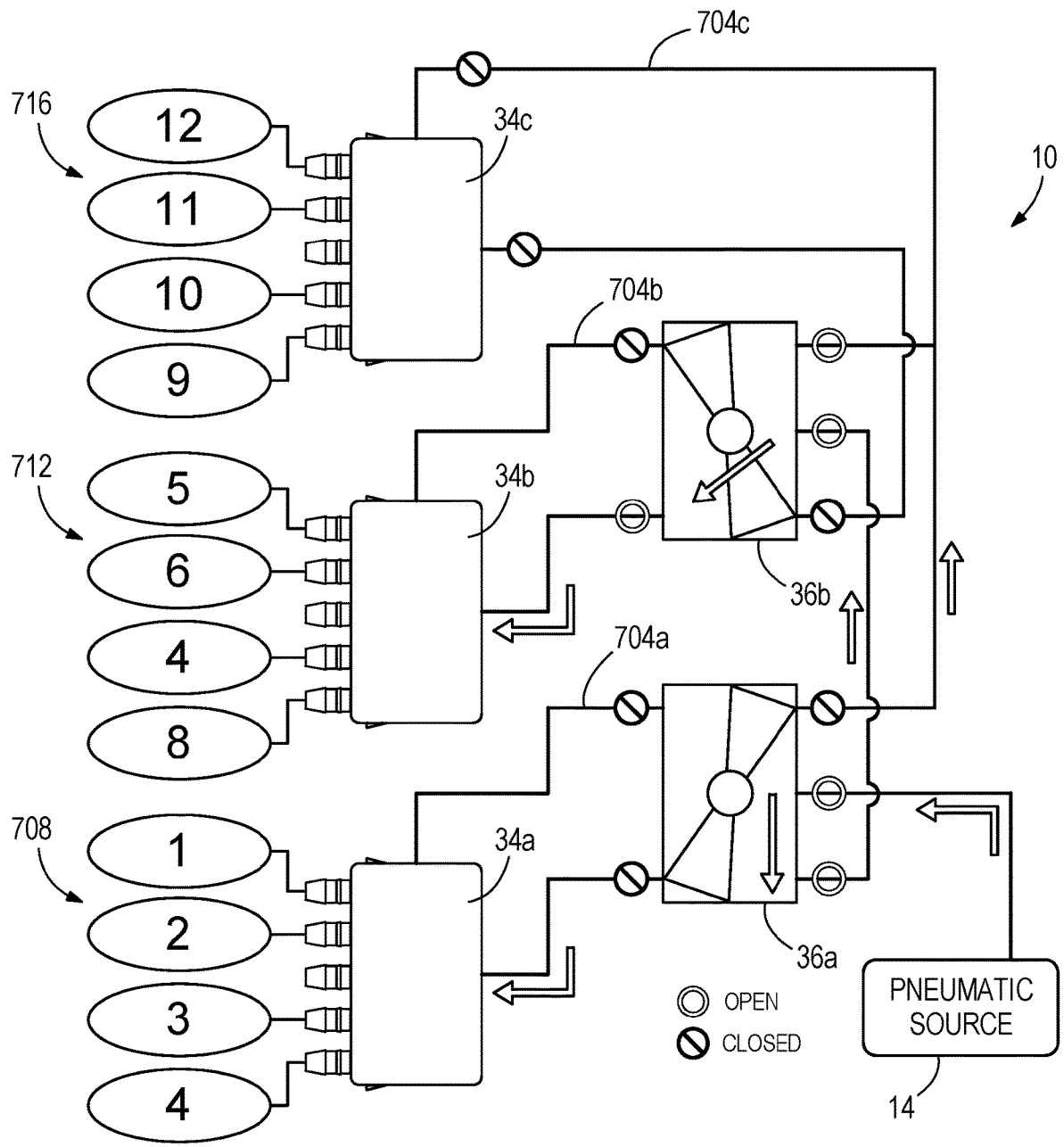
Figure 45:
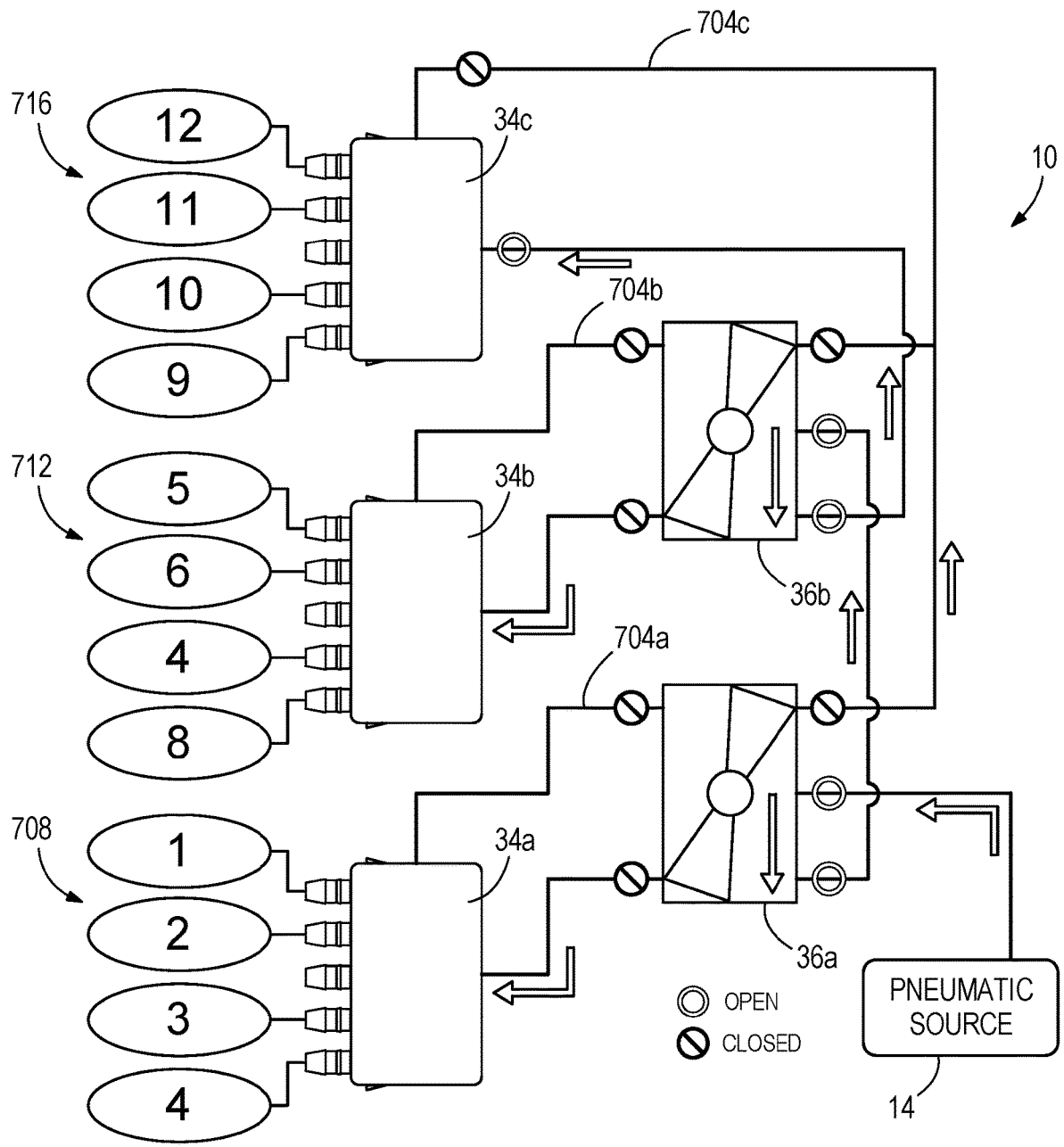
Figure 46:
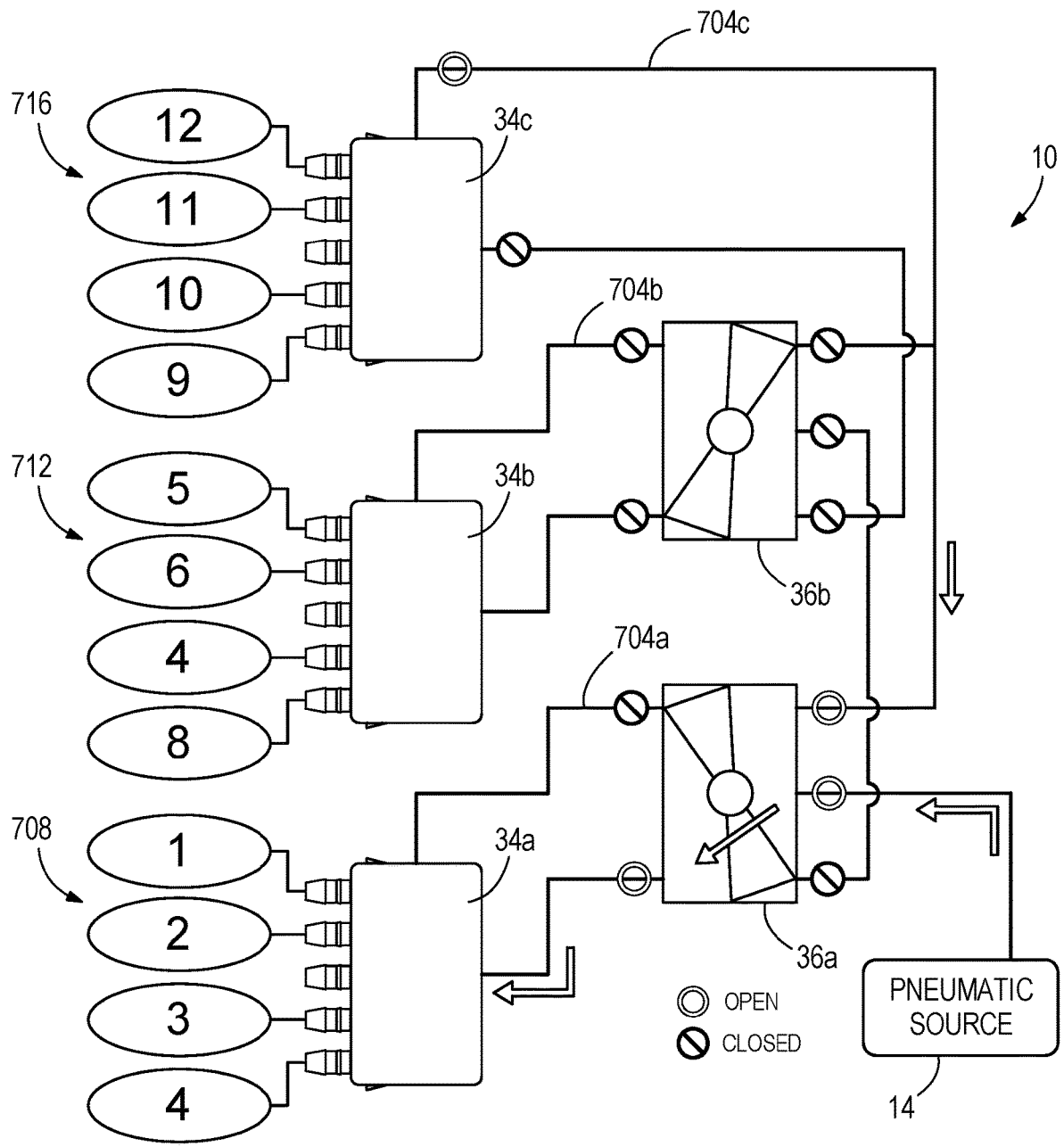

In operation, referring first to FIG. 43, pressure from the pneumatic source 14 is directed by the first adjustment device 36a to the first fluidic switching module 34a, which provides air to inflate a plurality of bladders 708 (such as any of the bladders described herein) in sequence, as described above with reference to FIGS. 11A-E. After inflating the last of the plurality of bladders 708, the first fluidic switching module 34a exhausts the air through the exhaust line 704a and to the first adjustment device 36a. This actuates the adjustment device 36a to a second position (FIG. 44), which then directs air from the pneumatic source 14 to the second fluidic switching module 34b. The second fluidic switching module 34b provides air to inflate a second plurality of bladders 712 in sequence, and then exhausts the air through the exhaust line 704b and to the second adjustment device 36b. This actuates the second adjustment device 36b to a second position (FIG. 45), which then directs air from the pneumatic source 14 to the third fluidic switching module 34c. The third fluidic switching module 34c provides air to inflate a third plurality of bladders 716 in sequence, and the exhausts the air through the third exhaust line 704c. This actuates the first adjustment device 36a back to its first position (FIG. 46), and the process repeats.

As evident by the exemplary embodiments described above, multiple fluidic switching modules 34 can be coupled together in series using one or more adjustment devices 36 to control sequential inflation and deflation of any desired number and arrangement of bladders.

In each of the above examples, the pneumatic system 10 is operable such that the occupant senses a translational or an undulating (to include circular) pressure pattern due to the arrangement and timing of the disclosed system. This pattern is not one of "poking" or "tapping" but is instead a smooth and continuous application of pressure that may be pre-programmed into the system and responsive to the presence of a seat occupant (e.g., through a sensed pressure load and thereafter automatically modifiable based on occupant size, weight, and positioning), or it may be completely user definable and adjustable in real-time—either locally or in some applications tied into an "intelligent" control system and controllable via a smartphone or other application-based technology. This sequential massage function may also be configured such that the massaging effect will continue until the source of pressurized air is removed.

The pattern is not limited to a repetitive and constant sequence. In some applications, a massage cycle can be steady and continuous but in others the cycle may be discontinuous or further still random, for all or only part of a user's interaction with the seating surface. The discontinuity or the randomness may be based on differing inflation/ deflation times or rates among certain chambers (adjacent or non-adjacent) resulting from duration differences between chambers. As an example, first alternating chambers could be inflated to a maximum inflation for two seconds while second alternating chambers could be inflated to a maximum inflation for one second. Variations may also be accomplished through flow restrictors or adjusters in certain flow conduits (supply or exhaust). As previously described, such differences may be automatic and pre-programmed into the system, or they may be user adjustable.

Various features and aspects of the disclosure are set forth in the following claims.

What is claimed is:

1. A pneumatic massage system comprising:
   a source of pressurized air;
   a fluidic switching module in communication with the source of pressurized air;
   a first bladder in communication with the fluidic switching module;
   a second bladder in communication with the fluidic switching module; and
   a third bladder in communication with the fluidic switching module,
   wherein the fluidic switching module includes
      a first subsystem having a first air splitter in fluid communication with the source of pressurized air and having a first outlet and a second outlet, wherein the first air splitter is configured to deflect an airflow toward the first outlet in response to unequal air pressure fields created between the first and second outlets by a first stationary airflow biasing feature formed in the first air splitter,
   a second subsystem having a second air splitter downstream from and in fluid communication with the first outlet to receive the airflow from the first air splitter, wherein the second air splitter includes a third outlet in fluid communication with the first bladder and a fourth outlet in fluid communication with the second bladder, and wherein the second air splitter is configured to deflect the airflow toward the third outlet in response to unequal air pressure fields created by a second stationary airflow biasing feature formed in the second air splitter, and
   a third subsystem in fluid communication with the first air splitter through the second outlet to receive the airflow from the first air splitter, the third subsystem including a fifth outlet in fluid communication with the third bladder;
   wherein when the first bladder reaches a first threshold air pressure sufficient to create a first pressure feedback, the second subsystem is configured to switch and deflect the airflow from the third outlet toward the fourth outlet to inflate the second bladder and deflate the first bladder,
   wherein when the second bladder reaches a second threshold air pressure sufficient to create a second pressure feedback, the first subsystem is configured to switch and deflect the airflow from the first outlet toward the second outlet to deflate the second bladder and inflate the third bladder via the third subsystem,
   wherein when the third bladder reaches a third threshold air pressure sufficient to create a third pressure feedback, the first subsystem system is configured to switch and deflect the airflow from the second outlet back toward the first outlet to inflate the first bladder and deflate the third bladder.

2. The pneumatic massage system of claim 1, wherein the first bladder, the second bladder, and the third bladder are arranged in a circular pattern.

3. The pneumatic massage system of claim 1, further comprising a support backing including a planar surface abutting each of the first bladder, the second bladder, and the third bladder.

4. The pneumatic massage system of claim 3, further comprising a pressure transfer member positioned opposite the support backing, wherein the pressure transfer member at least partially overlies each of the first bladder, the second bladder, and the third bladder.

5. The pneumatic massage system of claim 1, wherein the second bladder is positioned adjacent the first bladder, and wherein the third bladder is positioned adjacent the second bladder.

6. The pneumatic massage system of claim 5, wherein the fluidic switching module is configured to sequentially inflate and deflate adjacent bladders in a predefined staggered sequence.

7. The pneumatic massage system of claim 1, wherein the first, second, and third bladders are arranged in a circular pattern, and wherein the fluidic switching module is configured to sequentially inflate and deflate the first, second, and third bladders to produce a rotary massage effect.

8. The pneumatic massage system of claim 1, wherein the first, second, and third bladders are arranged in a generally linear pattern, and wherein the fluidic switching module is configured to sequentially inflate and deflate the first, second, and third bladders to produce a translating massage effect.

9. The pneumatic massage system of claim 1, wherein the first, second, and third bladders are part of a bladder assembly that includes a body, wherein the body defines each of the first, second, and third bladders, and wherein adjacent bladders of the first, second, and third bladders are separated by a weld.

10. The pneumatic massage system of claim 1, wherein each of the first, second, and third bladders partially overlaps an adjacent bladder of the first, second, and third bladders.

11. The pneumatic massage system of claim 1,
    wherein the first, second, and third bladders are part of a first bladder assembly in an array of bladder assemblies arranged in a plurality of rows and the fluidic switching module is a first fluidic switching module of a plurality of fluidic switching modules,
    wherein each row of bladder assemblies comprises two bladder assemblies, each bladder assembly of the plurality of bladder assemblies including three bladders, and each fluidic switching module of the plurality of fluidic switching modules is in fluid communication with two respective bladder assemblies in a same row of the plurality of rows of bladder assemblies, and
    wherein the plurality of fluidic switching modules is configured to inflate the array of bladder assemblies in a predefined sequence that includes a row-by row sequential inflation and deflation of adjacent bladders of each bladder assembly in a same row of the plurality of rows of bladder assemblies.

12. The pneumatic massage system of claim 1,
    wherein the first, second, and third bladders are part of a first bladder assembly and the fluidic switching module is a first fluidic switching module configured to inflate each bladder of the first bladder assembly separately in a predefined sequence, the pneumatic massage system further comprising:

a second fluidic switching module in communication with the source of pressurized air;
a second bladder assembly including three bladders in communication with the second fluidic switching module, wherein the second fluidic switching module is configured to inflate each bladder of the second bladder assembly separately in a second predefined sequence; and
an adjustment device positioned fluidly between the source of pressurized air and the first and second fluidic switching modules, wherein the adjustment device is configured to actuate between a first position in which the adjustment device directs air from the source of pressurized air to the first fluidic switching module, and a second position in which the adjustment device directs air from the source of pressurized air to the second fluidic switching module.

13. The pneumatic massage system of claim 1, wherein the fluidic switching module is configured to inflate each bladder of the three bladders in a predefined sequence by sequentially directing an airflow toward each of the three bladders in response to pressure feedback in the bladder assembly.

14. The pneumatic massage system of claim 1, further comprising a support surface positioned to support a portion of a seat occupant,
wherein the first, second, and third bladders are part of a first bladder assembly positioned behind the support surface, the first bladder assembly configured to inflate in a predefined sequence such that each bladder of the first bladder assembly is configured to inflate separately to impart a translational or rotational massage to the seat occupant through the support surface; and
a second bladder assembly positioned behind the first bladder assembly, the second bladder assembly configured to inflate and deflate to vary an intensity of the translational or rotational massage.

15. The pneumatic massage system of claim 14, wherein the fluidic switching module is a first fluidic switching module in communication with the source of pressurized air, the first fluidic switching module configured to direct air from the source of pressurized air to each bladder of the first bladder assembly and a second fluidic switching module in communication with the source of pressurized air and a third bladder assembly.

16. The pneumatic massage system of claim 14, wherein the second bladder assembly is in communication with the source of pressurized air separately from the fluidic switching module.

17. A pneumatic massage system comprising:
a source of pressurized air;
a plurality of fluidic switching modules, wherein each fluidic switching module of the plurality of fluidic switching modules includes
a first subsystem having a first air splitter downstream from and in fluid communication with the source of pressurized air,
wherein the first air splitter is configured to passively bias the airflow in a staggered fashion between a second subsystem in fluid communication with and downstream from the first subsystem, the second subsystem having a second air splitter, and
a third subsystem in fluid communication with and downstream from the first subsystem, the third subsystem having a third air splitter;
an array of bladder assemblies arranged in a plurality of rows, wherein each row of the plurality of rows of bladder assemblies includes at least two bladder assemblies, wherein each bladder assembly of the at least two bladder assemblies in a same row is in fluid communication with a same fluidic switching module of the plurality of fluidic switching modules,
wherein a first row of the plurality of rows of bladder assemblies includes a first bladder assembly having a first plurality of bladders and a second bladder assembly having a second plurality of bladders equal in number to the first plurality of bladders, and wherein a first fluidic switching module of the plurality of fluidic switching modules is in fluid communication with the first and second bladder assemblies and configured to inflate and deflate the first and second plurality of bladders in a same predefined sequence by selectively switching and deflecting an airflow toward each of the bladders of the first and second plurality of bladders in response to unequal air pressure fields created by a stationary airflow biasing feature formed in each of the first, second and third air splitters of the first fluidic switching module or in response to pressure feedback created in the first fluidic switching module, and
wherein a second row of the plurality of rows of bladder assemblies includes a third bladder assembly having a third plurality of bladders and a fourth bladder assembly having a fourth plurality of bladders equal in number to the third plurality of bladders, and wherein a second fluidic switching module of the plurality of fluidic switching modules is in fluid communication with the third and fourth bladder assemblies and configured to inflate and deflate the third and fourth plurality of bladders in a same predefined sequence by selectively switching and deflecting an airflow toward each of the bladders of the third and fourth plurality of bladders in response to unequal air pressure fields created by a stationary airflow biasing feature formed in each of the first, second and third air splitters of the second fluidic switching module or in response to pressure feedback created in the second fluidic switching module.

18. The pneumatic massage system of claim 17, wherein the plurality of fluidic switching modules is configured to inflate the array of bladder assemblies in a predefined sequence that includes row-by row inflation and deflation to impart a translational or rotational massage through a seat support surface.

19. The pneumatic massage system of claim 18, wherein each fluidic switching module of the plurality of fluidic switching modules is configured to inflate and deflate in a predefined staggered sequence adjacent bladders of each bladder assembly of the array of bladder assemblies.

20. The pneumatic massage system of claim 17, wherein each stationary biasing feature of the first fluidic switching module is configured to passively and selectively direct the airflow toward each of the respective bladders of the first and second plurality of bladders, and wherein each stationary biasing feature of the second fluidic switching module is configured to passively and selectively direct the airflow toward each of the respective bladders of the third and fourth plurality of bladders.

* * * * *